US 6,191,243 B1

(12) United States Patent
Nitta et al.

(10) Patent No.: US 6,191,243 B1
(45) Date of Patent: Feb. 20, 2001

(54) α-OLEFIN-CYCLOOLEFIN COPOLYMERS AND PROCESS FOR THEIR PRODUCTION

(75) Inventors: Hideaki Nitta; Kiyonari Hashidzume; Masaki Takeuchi; Kaoru Iwata, all of Hino (JP)

(73) Assignees: Teijin Limited, Osaka (JP); Bayer Aktiengesellschaft, Leverkusen (DE)

( * ) Notice: Under 35 U.S.C. 154(b), the term of this patent shall be extended for 0 days.

(21) Appl. No.: 09/142,786

(22) PCT Filed: Jan. 29, 1998

(86) PCT No.: PCT/JP98/00366

§ 371 Date: Sep. 15, 1998

§ 102(e) Date: Sep. 15, 1998

(87) PCT Pub. No.: WO98/33830

PCT Pub. Date: Aug. 6, 1998

(30) Foreign Application Priority Data

Jan. 31, 1997 (JP) .................................... 9-018491
Mar. 6, 1997 (JP) .................................... 9-051638

(51) Int. Cl.[7] .................................... C08F 36/00
(52) U.S. Cl. .................. 526/283; 526/281; 526/134; 526/160; 526/943
(58) Field of Search .................. 526/281, 283, 526/943, 134, 160

(56) References Cited

U.S. PATENT DOCUMENTS

| 5,008,356 | * | 4/1991 | Ishimaru et al. ...................... 526/281 |
| 5,061,771 | * | 10/1991 | Oshima et al. ...................... 526/282 |
| 5,087,677 | | 2/1992 | Brekner et al. ...................... 526/160 |

FOREIGN PATENT DOCUMENTS

| 01282214 | 11/1989 | (JP) . |
| 96/03445 | 2/1996 | (WO) ............... C08F/210/06 |
| WO 96/16104 | 5/1996 | (WO) . |
| WO 96/16105 | 5/1996 | (WO) . |

OTHER PUBLICATIONS

Database WPI, Section Ch, Week 8951, Derwent Publications Ltd., London GB; Class A12, AN 89–375070, XP002065886.

* cited by examiner

Primary Examiner—David W. Wu
Assistant Examiner—Caixia Lu
(74) Attorney, Agent, or Firm—Sughrue, Mion, Zinn, Macpeak & Seas, PLLC

(57) ABSTRACT

α-olefin-cycloolefin copolymers which
(1) consist essentially of 0–31% by mole of an α-olefin component represented by the following formula (A)

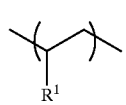

(A)

wherein $R^1$ is a hydrogen atom or a saturated aliphatic hydrocarbon group of 1–16 carbon atoms, and 61–100% by mole of a cycloolefin component represented by the following formula (B)

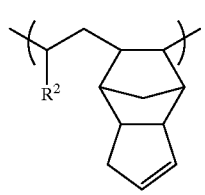

(B)

wherein $R^2$ is a hydrogen atom or a saturated aliphatic hydrocarbon group of 1–16 carbon atoms, and
(2) have a reduced viscosity $\eta_{sp}/c$ which is in the range of 0.1–10 dl/g as measured in a 0.5 g/dl toluene solution at 30° C., hydrogenated copolymers thereof and a process for their production.

26 Claims, 14 Drawing Sheets

α-OLEFIN-CYCLOOLEFIN COPOLYMERS AND PROCESS FOR THEIR PRODUCTION

TECHNICAL FIELD

The present invention relates to α-olefin-cycloolefin copolymers and to a process for their production. More specifically, it relates to α-olefin-cycloolefin copolymers with enhanced level of alternation of α-olefin derived structural units and cycloolefin derived structural units, i.e. high level of alternation and chemical homogeneity, and to a process for their production. Hydrogenated α-olefin-cycloolefin copolymers obtained by hydrogenation of these α-olefin-cycloolefin copolymers as precursors have high optical uniformity and transparency, and are therefore suitable for applications as optical disk substrates and other optical materials.

BACKGROUND ART

Plastics used for optical materials such as optical disk substrates and optical lenses require a number of properties, in addition to transparency, including optical isotropy (low birefringence), dimensional stability, weather resistance and thermal stability. Polycarbonates and polymethyl methacrylates have mainly been used for such optical uses in the past, but polycarbonates have disadvantages including a large intrinsic birefringence and a tendency toward optical anisotropy of the molded products, while polymethyl methacrylates also have disadvantages such as poor dimensional stability, due to their extremely high water absorption, and low heat resistance.

Presently, optical disk substrates employ polycarbonates almost exclusively and, with the recent progress in increased capacity magnetic optical disks (MODS) and high recording density, as typified by the development of digital video disks (DVDs), problems such as the degree of the birefringence of polycarbonates and warping of disks by moisture absorption have become matters of concern.

In light of these circumstances, development has been accelerating in the area of cyclic olefin polymers as substituting materials for polycarbonates. Production processes for these polymers can largely be classified into the following 2 types.

(1) The cyclic olefin is subjected to ring opening polymerization with a metathesis catalyst, after which the resulting unsaturated double bonds on the main polymer chain are hydrogenated.

(2) A Ziegler-Natta catalyst or Kaminsky catalyst is used for copolymerization of an α-olefin such as ethylene with a cyclic olefin, without ring opening of the cyclic olefin.

The advantage of production process (1) is that, since the primary structure of the polymer is uniformly established, high chemical homogeneity is achieved to result in polymers with high transparency when molded into articles; however, costly polycyclic olefins must be used as the monomers in order to achieve high heat resistance. For example, such olefins as are commercially available at the present time include the amorphous polyolefin resin [tradename ZEONEX] manufactured by Nihon Zeon, KK. and the amorphous polyolefin resin [tradename ARTON] manufactured by Nihon Synthetic Rubber, KK., both of which use, as the monomer, a derivative of tetracyclo[4.4.0.1$^{2,5}$.1$^{7,10}$.]-3-dodecene obtained according to the Diels-Alder addition product of dicyclopentadiene with the corresponding dienophile [Polymer Preprints, Japan Vol.44, No.1, 81–83 (1995)]. However, the synthesis and purification of these polycyclic monomers are costly, and they are therefore economically disadvantageous.

In production process (2), polymers with high heat resistance can be obtained without using costly polycyclic olefins, and it is therefore a highly economical process. For example, it is known that ethylene-norbornene copolymers with glass transition points of over 140° C. can be obtained by increasing the composition ratio of the norbornene (hereunder, "NB") component [B. L. Goodall et al., Macromol. Symp. 89, 421–423 (1995)]. However, an inherent problem with this production process is the difficulty in achieving chemical homogeneity of the polymer. In the case of most copolymers, the reactivity of the monomers varies depending on parameters such as the composition ratio and concentration of the monomer, the polymerization temperature and the catalyst concentration, and it is therefore difficult to maintain the composition ratio of the resulting copolymer constant as polymerization proceeds.

Although a great number of ethylene-cyclic olefin copolymers obtained using ethylene as α-olefin have been proposed, most of them are polymerized while keeping a constant ethylene pressure during the polymerization reaction and, since the composition ratio of the monomers, as represented by the following chemical ratio:

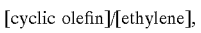

[cyclic olefin]/[ethylene], decreases as polymerization progresses, the introduction ratio of the cyclic olefin into the copolymer is gradually reduced. This variation in the composition ratio of the copolymer leads to fluctuations in the polymer density, thus increasing the proportion of light scattering to result in lower transparency. In addition, since the reactivity of ethylene is generally higher than that of cyclic olefins, there is a tendency to produce ethylene homopolymers, oligomers and copolymers including partially crystalline ethylene blocks, which are also a cause of lower transparency.

Methods aimed at overcoming these drawbacks include one wherein the catalyst is modified to enhance the level of alternation of the ethylene and cyclic olefin (Japanese Unexamined Patent Publication No. 6-339327) and ones wherein the production of polyethylene and ethylene blocks is minimized (Japanese Unexamined Patent Publication No. 6-271628 and No. 8-12712); however, difficulties still remain in obtaining polymers suitable for uses including optical disk substrates, which present strict demands for optical uniformity and transparency.

Given this situation, since no method has yet been provided for the production of cyclic olefin polymers with the optical uniformity and transparency and the high heat resistance suited for optical uses without using expensive cyclic olefins, further development in this area is required.

Dicyclopentadiene (hereunder, "DCPD") is a starting material used for synthesis of many different cyclic olefins, and it is the least expensive of the cyclic olefins. However, studies of this material have been limited, probably because α-olefin-DCPD copolymers which contain this monomer include unsaturated double bonds, from DCPD, in the copolymer.

Ethylene-DCPD copolymers themselves are known. One source [H. Schnecko, et al., Angew. Macromol. Chem., 20, 141–152 (1971)] teaches that a Ziegler-Natta catalyst comprising a vanadium compound and an organic aluminum compound was used for copolymerization of ethylene and DCPD, giving an ethylene-DCPD copolymer with the DCPD component in a composition ratio of 6–100% by mole. This source suggests that ethylene and DCPD undergo random copolymerization with the vanadium catalysts.

On the other hand, few reports exist of ethylene-DCPD copolymers using Kaminsky catalysts. In Japanese Examined Patent Publication No. 7-13084 there is disclosed copolymerization of ethylene and DCPD using bis (cyclopentadienyl)zirconium chloride and aluminoxane as a catalyst. However, the composition ratio of the DCPD component in the resulting copolymer is no greater than 20% by mole. In Japanese Patent No. 2504495 and Japanese Unexamined Patent Publication Nos. 7-224122 and 8-59744, DCPD is mentioned as a candidate monomer to be employed, but no details whatsoever are given.

Further, U.S. Pat. No. 4,948,856 discloses copolymers obtained from ethylene and a norbornene-type monomer including DCPD and describes that alternating copolymers are preferred. However, copolymers of enhanced level of alternation cannot be obtained by using the method described therein and no specific example is described for the use of DCPD among the disclosed norbornene-type monomers.

DISCLOSURE OF THE INVENTION

It is an object of the present invention to provide α-olefin-cycloolefin copolymers with high chemical homogeneity which are suited for optical uses, to provide a process for their production.

As a result of diligent research on copolymerization reactions between α-olefins and DCPD using Kaminsky catalysts, the present inventors have found that the reactivity of DCPD differs greatly in comparison to using conventional vanadium catalysts. That is, when a Kaminsky catalyst is used, absolutely no DCPD homopolymer is obtained, and upon copolymerization with ethylene the DCPD component does not exceed 50% by mole in the copolymer, regardless of how high the composition ratio of DCPD to ethylene. This indicates that virtually no linking of the DCPD component occurs in the presence of a Kaminsky catalyst.

This is a surprising finding considering the publicly known fact that linking of the NB components occurs readily, based on evidence that when polymerization of NB is carried out with Kaminsky catalysts, as hitherto reported in numerous publications, homopolymers of NB are obtained [W. Kaminsky et al., Stud. Surf. Sci. Catal. 56, (Catal. Olefin Polym.), 425–438 (1990)] and ethylene-NB copolymers are obtained with NB component mole fractions exceeding 50% by mole [W. Kaminsky, et al., Macromol. Chem., Macromol. Symp., 47, 83–93 (1991)].

The present inventors concentrated on these characteristics of DCPD and catalysts, and have found that when copolymers are produced using Kaminsky catalysts while keeping the composition ratio of the DCPD monomer in a reaction system above a certain value with respect to the α-olefin, the level of alternation between the α-olefin component and the DCPD component is increased, while production of crystalline α-olefin homopolymers, oligomers and block copolymers is minimized, thus giving α-olefin-DCPD copolymers with high chemical homogeneity. It has been also found that hydrogenated α-olefin-DCPD copolymers, obtained by addition of hydrogen to the aforementioned copolymers for hydrogenation of the unsaturated double bonds, have excellent optical uniformity and transparency making them suitable for optical uses including optical disk substrates, and the present invention has thus been completed.

In other words, the present invention provides an α-olefin-cycloolefin copolymer with enhanced level of alternation, which (1) consists essentially of 0–39% by mole of an α-olefin component represented by the following formula (A)

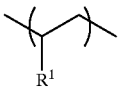

(A)

wherein $R^1$ is a hydrogen atom or a saturated aliphatic hydrocarbon group of 1–16 carbon atoms, and 61–100% by mole of a cycloolefin component represented by the following formula (B)

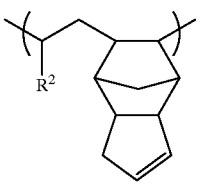

(B)

wherein $R^2$ is a hydrogen atom or a saturated aliphatic hydrocarbon group of 1–16 carbon atoms, and (2) has a reduced viscosity $\eta_{sp}/c$ which is in a range of 0.1–10 dl/g as measured in a 0.5 g/dl toluene solution at 30° C. (hereunder sometimes referred to as copolymer (X)).

Consequently, the above-mentioned copolymer according to the present invention includes, in addition to copolymers composed of repeating units represented by formulas (A) and (B), also copolymers which contain substantially no repeating units represented by formula (A) in copolymer (X), and which therefore consist substantially of repeating units represented by formula (B).

The present invention further provides an α-olefin-cycloolefin copolymer with enhanced level of alternation, which (1) consists essentially of repeating units represented by the following formulas (A), (B), (C) and (D):

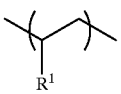

(A)

wherein $R^1$ is a hydrogen atom or a saturated aliphatic hydrocarbon group of 1–16 carbon atoms,

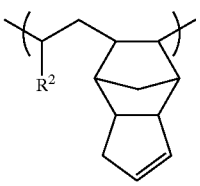

(B)

wherein $R^2$ is a hydrogen atom or a saturated aliphatic hydrocarbon group of 1–16 carbon atoms,

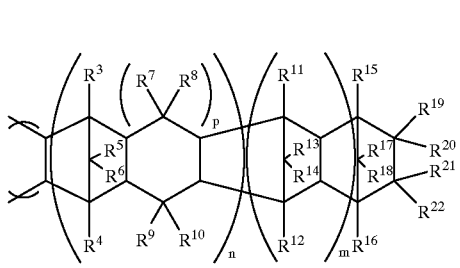
(C)

wherein n is 0 or 1; m is 0 or a positive integer of 1–3; p is 0 or 1; and $R^3$–$R^{22}$ are the same or different and each represents a hydrogen atom, a halogen atom, an aromatic hydrocarbon group of 6–10 carbon atoms or a saturated or unsaturated aliphatic hydrocarbon group of 1–12 carbon atoms, or $R^{19}$ and $R^{20}$ or $R^{21}$ and $R^{22}$ may together form an alkylidene group, or $R^{19}$ or $R^{20}$ and $R^{21}$ or $R^{22}$ may form, together with the two carbon atoms to which they bond, a ring which may contain at least one double bond or be an aromatic ring,

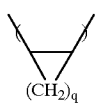
(D)

wherein q is an integer of 2–8, with composition ratios of [A], [B], [C] and [D] which represent the molar percents of the respective repeating units (A), (B), (C) and (D) being in ranges such that ([A]+[B])/([C]+[D])=95–99.9/0.1–5, [A]/[B]=0–39/61–100 and [D]/[C]=0–95/5–100, and (2) has a reduced viscosity $\eta_{sp}/c$ which is in a range of 0.1–10 dl/g as measured in a 0.5 g/dl concentration toluene solution at 30° C. (hereunder sometimes referred to as copolymer (Y)).

In other words, the above-mentioned copolymer according to the invention includes copolymers which consist of repeating units (B) and (C) whose composition ratios are in ranges such that [B]/[C]=95–99.9/0.1–5.

The above-mentioned copolymer according to the invention also includes copolymers which consist of repeating units (B), (C) and (D) whose composition ratios are in ranges such that [B]/([C]+[D])=95–99.9/0.1–5 and [D]/[C]=1–95/5–99.

The above-mentioned copolymer according to the invention also includes copolymers which consist of repeating units (A), (B) and (C) whose composition ratios are in ranges such that ([A]+[B])/[C]=95–99.9/0.1–5 and [A]/[B]=1–39/61–99.

The above-mentioned copolymer according to the invention further includes copolymers which consist of repeating units (A), (B), (C) and (D) whose composition ratios are in ranges such that ([A]+[B])/([C]+[D])=95–99.9/0.1–5, [A]/[B]=1–39/61–99 and [D]/[C]=1–95/5–99.

The present invention still further provides hydrogenated-type α-olefin-cycloolefin copolymers with enhanced level of alternation which is obtainable by hydrogenation of at least 99% of the unsaturated double bonds in copolymer (X) (hereunder sometimes referred to as copolymer ($X_H$)). Thus, the α-olefin-cycloolefin copolymers ($X_H$) may be those which (1) consists essentially of 0–39% by mole of an α-olefin component represented by the following formula ($A_H$)

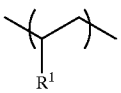
($A_H$)

wherein $R^1$ is a hydrogen atom or a saturated aliphatic hydrocarbon group of 1–16 carbon atoms, and 61–100% by mole of a cycloolefin component represented by the following formula ($B_H$)

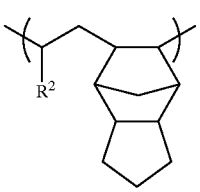
($B_H$)

wherein $R^2$ is a hydrogen atom or a saturated aliphatic hydrocarbon group of 1–16 carbon atoms, and (2) has a reduced viscosity $\eta_{sp}/c$ which is in a range of 0.1–10 dl/g as measured in a 0.5 g/dl toluene solution at 30° C.

The present invention still further provides hydrogenated-type α-olefin-cycloolefin copolymers with enhanced level of alternation which is obtainable by hydrogenation of at least 99% of the olefinically unsaturated double bonds in copolymer (Y) (hereunder sometimes referred to as copolymer ($Y_H$)). These copolymers ($Y_H$) may thus be those which (1) consists essentially of repeating units represented by the following formulas ($A_H$), ($B_H$), ($C_H$) and ($D_H$):

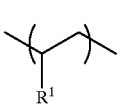
($A_H$)

wherein $R^1$ is a hydrogen atom or a saturated aliphatic hydrocarbon group of 1–16 carbon atoms,

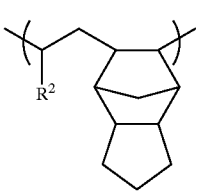
($B_H$)

wherein $R^2$ is a hydrogen atom or a saturated aliphatic hydrocarbon group of 1–16 carbon atoms, (C_H)

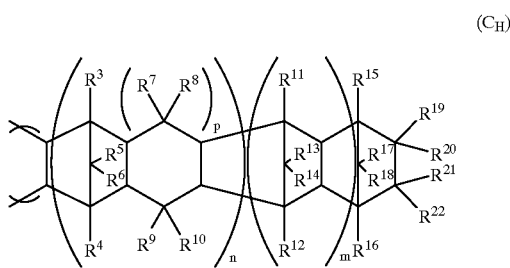

wherein n is 0 or 1; m is 0 or a positive integer of 1–3; p is 0 or 1; and $R^3$–$R^{22}$ are the same or different and each represents a hydrogen atom, a halogen atom, an aromatic hydrocarbon group of 6–10 carbon atoms or a saturated aliphatic hydrocarbon group of 1–12 carbon atoms, or $R^{19}$ and $R^{20}$ or $R^{21}$ and $R^{22}$ may together form an alkylidene group, or $R^{19}$ or $R^{20}$ and $R^{21}$ or $R^{22}$ may form, together with the two carbon atoms to which they bond, a ring which may be an aromatic ring, (D_H)

(CH_2)_q wherein q is an integer of 2–8, with composition ratios of $[A_H]$, $[B_H]$, $[C_H]$ and $[D_H]$ which represent the molar percents of the respective repeating units $(A_H)$, $(B_H)$, $(C_H)$ and $(D_H)$ being in ranges such that $([A_H]+[B_H])/([C_H]+[D_H])=95$–$99.9/0.1$–$5$, $[A_H]/[B_H]=0$–$39/61$–$100$ and $[D_H]/[C_H]=0$–$95/5$–$100$, and (2) has a reduced viscosity $\eta_{sp}/c$ which is in a range of 0.1–10 dl/g as measured in a 0.5 g/dl concentration toluene solution at 30° C.

The present invention still further provides a process for producing α-olefin-cycloolefin copolymers comprising copolymerizing an α-olefin of 2 or more carbon atoms with DCPD in the presence of a catalyst comprising at least one metallocene of which the central metal is titanium, zirconium or hafnium and at least one promoter catalyst, while maintaining a mole ratio (F) of the monomers in the reaction system within a range which satisfies the following expression (I)

$$F=[\text{dicyclopentadiene}]/[\alpha\text{-olefin}]>4 \qquad (I)$$

during the period from the start of polymerization until the conversion of the DCPD added to the polymerization reaction system reaches 60%, with or without being followed by hydrogenation.

Within the scope of this production process, a preferred production process is one in which the α-olefin used is ethylene. It is preferred for the central metal of the metallocene to be zirconium and the promoter catalyst to be aluminoxane. It is equally preferred for the central metal of the metallocene to be zirconium and the promoter catalyst to be an ionic boron compound.

Regarding the period during which the monomer ratio is to be maintained, the mole ratio (F) of the monomers in the reaction system is preferably in a range which satisfies expression (I) until the conversion of the dicyclopentadiene added to the polymerization reaction system reaches 70%.

In the process of the invention described above, a more preferred range for the monomer ratio (F) is F>5.5.

As a result of still further research on copolymer reactions between α-olefins and DCPD including the reactivities of the catalysts, the present inventors have also found that the monomer reactivity varies considerably depending on the type of metallocene used. The present invention was completed upon the finding that by controlling the composition ratio of the monomers in the polymerization reaction system during the polymerization based on the different monomer reactivities with each catalyst, it is possible to obtain α-olefin-cycloolefin copolymers having narrow range of copolymer composition and high level of alternation; i.e. having high chemical homogeneity.

The present invention, therefore, further provides a process for producing α-olefin-cycloolifin copolymers comprising copolymerization of an α-olefin of 2 or more carbon atoms with DCPD in which the polymerization is carried out in the presence of a catalyst comprising at least one metallocene of which the central metal is titanium, zirconium or hafnium and at least one promoter catalyst, while maintaining a mole ratio (F=[DCPD])/[α-olefin]) of the monomers in the reaction system within a range which satisfies the following expression (II)

$$38/62<F/(F+r_\alpha)<48/52 \qquad (II)$$

during the period from the start of polymerization until the conversion of the DCPD added to the polymerization reaction system reaches 60%, with or without being followed by hydrogenation. Here, $r_\alpha$ denotes a monomer reactivity ratio of α-olefin relative to the DCPD and represents the conversion of the α-olefin when the propagating end of the copolymer during polymerization is an α-olefin component.

The aforementioned process of the invention is particularly suitable when the α-olefin is ethylene. Also, it is preferred for the metallocene to be a metallocene whose central metal is zirconium and for the promoter catalyst to be aluminoxane. It is equally preferred for the metallocene to be a metallocene whose central metal is zirconium and for the promoter catalyst to be an ionic boron compound.

Regarding the period during which the monomer ratio is to be maintained, the mole ratio (F) of the monomers in the reaction system is preferably in a range which satisfies expression (II) from the start of polymerization until the conversion of the DCPD added to the polymerization reaction system reaches 70%.

(Flu)ZrCl$_2$-PMAO as the catalyst. The measurement was made using deuterated o-dichlorobenzene at 80° C.

Figure 5:
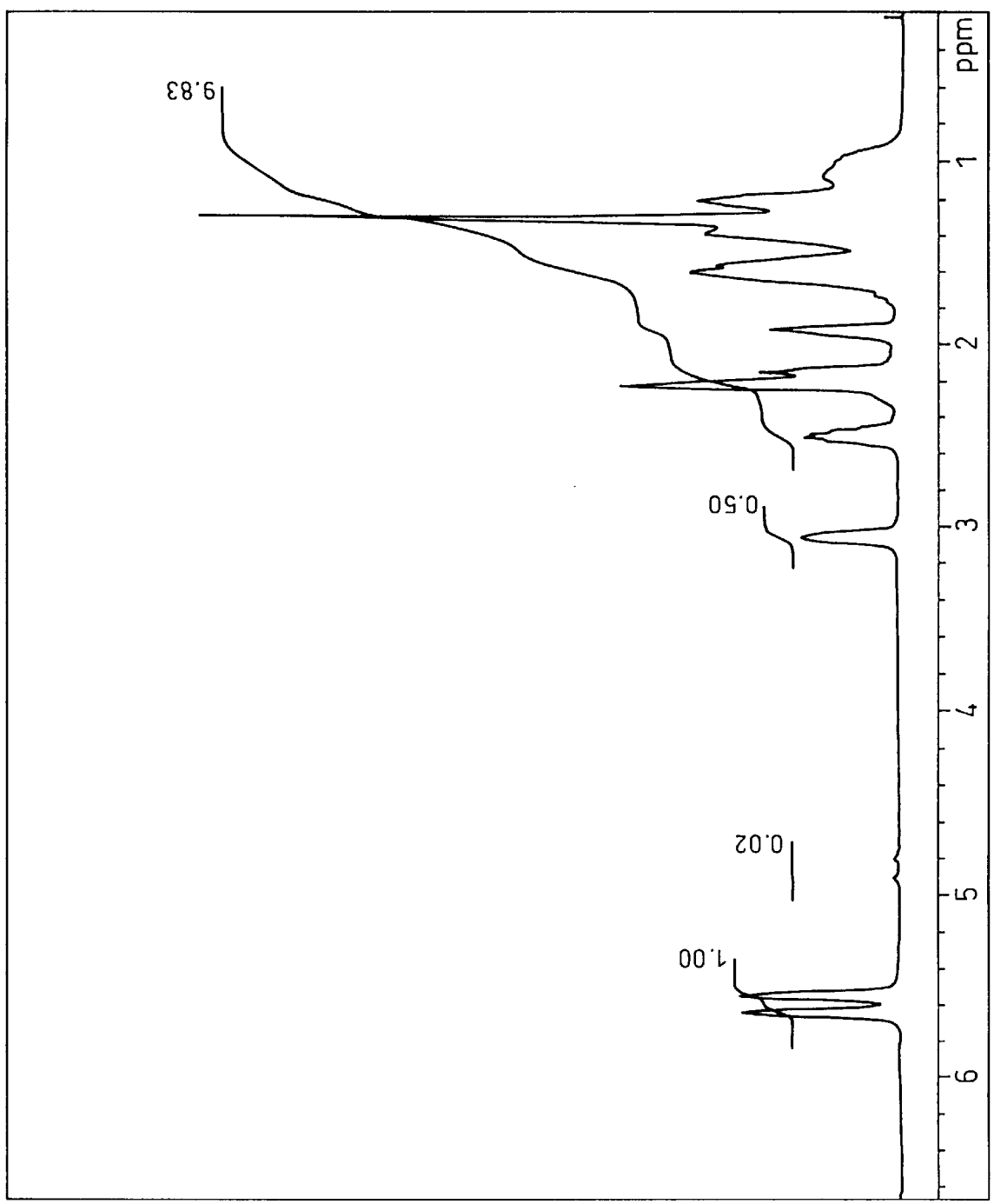

FIG. 5 is a 1H-NMR spectrum (270 MHZ) of an ethylene-DCPD copolymer containing the DCPD component at 28% by mole, obtained in Reference Example 5 using $^i$Pr(Cp)(Flu)ZrCl$_2$-PMAO as the catalyst. The measurement was made using dueterated o-dichlorobenzene at 80° C.

Figure 6:
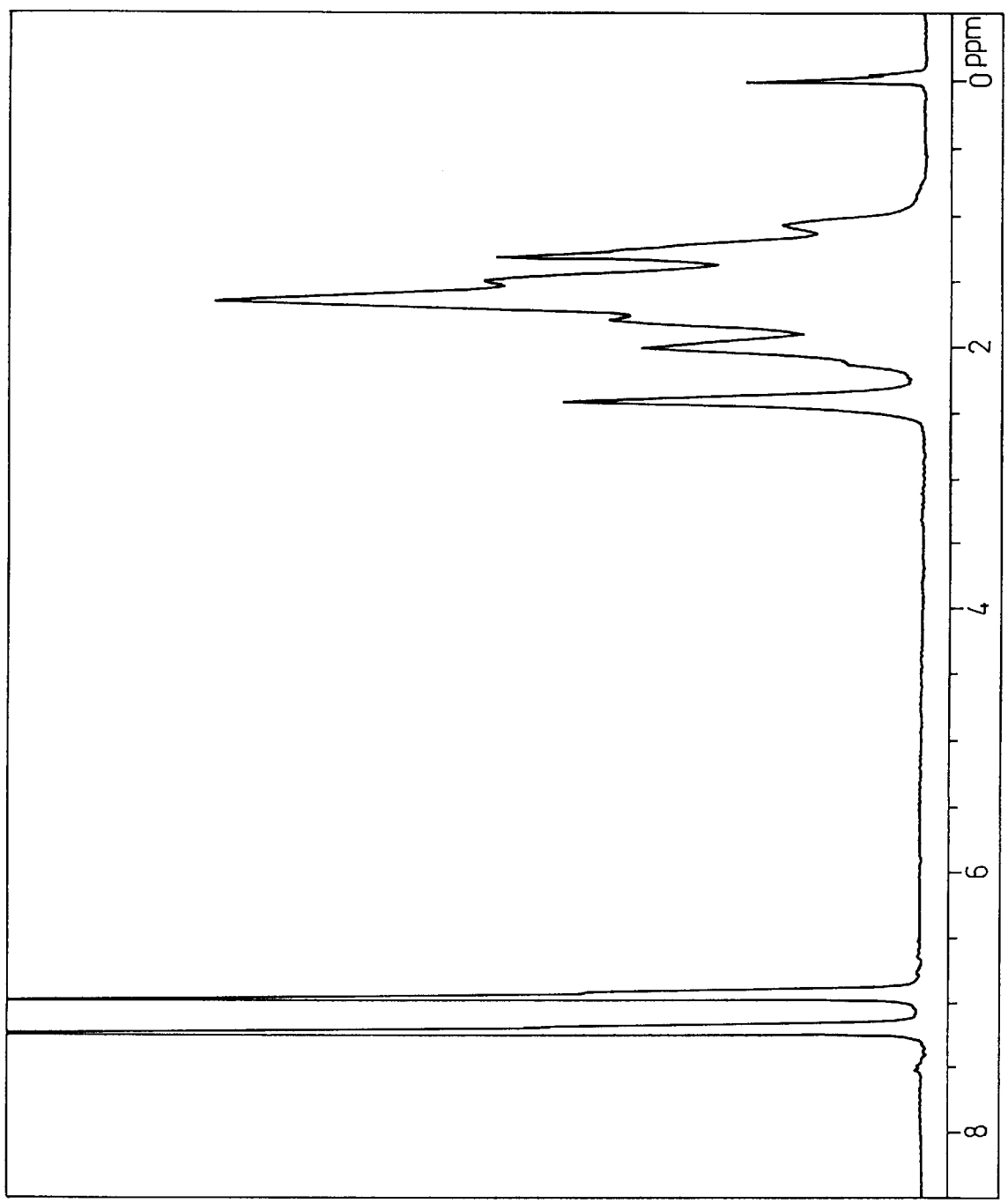

FIG. 6 is a $^1$H-NMR spectrum (270 MHZ) of a hydrogenated copolymer derived from an ethylene-DCPD copolymer containing the DCPD component at 45% by mole, obtained in Example 21 using ethylene-bis(indenyl) zirconium dichloride [Et(Ind)$_2$ZrCl$_2$]-[(C$_6$H$_5$)$_3$C]$^+$[B(C$_6$F$_5$)$_4$]$^-$ as the catalyst. The measurement was made using dueterated o-dichlorobenzene at 80° C.

Figure 7:
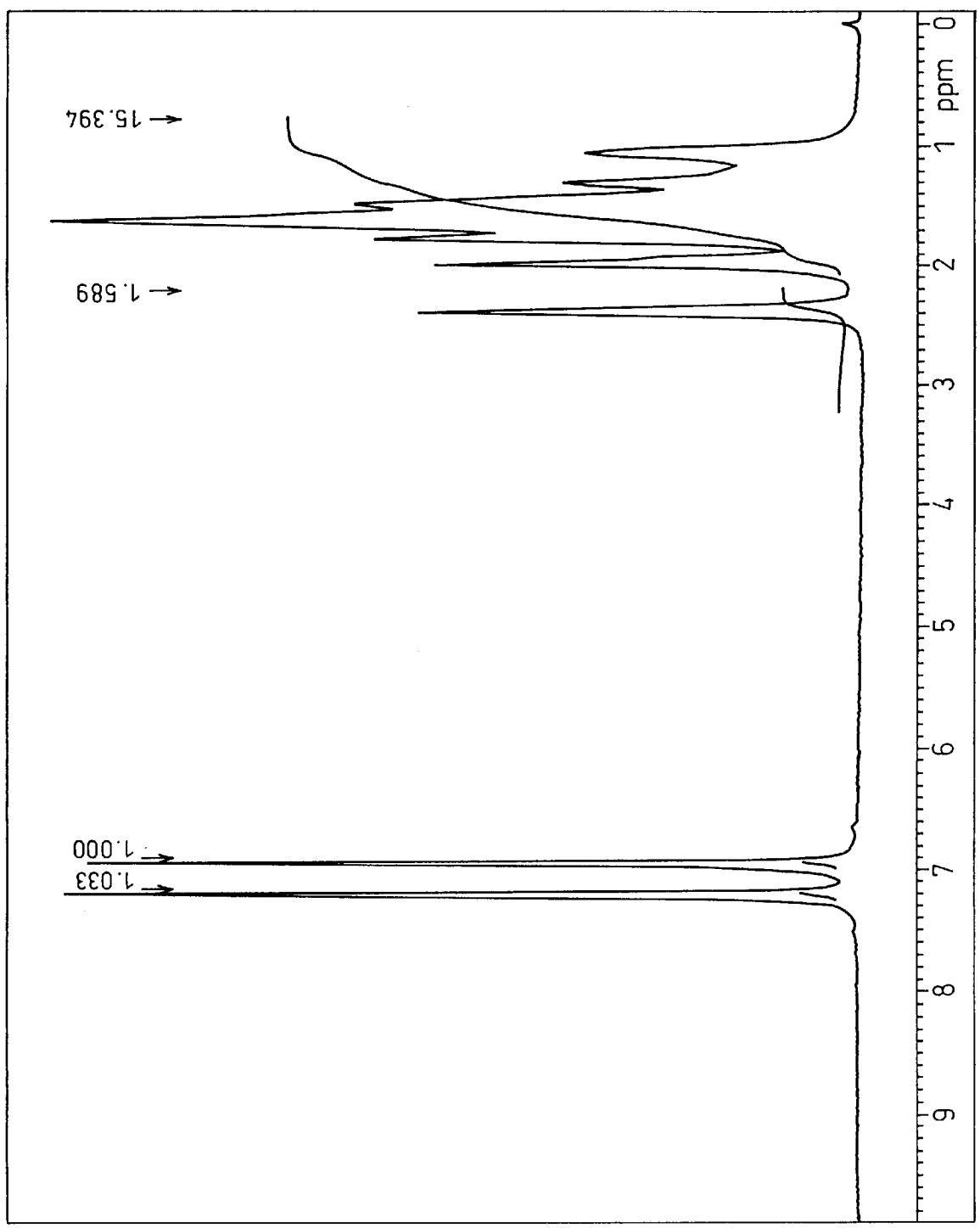

FIG. 7 is a $^1$H-NMR spectrum (270 MHZ) of a hydrogenated copolymer derived from an ethylene-DCPD copolymer containing the DCPD component at 43% by mole, obtained in Example 22 using $^i$Pr(Cp)(Flu)ZrCl$_2$-[(C$_6$H$_5$)$_3$C]$^+$[B(C$_6$F$_5$)$_4$]$^-$ as the catalyst. The measurement was made using deuterated o-dichlorobenzene at 80° C.

Figure 8:
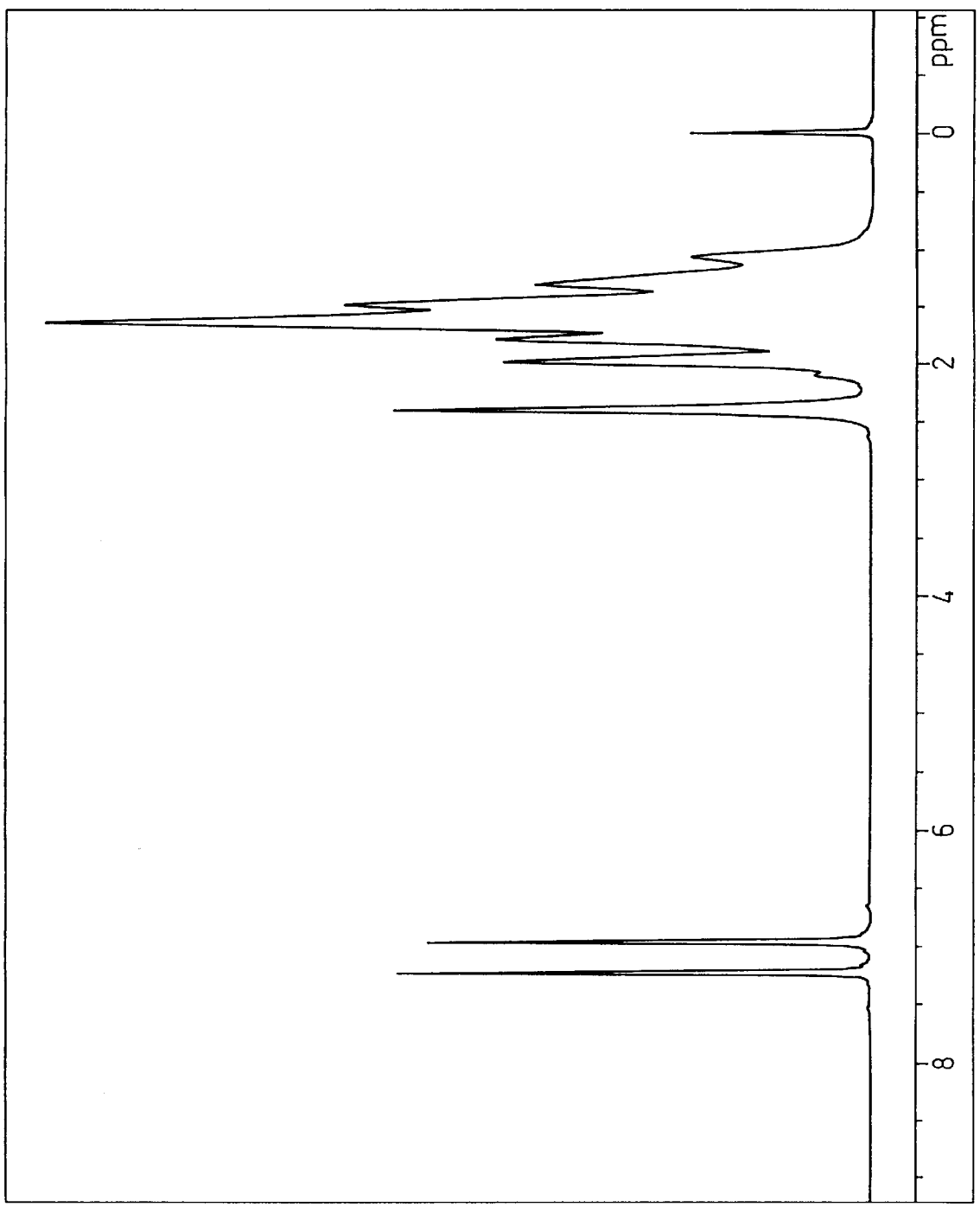

FIG. 8 is a $^1$H-NMR spectrum (270 MHZ) of a hydrogenated copolymer derived from an ethylene-DCPD copolymer containing the DCPD component at 42% by mole, obtained in Example 23 using $^i$Pr(Cp)(Flu)ZrCl$_2$-[(C$_6$H$_5$)$_3$C]$^+$[B(C$_6$F$_5$)$_4$]$^-$ as the catalyst. The measurement was made using deuterated o-dichlorobenzene at 80° C.

Figure 9:
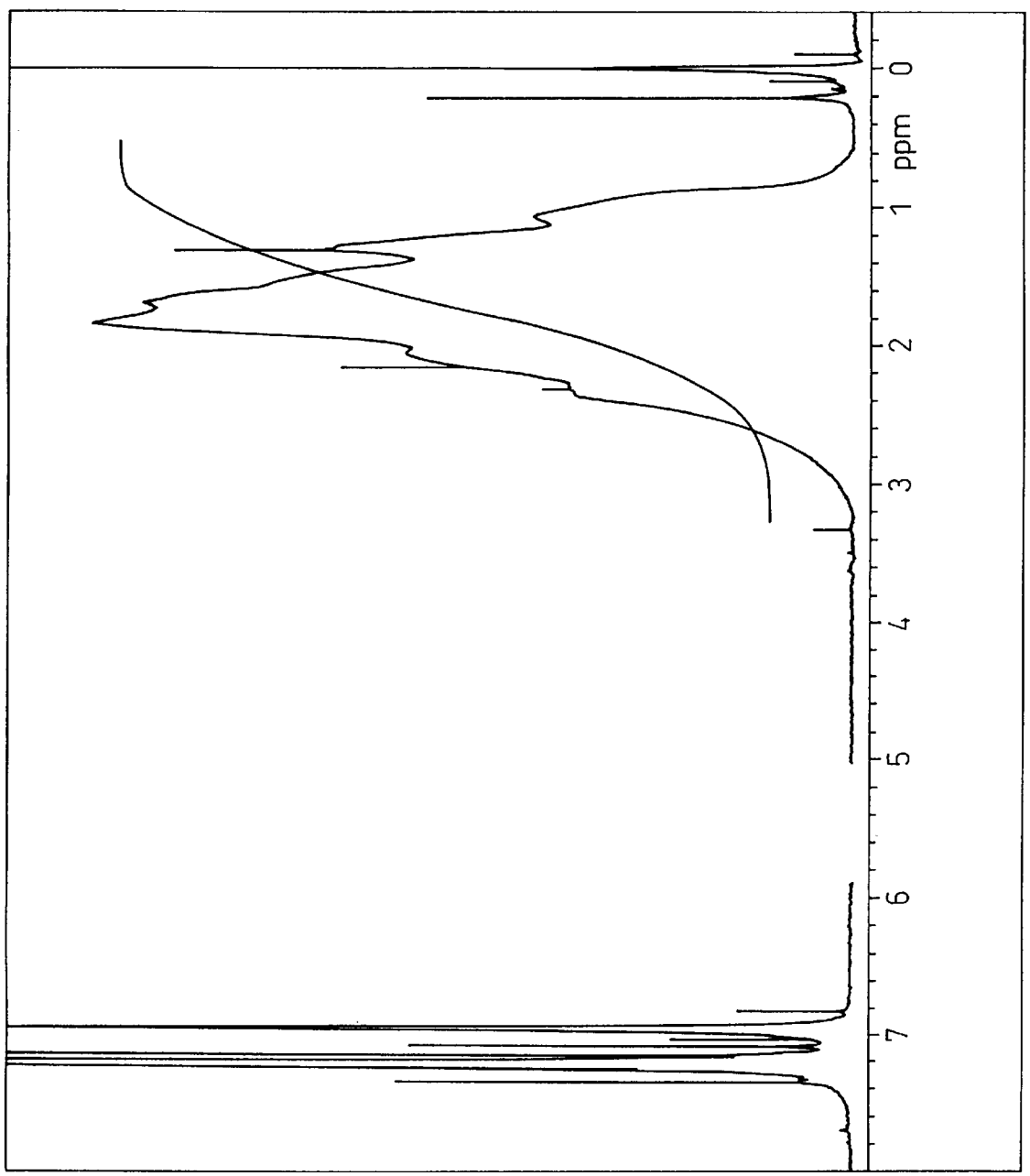

FIG. 9 is a $^1$H-NMR spectrum (400 MHz) of a hydrogenated homopolymer derived from a DCPD homopolymer obtained in Reference Example 1 using VOCl$_3$-Et$_2$AlCl as the catalyst. The measurement was made using deuterated o-dichlorobenzene at 80° C.

Figure 10:
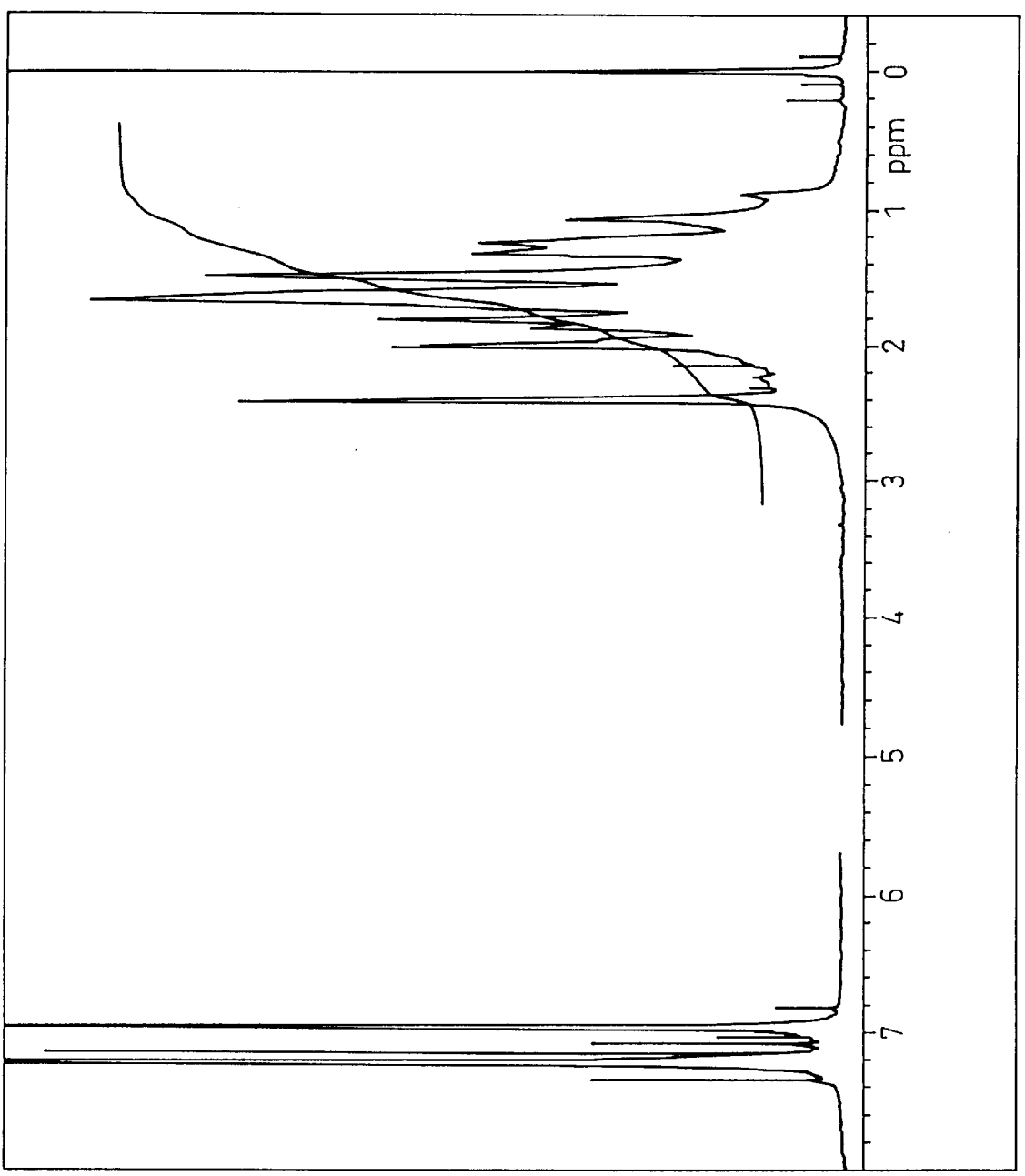

FIG. 10 is a $^1$H-NMR spectrum (400 MHz) of a hydrogenated copolymer derived from an ethylene-DCPD copolymer containing the DCPD component at 39% by mole, obtained in Reference Example 2 using VOCl$_3$-Et$_2$AlCl as the catalyst. The measurement was made using deuterated o-dichlorobenzene at 80° C.

Figure 11:
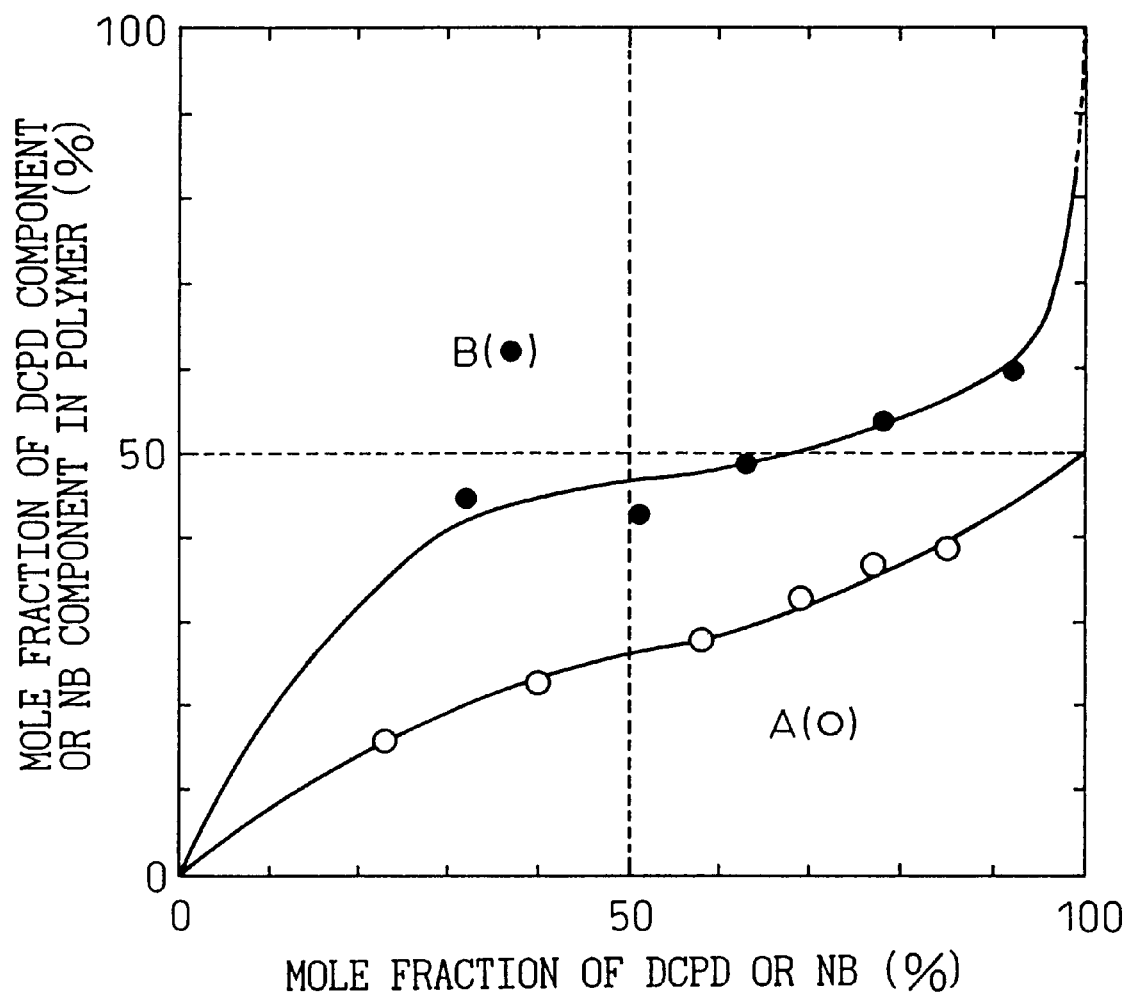

FIG. 11 shows the relationship between the ratio of the charged monomers and the composition ratio of the polymer product for copolymerization reactions, as determined for Reference Examples 5 and 6.

A: Curve representing the relationship between the charged DCPD mole fraction [DCPD/(ethylene+DCPD)] and the mole fraction of the DCPD component in the polymer product, for copolymerization of ethylene and DCPD using $^i$Pr(Cp)(Flu)ZrCl$_2$ as the metallocene. B: Curve representing the relationship between the charged NB mole fraction [NB/(ethylene+NB)] and the mole fraction of the NB component in the polymer product, for copolymerization of ethylene and NB using $^i$Pr(Cp)(Flu)ZrCl$_2$ as the metallocene.

Figure 12:
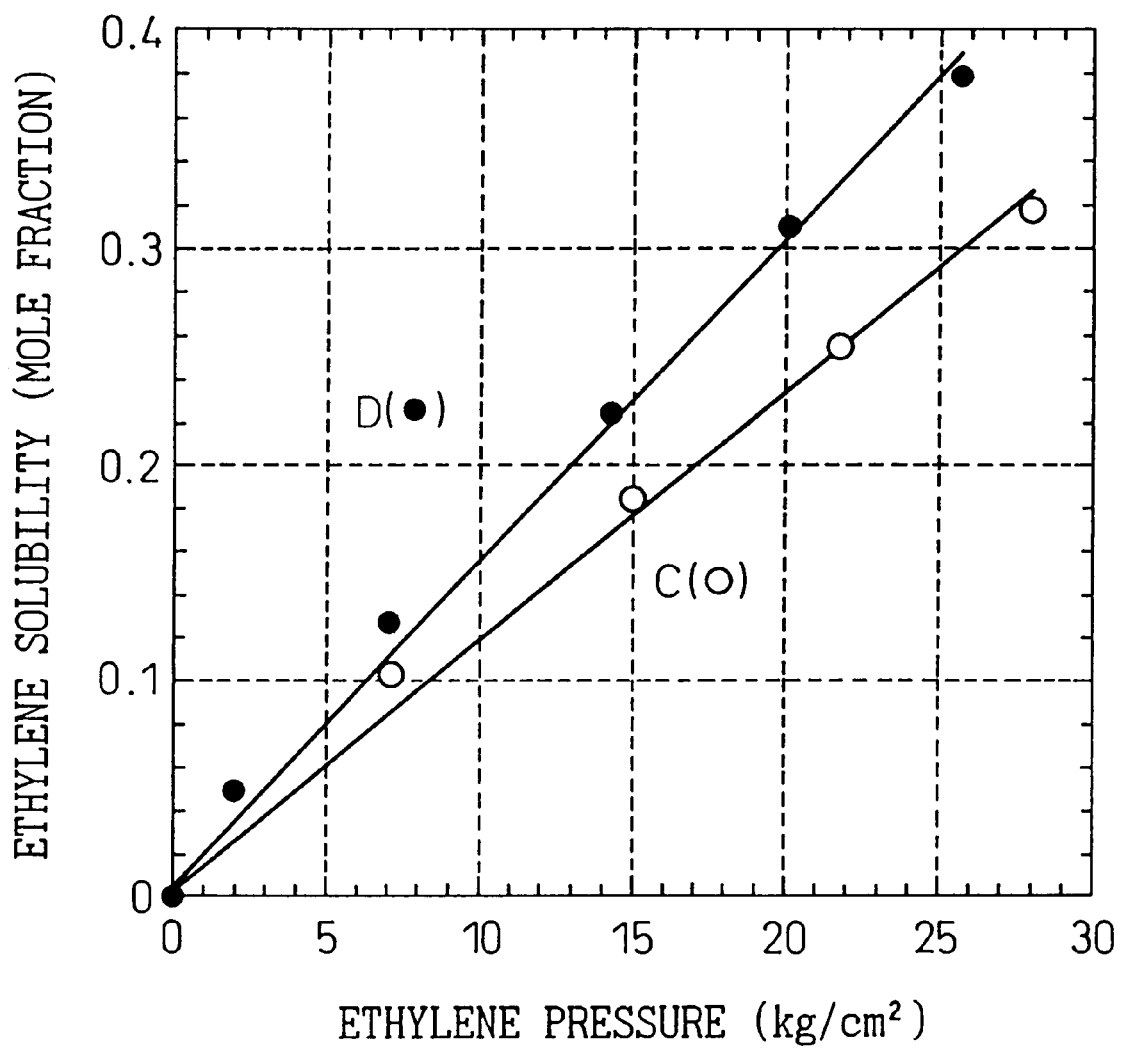

FIG. 12 shows the relationship between ethylene pressure and ethylene solubility (mole fraction) in toluene and DCPD at 40° C., as determined for Reference Examples 7 and 8.

C: Line representing the relationship between the ethylene pressure and ethylene solubility in toluene (mole fraction, ethylene/(ethylene+toluene)) at 40° C. D: Line representing the relationship between the ethylene pressure and ethylene solubility in DCPD (mole fraction, ethylene/(ethylene+DCPD)) at 40° C.

Figure 13:
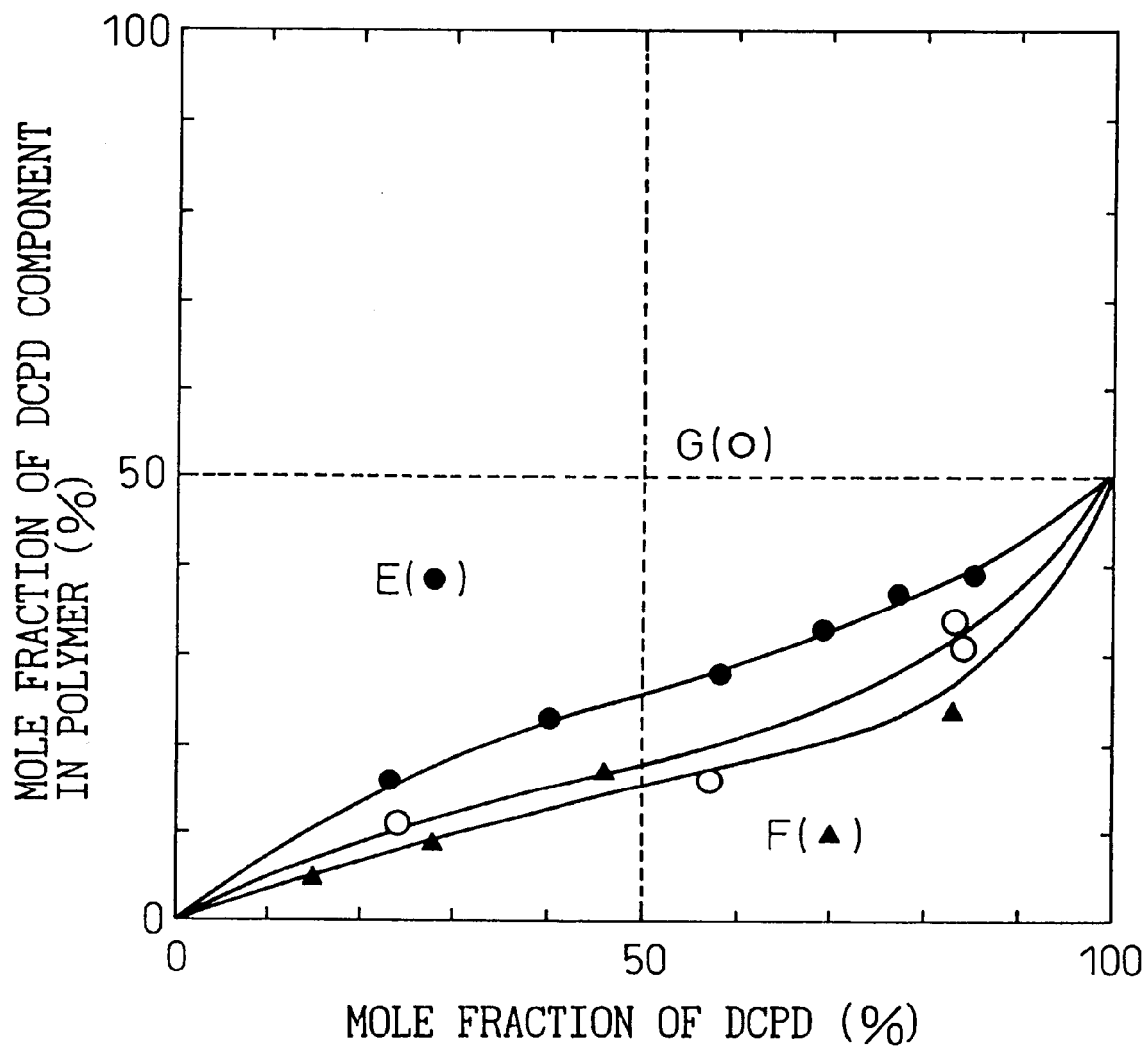

FIG. 13 shows the relationship between the charged DCPD mole fraction and the mole fraction of the DCPD component in the polymer product for a copolymerization reaction of ethylene and DCPD, as determined for Reference Examples 9, 10 and 11.

E: Curve representing the relationship between the charged DCPD mole fraction [DCPD/(ethylene+DCPD)] (%) and the mole fraction of the DCPD component in the polymer product (%), for copolymerization of ethylene and DCPD using $^i$Pr(Cp)(Flu)ZrCl$_2$ as the metallocene. F: Curve representing the relationship between the charged DCPD mole fraction [DCPD/(ethylene+DCPD)] (%) and the mole fraction of the DCPD component in the polymer product (%), for copolymerization of ethylene and DCPD using Et(Ind)$_2$ZrCl$_2$ as the metallocene. G: Curve representing the relationship between the monomer ratio [DCPD/(ethylene+DCPD)] (%) and the composition ratio of the DCPD component in the polymer product (%), for copolymerization of ethylene and DCPD using Me$_2$Si(Ind)$_2$ZrCl$_2$ as the metallocene.

Figure 14:
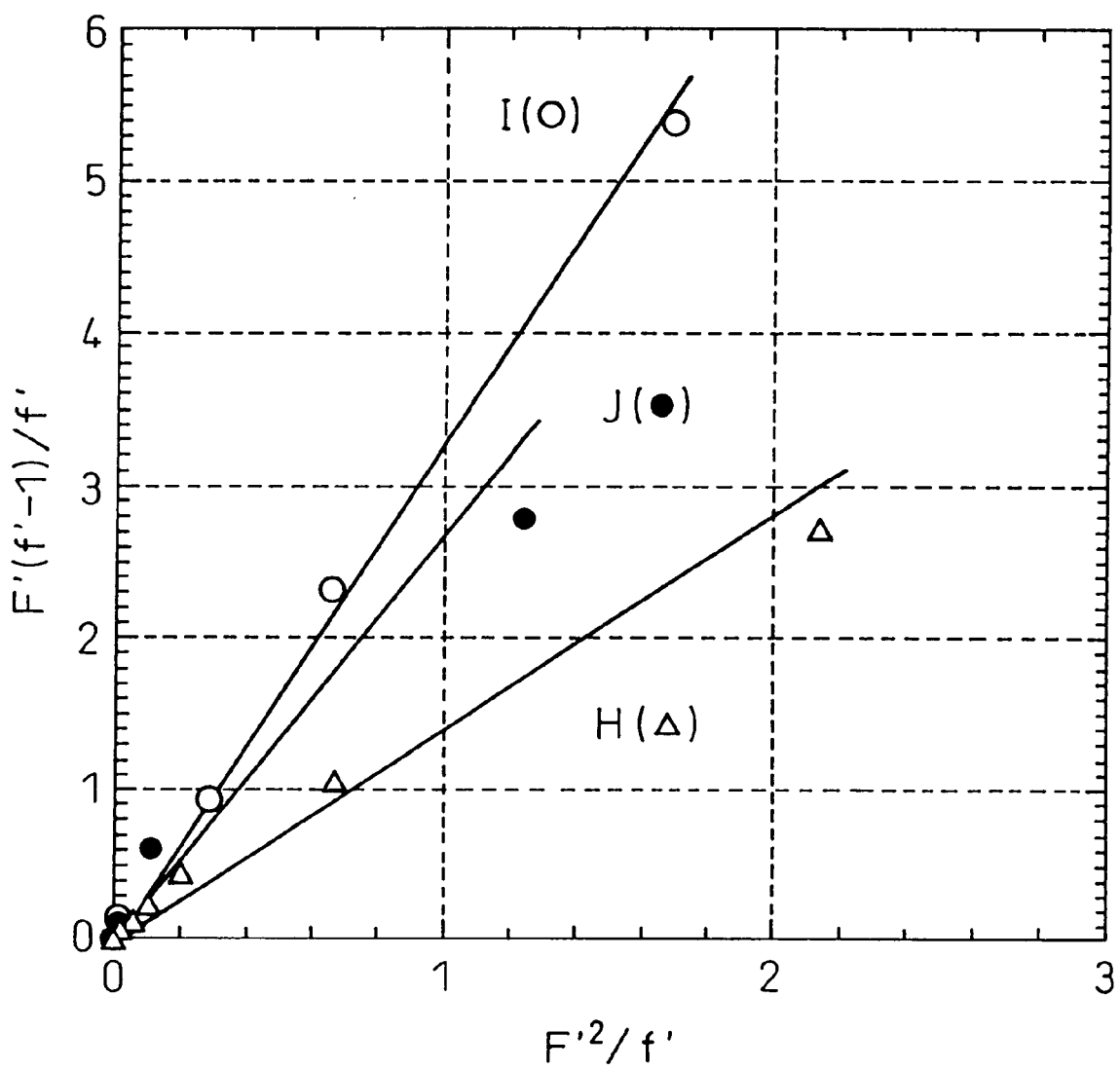

FIG. 14 is a plot between $F'^2/f'$ and $F'(f'-1)/f'$, by the Finemann-Ross method, executed for Reference Examples 9, 10 and 11. Here, F'=[ethylene]/[DCPD], and f'=ethylene component/DCPD component in the copolymer.

H: Line representing the relationship between $F'^2/f'$ and $F'(f'-1)/f'$ for copolymerization reaction of ethylene and DCPD using $^i$Pr(Cp)(Flu)ZrCl$_2$ as the metallocene. I: Line representing the relationship between $F'^2/f'$ and $F'(f'-1)/f'$ for copolymerization reaction of ethylene and DCPD using Et(Ind)$_2$ZrCl$_2$ as the metallocene. J: Line representing the relationship between $F'^2/f'$ and $F'(f'-1)/f'$ for copolymerization reaction of ethylene and DCPD using Me$_2$Si(Ind)$_2$ZrCl$_2$ as the metallocene.

BEST MODE FOR CARRYING OUT THE INVENTION

The present invention will now be explained in detail.

Copolymer (X)

Copolymer (X) according to the invention consists essentially of 0–39% by mole of an α-olefin component represented by the following formula (A) and 61–100% by mole of a cycloolefin component represented by the following formula (B).

(A)

wherein $R^1$ is a hydrogen atom or a saturated aliphatic hydrocarbon group of 1–16 carbon atoms. As saturated aliphatic hydrocarbon groups there may be mentioned alkyl groups of 1–16 carbon atoms, such as methyl, ethyl, propyl and butyl.

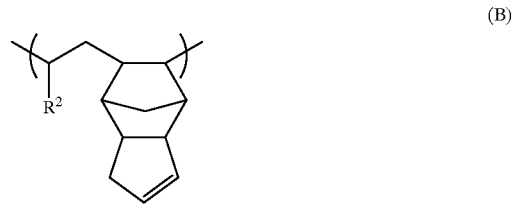
(B)

wherein $R^2$ is a hydrogen atom or a saturated aliphatic hydrocarbon group of 1–16 carbon atoms. As saturated aliphatic hydrocarbon groups there may be mentioned alkyl groups of 1–16 carbon atoms, such as methyl, ethyl, propyl and butyl.

The repeating unit represented by formula (A) above constitutes 0–39% by mole, preferably 1–38% by mole and more preferably 5–35% by mole of all of the repeating units. The repeating unit represented by formula (B) above constitutes 61–100% by mole, preferably 62–99% by mole and more preferably 65–95% by mole of the same.

Copolymer (X) has a reduced viscosity $\eta_{sp}/c$ in the range of 0.1–10 dl/g, and preferably 0.2–3 dl/g, at 30° C. in a 0.5 g/dl concentration toluene solution.

Copolymer (Y)

Copolymer (Y) according to the invention consists essentially of repeating units represented by the following formulas (A), (B), (C) and (D) below.

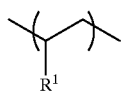
(A)

wherein $R^1$ is a hydrogen atom or a saturated aliphatic hydrocarbon group of 1–16 carbon atoms. As saturated aliphatic hydrocarbon groups there may be mentioned alkyl groups of 1–16 carbon atoms, such as methyl, ethyl, propyl and butyl.

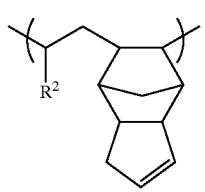
(B)

wherein $R^2$ is a hydrogen atom or a saturated aliphatic hydrocarbon group of 1–16 carbon atoms. As saturated aliphatic hydrocarbon groups there may be mentioned alkyl groups of 1–16 carbon atoms, such as methyl, ethyl, propyl and butyl.

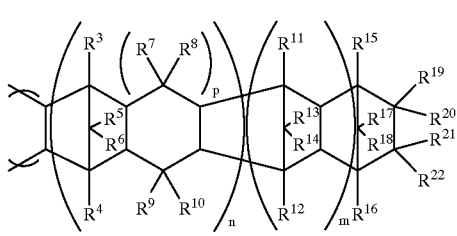
(C)

wherein n is 0 or 1; m is 0 or a positive integer of 1–3, preferably 0 or 1; p is 0 or 1; and $R_3$–$R_{22}$ are the same or different and each represents a hydrogen atom, a halogen atom, an aromatic hydrocarbon group of 6–10 carbon atoms or a saturated or unsaturated aliphatic hydrocarbon group of 1–12 carbon atoms. As aromatic hydrocarbon groups of 6–10 carbon atoms there may be mentioned aryl groups such as phenyl and naphthyl, and these may be substituted with an alkyl group of 1–3 carbon atoms such as methyl. As saturated aliphatic hydrocarbon groups of 1–12 carbon atoms there may be mentioned alkyl groups such as methyl and ethyl and cycloalkyl groups such as cyclopentyl and cyclohexyl. As unsaturated aliphatic hydrocarbon groups of 1–12 carbon atoms there may be mentioned alkenyl groups such as vinyl and propenyl.

Alternatively, $R^{19}$ and $R^{20}$ or $R^{21}$ and $R^{22}$ may together form an alkylidene group such as methylidene or ethylidene, or $R^{19}$ or $R^{20}$ and $R^{21}$ or $R^{22}$ may form, together with the two carbon atoms to which they bond, a ring which may contain at least one double bond or be an aromatic ring.

(D)

wherein q is an integer of 2–8, preferably 2, 3 or 4.

The composition ratios of [A], [B], [C] and [D] which represent the molar percents of the respective repeating units (A), (B), (C) and (D) in copolymer (Y) are as follows.

([A]+[B])/([C]+[D])=95–99.9/0.1–5, and preferably 95–98/2–5. [A]/[B]=0–39/61–100, and preferably 1–38/62–99. [D]/[C]=0–95/5–100, and preferably 0–80/20–100.

Copolymer (Y) has a reduced viscosity $\eta_{sp}/c$ in the range of 0.1–10 dl/g, and preferably 0.2–3 dl/g, as measured in a 0.5 g/dl concentration toluene solution at 30° C.

Production Process

As α-olefins to be supplied to the polymerization reaction system for the process of the invention there may be mentioned α-olefins of 2–18 carbon atoms, specifically ethylene, propylene, 1-butene, 1-hexene, 4-methyl-1-pentene, 1-octene, 1-decene, 1-dodecene, 1-tetradecene, 1-hexadecene and 1-octadecene. Ethylene and propylene are preferred among these from the standpoint of polymerization activity and molecular weight of the polymer, ethylene being especially preferred from the standpoint of molecular weight. These may be used alone or in combinations of 2 or more.

The cyclic olefin used according to the invention is DCPD, but if necessary for the properties of the polymer, a cyclic olefin represented by the following general formula (III) and/or (IV) may also be added to the polymerization system in a small amount within a range which does not prevent the object of the invention.

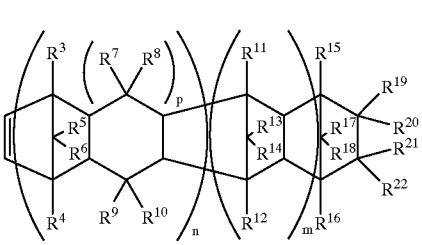
(III)

wherein n, m, p and $R^3$–$R^{22}$ are as defined for formula (C).

(IV)

wherein q is as defined for formula (D).

An amount of 10% by mole or less, and preferably 5% by mole or less with respect to the DCPD may be desirable.

According to the invention, a Kaminsky catalyst is used. As is well-known, Kaminsky catalysts comprise a metallocene and a promoter catalyst.

The metallocene used is preferably one represented by the following general formula (V).

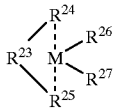

(V)

wherein M is a metal selected from the group consisting of titanium, zirconium and hafnium. $R^{26}$ and $R^{27}$ may be the same or different, and each is a hydrogen atom, a halogen atom, a saturated or unsaturated hydrocarbon group of 1–12 carbon atoms, an alkoxy group of 1–12 carbon atoms or an aryloxy group of 6–12 carbon atoms; $R^{24}$ and $R^{25}$ may be the same or different and each is a monocyclic or polycyclic hydrocarbon group which can form a sandwich structure with the central metal M; $R^{23}$ is a bridge linking $R^{24}$ and $R^{25}$, such as

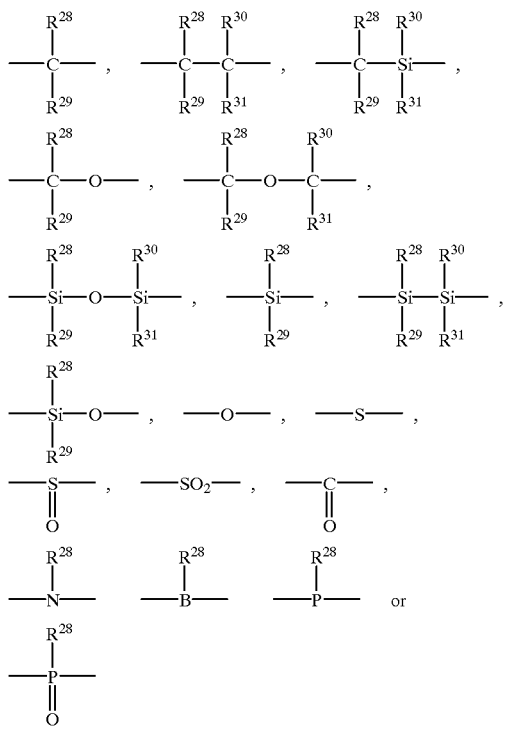

where $R^{28}$–$R^{31}$ may be the same or different, and each is a hydrogen atom, a halogen atom, a saturated or unsaturated hydrocarbon group of 1–12 carbon atoms, an alkoxy group of 1–12 carbon atoms or an aryloxy group of 6–12 carbon atoms, or alternatively $R^{28}$ and $R^{29}$ or $R^{30}$ and $R^{31}$ may form a ring.

The central metal M of the metallocene represented by formula (V) above is most preferably zirconium from the standpoint of catalyst activity. $R^{26}$ and $R^{27}$ may be either the same or different, and each is preferably an alkyl group of 1–6 carbon atoms or a halogen atom (especially chlorine). As preferred cyclic hydrocarbon groups for $R^{24}$ and $R^{25}$ there may be mentioned cyclopentadienyl, indenyl and fluorenyl. These may be substituted with hydrogen atoms, alkyl groups such as methyl, ethyl, isopropyl or tert-butyl, phenyl groups or benzyl groups. $R^{28}$–$R^{31}$ are preferably hydrogen atoms, alkyl groups of 1–6 carbon atoms or phenyl groups, and as preferred candidates for $R^{23}$ there may be mentioned lower alkylene groups such as methylene, ethylene and propylene, alkylidene groups such as isopropylidene, substituted alkylene groups such as diphenylmethylene, silylene groups and substituted silylene groups such as dimethylsilylene and diphenylsilylene.

The following compounds may be mentioned as metallocenes having zirconium as the central metal M.

Dimethylsilylene-bis(1-indenyl)zirconium dichloride, diphenylsilylene-bis(1-indenyl)zirconium dichloride, dibenzylsilylene-bis(1-indenyl)zirconium dichloride, methylene-bis(1-indenyl)zirconium dichloride, ethylene-bis (1-indenyl)zirconium dichloride, diphenylmethylene-bis(1-indenyl)zirconium dichloride, isopropylidene-bis(1-indenyl)zirconium dichloride, phenylmethylsilylene-bis(1-indenyl)zirconium dichloride, dimethylsilylene-bis[1-(2,4,7-trimethyl)indenyl]zirconium dichloride, diphenylsilylene-bis[1-(2,4,7-trimethyl)indenyl]zirconium dichloride, dibenzylsilylene-bis[1-(2,4,7-trimethyl)indenyl]zirconium dichloride, methylene-bis[1-(2,4,7-trimethyl)indenyl]zirconium dichloride, ethylene-bis[1-(2,4,7-trimethyl) indenyl]zirconium dichloride, diphenylmethylene-bis[1-(2, 4,7-trimethyl)indenyl]zirconium dichloride, isopropylidene-bis[1-(2,4,7-trimethyl)indenyl]zirconium dichloride, phenylmethylsilylene-bis[1-(2,4,7-trimethyl)indenyl] zirconium dichloride, dimethylsilylene-bis[1-(2,4-dimethyl)indenyl]zirconium dichloride, diphenylsilylene-bis[1-(2,4-dimethyl)indenyl]zirconium dichloride, dibenzylsilylene-bis[1-(2,4-dimethyl)indenyl]zirconium dichloride, methylene-bis[1-(2,4-dimethyl)indenyl]zirconium dichloride, ethylene-bis[1-(2,4-dimethyl)indenyl] zirconium dichloride, diphenylmethylene-bis[1-(2,4-dimethyl)indenyl]zirconium dichloride, isopropylidene-bis [1-(2,4-dimethyl)indenyl]zirconium dichloride, phenylmethylsilylene-bis[1-(2,4-dimethyl)indenyl] zirconium dichloride, dimethylsilylene-bis[1-(4,5,6,7-tetrahydro)indenyl]zirconium dichloride, diphenylsilylene-bis[1-(4,5,6,7-tetrahydro)indenyl]zirconium dichloride, dibenzylsilylene-bis[1-(4,5,6,7-tetrahydro)indenyl] zirconium dichloride, methylene-bis[1-(4,5,6,7-tetrahydro) indenyl]zirconium dichloride, ethylene-bis[1-(4,5,6,7-tetrahydro)indenyl]zirconium dichloride, diphenylmethylene-bis[1-(4,5,6,7-tetrahydro)indenyl] zirconium dichloride, isopropylidene-bis[1-(4,5,6,7-tetrahydro)indenyl]zirconium dichloride, phenylmethylsilylene-bis[1-(4,5,6,7-tetrahydro)indenyl] zirconium dichloride, dimethylsilylene-(9-fluorenyl) (cyclopentadienyl)zirconium dichloride, diphenylsilylene-(9-fluorenyl)(cyclopentadienyl)zirconium dichloride, dibenzylsilylene-(9-fluorenyl)(cyclopentadienyl)zirconium dichloride, methylene-(9-fluorenyl)(cyclopentadienyl) zirconium dichloride, ethylene-(9-fluorenyl) (cyclopentadienyl)zirconium dichloride, diphenylmethylene-(9-fluorenyl)(cyclopentadienyl) zirconium dichloride, isopropylidene-(9-fluorenyl) (cyclopentadienyl)zirconium dichloride, phenylmethylsilylene-(9-fluorenyl)(cyclopentadienyl) zirconium dichloride, dimethylsilylene-(9-fluorenyl)[1-(3-tert-butyl)cyclopentadienyl]zirconium dichloride, diphenylsilylene-(9-fluorenyl)[1-(3-tert-butyl) cyclopentadienyl]zirconium dichloride, dibenzylsilylene-(9-fluorenyl)1-(3 tert-butyl)cyclopentadienyl]zirconium dichloride, methylene-(9-fluorenyl)[1-(3-tert-butyl) cyclopentadienyl]zirconium dichloride, ethylene-(9-fluorenyl)[1-(3-tert-butyl)cyclopentadienyl]zirconium dichloride, diphenylmethylene-(9-fluorenyl)[1-(3-tert-butyl)cyclopentadienyl]zirconium dichloride, isopropylidene-(9-fluorenyl)[1-(3-tert-butyl) cyclopentadienyl]zirconium dichloride, phenylmethylsilylene-(9-fluorenyl)[1-(3-tert-butyl)

cyclopentadienyl]zirconium dichloride, dimethylsilylene-(9-fluorenyl)[1-(3-methyl)cyclopentadienyl]zirconium dichloride, diphenylsilylene-(9-fluorenyl)[1-(3-methyl) cyclopentadienyl]zirconium dichloride, dibenzylsilylene-(9-fluorenyl)[1-(3-methyl)cyclopentadienyl]zirconium dichloride, methylene-(9-fluorenyl)[1-(3-methyl) cyclopentadienyl]zirconium dichloride, ethylene-(9-fluorenyl)[1-(3-methyl)cyclopentadienyl]zirconium dichloride, diphenylmethylene-(9-fluorenyl)[1-(3-methyl) cyclopentadienyl]zirconium dichloride, isopropylidene-(9-fluorenyl)[1-(3-methyl)cyclopentadienyl]zirconium dichloride, phenylmethylsilylene-(9-fluorenyl)[1-(3-methyl)cyclopentadienyl]zirconium dichloride, dimethylsilylene-[9-(2,7-di-tert-butyl)fluorenyl](cyclopentadienyl)zirconium dichloride, diphenylsilylene-[9-(2,7-di-tert-butyl)fluorenyl](cyclopentadienyl)zirconium dichloride, dibenzylsilylene-[9-(2,7-di-tert-butyl)fluorenyl](cyclopentadienyl)zirconium dichloride, methylene-[9-(2,7-di-tert-butyl)fluorenyl](cyclopentadienyl)zirconium dichloride, ethylene-[9-(2,7-di-tert-butyl)fluorenyl](cyclopentadienyl)zirconium dichloride, diphenylmethylene-[9-(2,7-di-tert-butyl)fluorenyl](cyclopentadienyl)zirconium dichloride, isopropylidene-[9-(2,7-di-tert-butyl)fluorenyl](cyclopentadienyl)zirconium dichloride, phenylmethylsilylene-[9-(2,7-di-tert-butyl) fluorenyl](cyclopentadienyl)zirconium dichloride, dimethylsilylene-(1-indenyl)(cyclopentadienyl)zirconium dichloride, diphenylsilylene-(1-indenyl)(cyclopentadienyl) zirconium dichloride, dibenzylsilylene-(1-indenyl) (cyclopentadienyl)zirconium dichloride, methylene-(1-indenyl)(cyclopentadienyl)zirconium dichloride, ethylene-(1-indenyl)(cyclopentadienyl)zirconium dichloride, diphenylmethylene-(1-indenyl)(cyclopentadienyl) zirconium dichloride, isopropylidene-(1-indenyl) (cyclopentadienyl)zirconium dichloride, phenylmethylsilylene-(1-indenyl)(cyclopentadienyl) zirconium dichloride, dimethylsilylene-bis (cyclopentadienyl)zirconium dichloride, diphenylsilylene-bis(cyclopentadienyl)zirconium dichloride, dibenzylsilylene-bis(cyclopentadienyl)zirconium dichloride, methylene-bis(cyclopentadienyl)zirconium dichloride, ethylene-bis(cyclopentadienyl)zirconium dichloride, diphenylmethylene-bis(cyclopentadienyl) zirconium dichloride, isopropylidene-bis(cyclopentadienyl) zirconium dichloride, phenylmethylsilylene-bis (cyclopentadienyl)zirconium dichloride, isopropylidene-(1-indenyl)[1-(3-tert-butyl)cyclopentadienyl]zirconium dichloride, isopropylidene-(9-fluorenyl)[1-(3-isopropyl) cyclopentadienyl]zirconium dichloride, isopropylidene-[1-(2,4,7-trimethyl)indenyl](cyclopentadienyl)zirconium dichloride, ethylene-(cyclopentadienyl)[1-(3-tert-butyl) cyclopentadienyl]zirconium dichloride, ethylene-(cyclopentadienyl)[1-(3-phenyl)cyclopentadienyl] zirconium dichloride, isopropylidene-(9-fluorenyl) (cyclopentadienyl)zirconium dibromide, dimethylsilylene-bis(1-indenyl)zirconium dibromide, ethylene-bis(1-indenyl) methyl zirconium monochloride.

As particularly preferred metallocenes according to the invention there may be mentioned isopropylidene-(9-fluorenyl)(cyclopentadienyl)zirconium dichloride, diphenylmethylene-(9-fluorenyl)(cyclopentadienyl) zirconium dichloride, isopropylidene-(9-fluorenyl)[1-(3-methyl)cyclopentadienyl]zirconium dichloride, isopropylidene-(9-fluorenyl)[1-(3-tert-butyl) cyclopentadienyl]zirconium dichloride, isopropylidene-(1-indenyl)(cyclopentadienyl)zirconium dichloride, dimethylsilylene-bis(1-indenyl)zirconium dichloride, ethylene-bis(1-indenyl)zirconium dichloride and isopropylidene-bis(1-indenyl)zirconium dichloride.

The concentration of the metallocene will generally be determined depending on its polymerization activity, but it may be desirable to use it at a concentration of $10^{-6}$ to $10^{-2}$ moles, and preferably $10^{-5}$ to $10^{-3}$ moles to 1 mole of DCPD, based on the DCPD added to the polymerization reaction system.

The organic aluminum oxide compound aluminoxane is preferred for use as the promoter catalyst. Examples of aluminoxane may be given as general formula (VI) below for linear structures and as general formula (VII) below for cyclic structures.

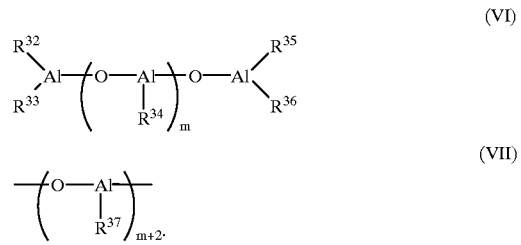

In formulas (VI) and (VII), $R^{32}$–$R^{37}$ may be the same or different, and each is an alkyl group of 1–6 carbon atoms such as methyl, ethyl, propyl or butyl, a phenyl group or a benzyl group, being preferably methyl or ethyl and especially methyl. Letter m represents an integer of 2 or greater, and preferably an integer from 5 to 100.

Aluminoxane may be produced by a conventionally known process, such as reaction of a compound containing absorbed water or a salt containing water of crystallization (for example, copper sulfate hydrate) with an organic aluminum compound such as trialkylaluminum, in an inert solvent (such as toluene). The aluminoxane may also contain a small amount of an organic aluminum compound resulting from the production process.

The aluminoxane can be used to activate the metallocene for polymerization activity. The metallocene is activated in solution, preferably by dissolving the metallocene in a solution of the aluminoxane. The solvent used for this activation is preferably an aliphatic hydrocarbon or aromatic hydrocarbon, with toluene being particularly preferred. The activation of the metallocene with the aluminoxane is usually carried out before its use in the polymerization reaction, and the time spent for the activation is from one minute to 10 hours, preferably from 3 minutes to one hour. The activation is accomplished in a temperature range of from –40 to 110° C., and preferably from 0 to 80° C.

The concentration of the aluminoxane solution is not particularly restricted within a range from 1% by weight to the saturation limit, but it is preferred to be 5–30% by weight. The ratio of the aluminoxane to the metallocene is 30 to 20,000 moles, and preferably 100 to 5,000 moles, to 1 mole of the metallocene. An amount of aluminoxane which is too small with respect to the metallocene is undesirable because sufficient polymerization activity cannot be achieved. Conversely, an amount of aluminoxane which is too large is uneconomical despite higher polymerization activity, since more of the expensive aluminoxane is used, while it is also undesirable because it renders purification after polymerization more difficult.

Ionic boron compounds may be mentioned as promoter catalysts which are suitable for use in addition aluminoxane. Specifically, ionic boron compounds are compounds represented by the following general formulas (VIII) to (XI).

[R$^{38}_3$C]$^+$[BR$^{39}_4$]$^-$ (VIII)

[R$^{38}_x$NH$_{4-x}$]$^+$[BR$^{39}_4$]$^-$ (IX)

[R$^{38}_x$PH$_{4-x}$]$^+$[BR$_{394}$]$^-$ (X)

Li$^+$[BR$^{39}_4$]$^-$ (XI)

Each R$^{38}$ in formulas (VIII) to (XI) is the same or different, and represents an aliphatic hydrocarbon group of 1–8 carbon atoms or an aromatic hydrocarbon group of 6–18 carbon atoms. Each R$^{39}$ is the same or different and represents an aromatic hydrocarbon group of 6–18 carbon atoms. Letter x is 1, 2, 3 or 4.

As examples of R$^{38}$ in the ionic boron compounds represented by formulas (VIII) to (XI) above there may be mentioned alkyl groups such as methyl, ethyl, propyl and butyl, and aryl groups such as phenyl. As R$^{39}$ there are preferred fluorinated and partially fluorinated aromatic hydrocarbon groups, among which pentafluorophenyl is particularly preferred. It is preferred for x to be 3.

As specific compounds there may be mentioned N,N-dimethylanilinium-tetrakis(pentafluorophenyl)borate, trityl-tetrakis(pentafluorophenyl)borate and lithium-tetrakis (pentafluorophenyl)borate.

The ionic boron compound serves to stabilize the metallocene which has been converted to a cation, and therefore the use of an appropriate alkylating agent for initial cationization of the metallocene is preferred from the standpoint of smoothly promoting polymerization. As preferred alkylating agents there may be mentioned alkyllithium compounds and alkylaluminum compounds, specifically methyllithium, butyllithium, trimethylaluminum, triethylaluminum, triisobutylaluminum and tri-n-butylaluminum.

The ratio of the ionic boron compound to the metallocene may be 0.5–10 moles, preferably 0.8–3 moles and more preferably 0.9–1.5 moles of the ionic boron compound to 1 mole of the metallocene. The alkylating agent is used at 2–500 moles to 1 mole of the metallocene. The amount of ionic boron compound required with respect to the metallocene is vastly reduced as compared with using aluminoxane as the promoter catalyst, while the catalytic activity also tends to be higher. It is therefore possible to minimize the amount of the metallocene and promoter catalyst, thus providing a major advantage in terms of cost and in terms of purification after polymerization.

These promoter catalysts are generally used either directly or in the form of solution in a hydrocarbon solvent (such as toluene), as already mentioned, but they may also be supported on a carrier for use. Suitable carriers include inorganic compounds such as silica gel and alumina, and fine polyolefin powders of polyethylene, polypropylene and the like.

According to the invention, the polymerization reaction is normally carried out using a hydrocarbon solvent. The hydrocarbon solvent dissolves not only DCPD and the α-olefin but also the resulting polymer. The hydrocarbon solvent dissolves the catalyst used and does not deactivate the catalyst. Specific examples are aliphatic hydrocarbons such as pentane, hexane, octane and decane, alicyclic hydrocarbons such as cyclopentane, cyclohexane and cyclooctane, and aromatic hydrocarbons such as benzene, toluene and xylene. In terms of the solubility of these raw materials, the resulting polymer and the catalyst, preferred among these hydrocarbon solvents are aromatic hydrocarbons, among which toluene is especially preferred for use. Depending upon the catalyst, however, cyclohexane is also preferably used.

Figure 1:
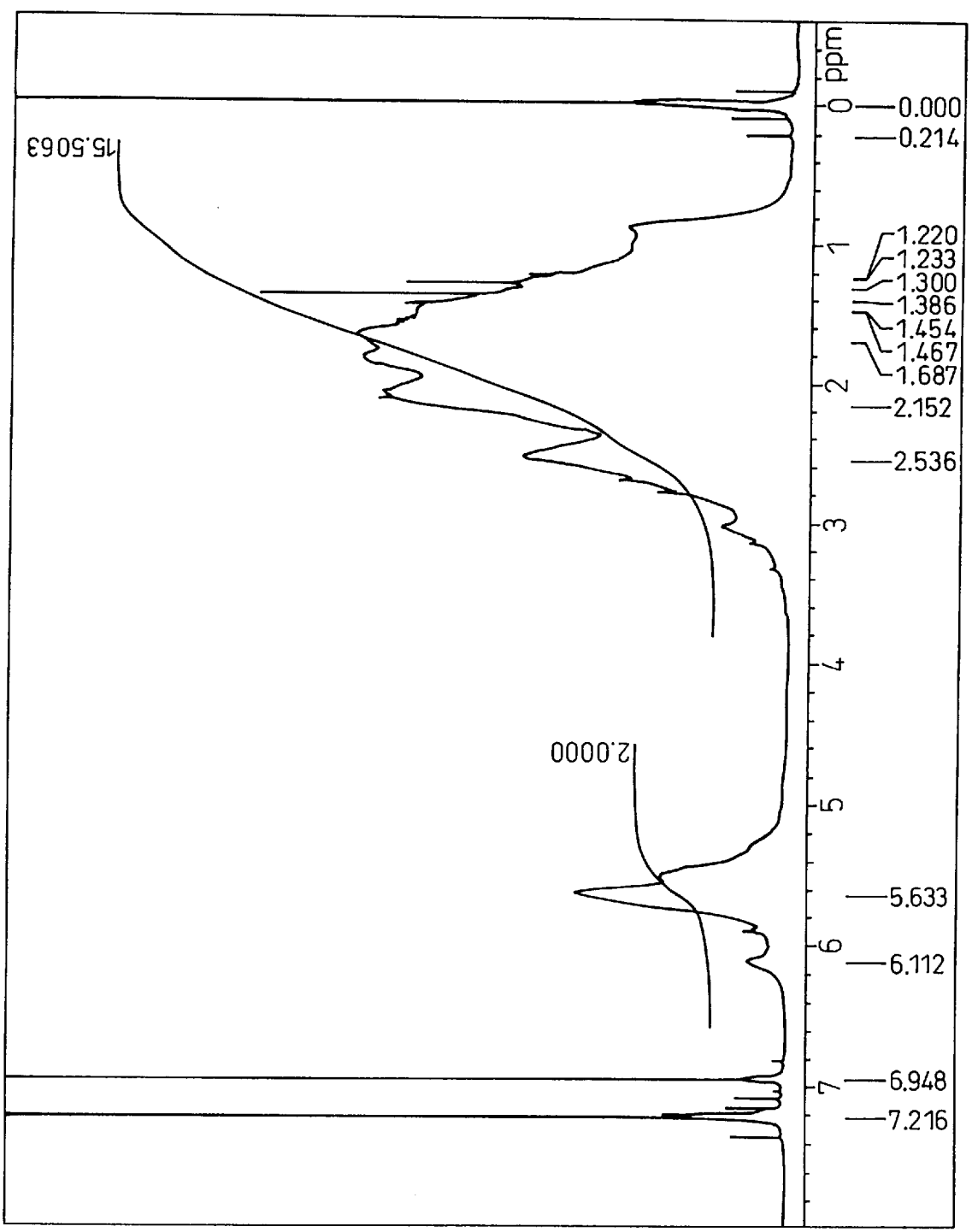
FIG. 1 is a $^1$H-NMR spectrum (400 MHz) of a DCPD homopolymer obtained in Reference Example 1 using $VOCl_3$-$Et_2AlCl$ as the catalyst. The measurement was made using deuterated o-dichlorobenzene at 80° C.
Figure 2:
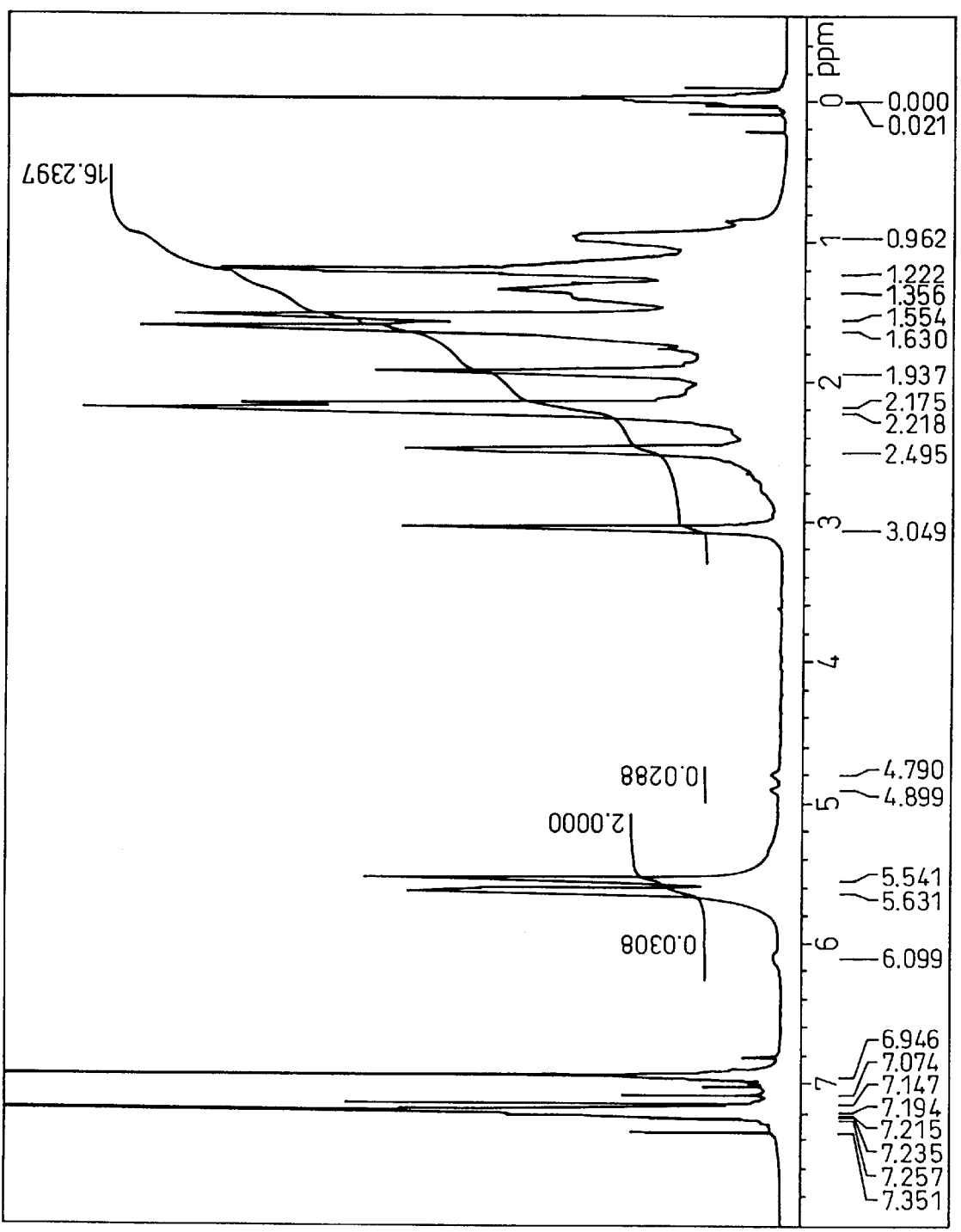
FIG. 2 is a $^1$H-NMR spectrum (400 MHz) of an ethylene-DCPD copolymer containing the DCPD component at 39% by mole, obtained in Reference Example 2 using $VOCl_3$-$Et_2AlCl$ as the catalyst. The measurement was made using deuterated o-dichlorobenzene at 80° C.

$^1$H-NMR spectrum analysis has shown that ethylene-DCPD copolymers obtained with Kaminsky catalysts contain virtually no chains of the DCPD component. As already mentioned, vanadium catalysts can give ethylene-DCPD copolymers with any desired proportion of the DCPD component; FIG. 1 and FIG. 2 show $^1$H-NMR spectra of a DCPD homopolymer and an ethylene-DCPD copolymer containing 39% by mole of the DCPD component, obtained using vanadium catalysts.

Figure 3:
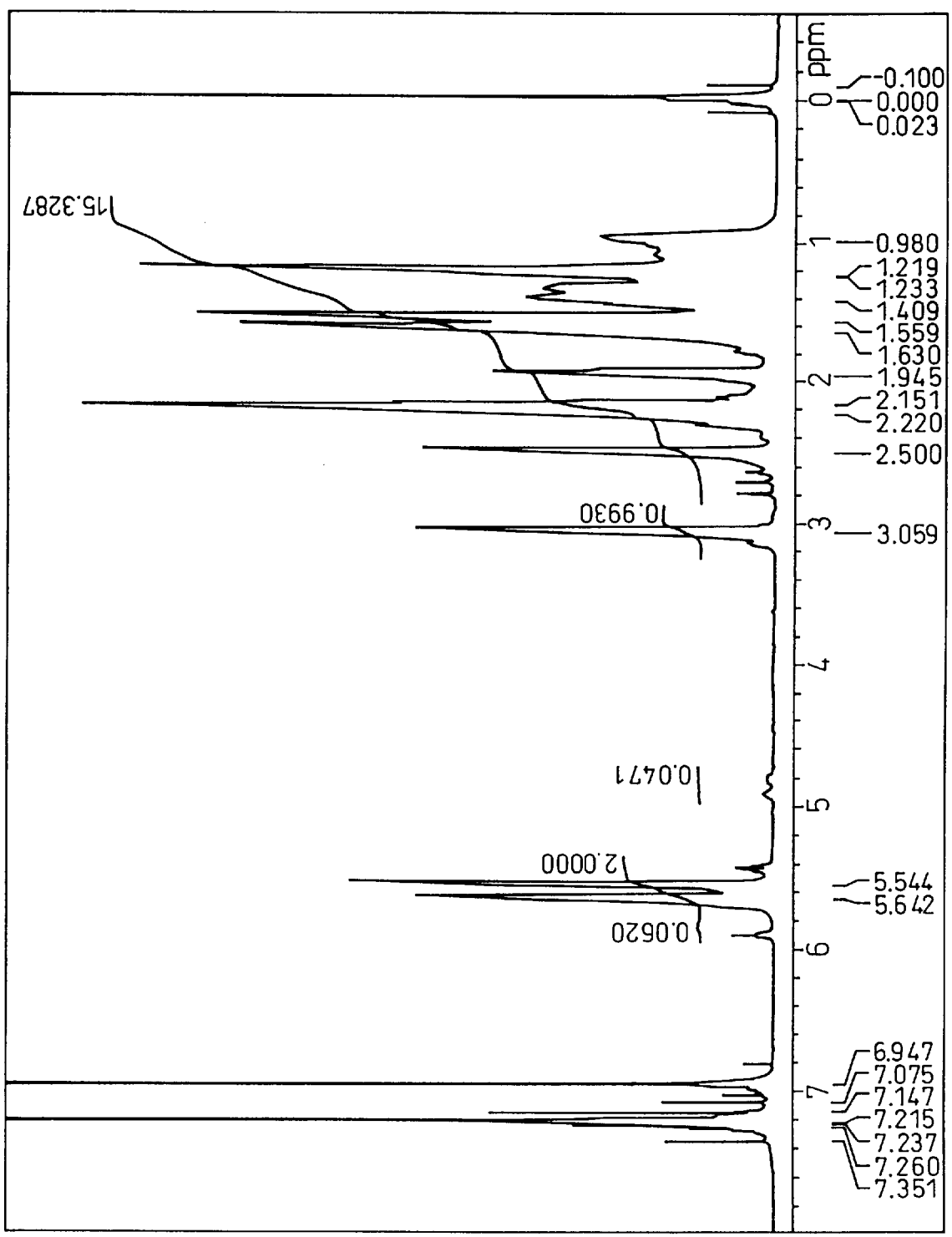
FIG. 3 is a $^1$H-NMR spectrum (400 MHz) of an ethylene-DCPD copolymer containing the DCPD component at 39% by mole, obtained in Example 2 using isopropylidene-(9-fluorenyl)(cyclopentadienyl)zirconium dichloride [$^i$Pr(Cp)(Flu)ZrCl_2$]-PMAO (polymethylaluminoxane) as the catalyst. The measurement was made using deuterated o-dichlorobenzene at 80° C.
Figure 4:
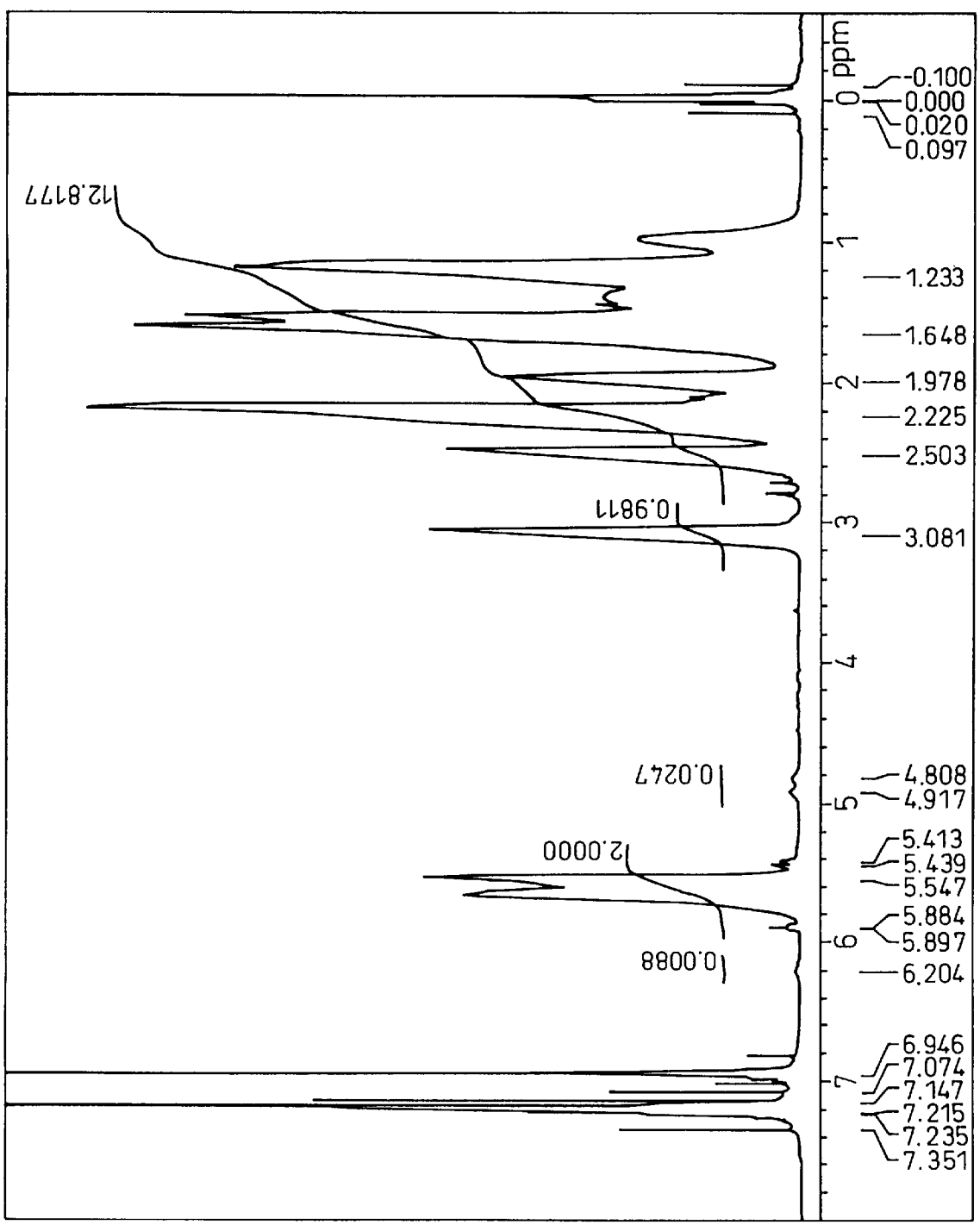
FIG. 4 is a $^1$H-NMR spectrum (400 MHz) of an ethylene-DCPD copolymer containing the DCPD component at 50% by mole, obtained in Reference Example 4 using $^i$Pr(Cp)

FIG. 3 and FIG. 4 show $^1$H-NMR spectra of an ethylene-DCPD copolymer containing 39% by mole of the DCPD component and an ethylene-DCPD copolymer containing 50% by mole of the DCPD component, obtained using Kaminsky catalysts.

From the homopolymer spectrum in FIG. 1 it is seen that a broad alkyl group signal is observed near 0.6–3.4 ppm when DPCD component linkages are produced. From the copolymer spectrum in FIG. 2 it is seen that the broad signal still appears, overlaid with sharp signals, even though the DCPD component mole fraction is 39% by mole, namely much less than 50% by mole.

In contrast, with a copolymer having the same composition ratio obtained using a Kaminsky catalyst (FIG. 3), virtually no broad signal appears, as can be seen from the deep valley (gaps) in the signal around 1.85 ppm. The same was found with the copolymer containing the maximum of 50% by mole of the DCPD component (FIG. 4).

On the other hand, it is clear that the copolymer of the present invention contains, unless it is a completely alternating polymer, linkages of at least two continuous ethylene component units. In general, as the mole fraction of the DCPD component is decreased, not only linkages of two ethylene units but also linkages of three or more ethylene units are inevitably produced. If the ethylene units in the linkages are increased, unfavorable crystalline components are produced. This may be understood from the $^1$H-NMR spectrum of a copolymer in which the DCPD component is contained at 28% by mole, i.e., the ethylene component is contained at 72% by mole, as shown in FIG. 5. The spectrum has a sharp and strong peak around δ 1.3 ppm assignable to a linkage of multiple continuous ethylene units. Contrary to this, the copolymer obtained in Reference Example 2 exhibits no peak assignable to a linkage in the form of an ethylene component block as shown in FIG. 3, despite that the polymer contains the ethylene component at 61% by mole.

As clearly seen from the above, as the measure for evaluating the enhanced level of alternation of the copolymer of the present invention, there may be adopted a measure corresponding to the linkage between the DCPD component units and a measure corresponding to the linkage in which the ethylene component units are linked together in a block form. As the former measure, a ratio ($H_{1.85}/H_{3.05}$) of the intensity ($H_{1.85}$) of the valley at (δ 1.85 ppm to the intensity ($H_{3.05}$) of the peak at δ 3.05 ppm in the $^1$H-NMR spectrum thereof is preferably employed. This is because one of the highest peaks of a copolymer consisting exclusively of DCPD-DCPD linkages which cannot be obtained by the process of the present invention but can be obtained using a Ziegler-Natta catalyst is just located in the valley at δ 1.85 as shown in FIG. 1. Of course, since the valley is sandwiched between two adjacent strong peaks, it is affected by their bases. Therefore, the $H_{1.85}/H_{3.05}$ ratio cannot be 0, but it may constitute a good measure. The $H_{1.85}/H_{3.05}$ ratio obtained in the present invention may be not more than 0.15, preferably not more than 0.1. For example, the copolymer containing DCPD linkages obtained in Reference Example 2 exhibits an $H_{1.85}/H_{3.05}$ ratio of 0.28 which is much larger than 0.15 (FIG. 2). Contrary to this, the copolymer containing no DCPD-DCPD linkage obtained in Reference Example 4 exhibits an $H_{1.85}/H_{3.05}$ ratio of 0.06 and the copolymer containing no DCPD-DCPD linkage obtained in Example 2 exhibits an $H_{1.85}/H_{3.05}$ ratio of 0.03, which are much smaller than 0.15.

On the other hand, as the measure for indicating the ethylene block linkage, there may be mentioned a ratio $(I_{1.3}/I_{3.05})$ of the peak area $(I_{1.3})$ at δ 1.3 ppm assignable to a polyethylene and/or ethylene component block to the peak area $(I_{3.05})$ at δ 3.05 ppm in the $^1$H-NMR spectrum of the polymer. In the present invention, the $1/4\times(I_{1.3}/I_{3.05})$ may be not more than 0.05, more preferably not more than 0.03. Here, 1/4 is a correction factor corresponding to the 4 protones contained in one ethylene component, and δ 3.05 corresponding to one methine proton in the DCPD component.

In other words, it was shown that ethylene-DCPD copolymers obtained using Kaminsky catalysts differ from those obtained using vanadium catalysts in that they contain virtually no DCPD component chains, and therefore a higher mole fraction of the DCPD component results in higher alternating copolymerization.

According to the production process of the present invention, the monomer ratio (F) of the polymerization reaction system is controlled. One means of assessing monomer reactivity in a copolymerization reaction is to utilize a copolymerization curve indicating the correlation between the charged monomer ratio and the composition ratio of the polymer product.

FIG. 11 shows copolymerization curves for an ethylene-DCPD copolymer and an ethylene-NB copolymer, obtained using a typical metallocene with mirror symmetry, isopropylidene-(9-fluorenyl)(cyclopentadienyl)zirconium dichloride. Because virtually no DCPD component linkages are produced, however large F may be, the mole fraction of the DCPD component in the resulting copolymer is higher but never increases above 50% by mole (see Reference Example 4). Thus, by carrying out the polymerization with the DCPD always present in excess of the ethylene in the polymerization reaction system, that is, with F kept at above a given value, there will be a more highly alternating sequence of the ethylene and DCPD components in the copolymer, thus giving an ethylene-DCPD copolymer with high level of alternation and also high chemical homogeneity.

According to FIG. 11, it is possible in principle to obtain ethylene-NB copolymers as well with high level of alternation by carrying out the polymerization with the monomer ratio in a prescribed range, but in practice it is rather difficult to maintain the monomer ratio in a prescribed range with a fixed maximum and minimum. However, it is a feature of the present invention that only the minimum monomer ratio (F) is fixed, allowing much easier control of the reaction. An even more advantageous feature is that production of copolymers containing crystalline polyethylene or partial crystalline ethylene blocks can be drastically minimized.

For example, a typical metallocene with $C_2$ symmetry, ethylene-bis(1-indenyl)zirconium dichloride, is known to produce copolymers containing polyethylene and ethylene blocks upon copolymerization of ethylene and NB, but when this metallocene is used for the present invention, production of such crystalline polymers is drastically reduced. This occurs because the polymerization is conducted with a minimum amount of ethylene relative to the cyclic olefin, as a feature of the invention.

The monomer ratio (F) for the first process according to the invention is 4 or greater, and preferably 5.5 or greater. It is undesirable for F to be less than 4 because this will increase the ethylene component in the copolymer, thus lowering the chemical homogeneity, and will also lower the heat resistance (glass transition temperature). According to the first process of the invention, F must be maintained in the value range mentioned above during the period from the start of polymerization until the conversion of the DCPD added to the polymerization reaction system reaches 60%.

Also, as already mentioned, a copolymerization curve indicating the correlation between the charged monomer ratio and the composition ratio of the polymer product is commonly used to assess monomer reactivity in a copolymerization reaction. This is obtained by conducting polymerization with various different monomer compositions, and determining the composition of the copolymers produced at the initial stage of the polymerization reaction (conversion of a few percent). For copolymerization between monomers $M_1$ and $M_2$, F representing the monomer concentration ratio in the polymerization system ($=[M_1]/[M_2]$) and f representing the composition ratio of the copolymer product ($=d[M_1]/d[M_2]$) are known to exist in the relationship described by the following expression (XII).

$$f=F(r_1F+1)/(F+r_2) \tag{XII}$$

(Shohei Inoue, Seizo Miyada, "Polymer Material Chemistry", Applied Chemistry Series 4, p. 113)

Here, $r_1$ represents the reaction rate ratio of $M_1$ to $M_2$ when the propagating end of the copolymer is the $M_1$ component, and is known as the monomer reactivity ratio, being the value which indicates the relative reactivity of the monomer. Likewise, $r_2$ represents the reaction rate ratio of $M_2$ to $M_1$ when the propagating end of the copolymer is the $M_2$ component. $r_1$ and $r_2$ can be calculated from the copolymerization composition curve, and specifically $r_1$ and $r_2$ are each calculated from the slopes of the lines plotted for $F^2/f$ and $F(f-1)/f$ and their intercepts (method of Finemann-Ross).

Applying this concept to copolymerization of α-olefins and DCPD, monomer $M_1$ is DCPD and monomer $M_2$ is the α-olefin. As mentioned above, the present inventors have found that virtually no DCPD component linkage is produced with copolymerization of α-olefins and DCPD using Kaminsky catalysts. Thus, if $r_\alpha$ is the monomer reactivity ratio for the α-olefin and $r_D$ is the monomer reactivity ratio for DCPD, it may be assumed that $r_D=0$, so that expression (XII) may be simplified to the following expression (XIII).

$$f=F/(F+r_\alpha) \tag{XIII}$$

The value of $r_\alpha$ differs depending on the polymerization conditions, particularly the type of metallocene used. Metallocenes may be largely classified into those with $C_s$ symmetry (mirror symmetry) and those with $C_2$ symmetry with respect to the ligands $R^{24}$ and $R^{25}$ and the central metal M which links them in general formula (V).

FIG. 13 shows the copolymerization composition curve for copolymerization of ethylene and DCPD using a typical metallocene with $C_s$ symmetry, isopropylidene-(9-fluorenyl)(cyclopentadienyl)zirconium dichloride and typical metallocenes with $C_2$ symmetry, ethylene-bis(1-indenyl)zirconium dichloride and dimethylsilylene-bis(1-indenyl)zirconium dichloride.

Because almost no DCPD component linkage occurs, however large the value of F (=[DCPD]/[ethylene]) may be, the mole fraction of the DCPD component in the copolymer is higher but never increases above 50% by mole. Also, in the case of metallocenes with $C_2$ symmetry, the DCPD component is incorporated less readily than in the case of metallocenes with $C_s$ symmetry. In other words, $r_\alpha$ is larger. Consequently, in order to obtain copolymers with the same DCPD component composition it is necessary to carry out the polymerization under conditions with a larger value for F.

According to the production process of the invention the monomer mole ratio (F) for the polymerization reaction system is controlled, but according to a second method of the invention, the difference in monomer reactivities depending on the catalyst is considered when controlling the F value, so as to maintain the value of f (=DCPD component/α-olefin component in the copolymer) in expression (XIII) to within the prescribed range.

In order to obtain copolymers with high chemical homogeneity, it is desirable to minimize variation in the composition ratio in addition to increasing the alternating copolymerization, for which the range of f is 38/62<f<48/52, and more preferably 38/62<f<46/54. The value of f is preferably not less than 38/62, because this results in insufficient heat resistance due to the low DCPD component content, as well as a tendency to produce copolymers containing polyethylene and ethylene blocks, due to the high ethylene component content. The value of f is preferably not greater than 48/52 because it is then too far above the lower limit for f, despite the higher alternating copolymerization. In the case of metallocenes with $C_s$ symmetry, such as isopropylidene-(9-fluorenyl)(cyclopentadienyl)zirconium dichloride, the molecular weight tends to fall as f approaches 1, and this is therefore undesirable from the standpoint of the molecular weight distribution.

The variation in the copolymerization composition ratio of the α-olefin-DCPD copolymer of the invention can be evaluated by the DSC curve, near the glass transition point, obtained by DSC measurement. The glass transition point of a polymer is generally measured as the inflection point of the DSC curve, and focusing on the temperature difference between the falling point and the rising point of the curve, i.e. the range in which the heat capacity varies by glass transition (hereunder abbreviated to ΔTg), polymers with large variation in composition ratio exhibit broad change and the ΔTg is large, while polymers with a uniform composition ratio exhibit sharp change and the ΔTg is small. The ΔTg is preferably no greater than 15° C., and more preferably no greater than 10° C., as measured with a temperature elevating rate of 20° C./min.

According to the second process of the invention, F is maintained in the value range of expression (II) during the period from the start of polymerization until the conversion of the DCPD added to the polymerization reaction system reaches 60%. "The conversion of the DCPD added to the polymerization reaction system" means the total conversion (polymerization rate) for the DCPD present in the polymerization reaction system at the start of polymerization and the DCPD added to the polymerization reaction system during the polymerization reaction. The period is preferably that extending until the conversion reaches 70%. Although the desired copolymer can of course be obtained even if the polymerization reaction is terminated before the conversion reaches 60%, this is not preferred from a cost standpoint.

When ethylene is used as the α-olefin, the amount of ethylene present in the polymerization reaction system will depend on the pressure (or the partial pressure in cases when the gas used is a mixture with an inert gas such as nitrogen). Thus, for control of the F value during polymerization, the 3 methods described below may be employed.

(1) After introducing a prescribed amount of DCPD into the reaction system, additional DCPD is further introduced into the reaction system while supplying ethylene during the polymerization to maintain a constant ethylene pressure in the reaction vessel.

(2) After introducing a prescribed amount of DCPD into the reaction system, the ethylene pressure is gradually lowered as the polymerization proceeds.

(3) Whole DCPD is first introduced into the reaction system, and ethylene is then supplied into the reaction system under a constant pressure.

In the above method (1), although the process control is easy, there is a limitation to enhance the final conversion of DCPD. On the other hand, in method 2, the concentrations of both the monomers gradually lower and thus the reaction rate also lowers, but it is possible to complete the polymerization with a high conversion of DCPD. However, even in method (1), it is possible to maintain the ethylene concentration in the reaction system at a low level if the supply pressure or partial pressure of ethylene is lowered. Therefore, even where the concentration of DCPD is lowered as the reaction proceeds, it is possible to maintain F within the range satisfying expression (I) during polymerization until a high conversion of DCPD is attained. In this method, DCPD may be added portionwisely, but the following two continuous methods can be mentioned as more precise addition methods.

(1a) DCPD is first introduced into the reaction system in an amount of exceeding 4 times the dissolving mole concentration corresponding to the pressure or partial pressure of ethylene, and then DCPD is additionally introduced continuously into the reaction system at a constant addition rate ($V_D$).

(1b) DCPD is first introduced into the reaction system in an amount of exceeding 4 times the dissolving mole concentration corresponding to the pressure or partial pressure of ethylene, and then DCPD is additionally introduced continuously into the reaction system at a constant ratio of the mole consumption rate ($V_E$) of ethylene to be consumed with the polymerization reaction to the mole supply rate ($V_D$) of DCPD satisfying the following range: $V_D/V_E$=38/62–48/52 (mole/mole).

The method of (1a) is easier in the process control than the method of (1b). However, if the DCPD addition rate ($V_D$) is too high, there is no difference in the easiness of process control between the methods of (1a) and (3) above and therefore no merit cannot be found in adopting the control method of (1a). On the other hand, if the addition rate is too low, it becomes difficult to maintain F within the range exceeding 4 as the polymerization reaction proceeds. Therefore, it is necessary to set VD so as to maintain F within the range exceeding 4 until the conversion of DCPD reaches 60%. On contrary, in the method of (1b), since DCPD is added in conformity with the ethylene consumption rate ($V_E$), the mole ratio (F) of the monomers existing in the system can be maintained constant until the addition of DCPD is completed. Therefore, the method of (1b) is most preferable in order to obtain the copolymer with a uniform composition. Such control can be effected without any difficulty by monitoring the ethylene consumption rate with a flowmeter and feeding back the resulting rate to the DCPD supplying apparatus. In this control method, the mole fraction of the DCPD component in the formed copolymer can be controlled through the amount of DCPD to be previously introduced into the reaction vessel. If the amount of DCPD is relatively large with respect to the solubility of ethylene the mole fraction of the DCPD component in the copolymer is high, while if it is small the mole fraction is low. Therefore, it is preferred that the amount of DCPD is set with taking into consideration the ratio $V_D/V_E$ corresponding to the desired mole fraction of the DCPD component in the resulting copolymer. This method is also preferable since F can be maintained in the range satisfying expression (I) and constant during polymerization until a high conversion of DCPD is attained if the pressure or partial pressure of ethylene is lowered.

The method of (3) is the easiest in control. In this method, since the concentration of DCPD is satisfactorily high at the initial stage of reaction, the concentration ratio of DCPD to ethylene in the reaction system is maintained in the range exceeding 4, but the concentration ratio gradually lowers as the reaction proceeds. When the ethylene pressure is high, the DCPD concentration may lower before the conversion of DCPD reaches 60% so that the concentration ratio of DCPD to ethylene cannot be maintained in the range exceeding 4. In such a case, the pressure or partial pressure of ethylene should be lowered. It is noted that the above-mentioned control is possible in the present invention since no direct linkage between two DCPD component units is produced as mentioned above contrary to the case where an NB component is used.

In the copolymerization reaction according to the process of the present invention, even after DCPD has been exhausted, the polymerization still proceeds unless the catalyst is deactivated. Therefore, if the reaction is continued after the depletion of DCPD, the resulting product inevitably contain polyethylene or copolymers having an extremely high mole fraction of the ethylene component. Therefore, it is highly desirable to terminate the reaction with taking the final conversion of DCPD into consideration. Of course, the final conversion of DCPD is not necessarily controlled up to 60%, or 70%. The final conversion of DCPD may depends of the method of supplying monomers or the reaction conditions, it may be selected in general within the range of not higher than 95%, preferably 90%, more preferably 85%. In order to maintain the homogeneity of the resulting polymer and enhance the conversion of DCPD, it is generally preferable to lower the pressure of ethylene.

FIG. 12 shows the solubilities of ethylene in the preferred solvent toluene and in DCPD which should also be considered a solvent. According to the invention, the ethylene pressure in the polymerization reaction system is determined by taking into consideration both the DCPD concentration in the toluene and FIG. 12, but 10 kg/cm$^2$ or lower, preferably 5 kg/cm$^2$ or lower, and more preferably 2 kg/cm$^2$ or lower may be desirable. It is not preferred for the ethylene pressure to exceed 10 kg/cm$^2$, as this will complicate efforts to maintain F within the range of the invention. However, it is not preferred for the ethylene pressure to be too low, as the reaction rate will be slowed and F will be too high; thus, a value of at least 0.1 kg/cm$^2$, especially at least 0.25 kg/cm$^2$ is preferred. It is more preferable for the polymerization to be carried out in a range of from 0.5 to 1 atmosphere, from the standpoint of the reaction rate and the range for F.

Regarding the method used for introducing DCPD into the reaction system, it is usually desirable from an industrial standpoint for the addition to be made at a constant rate. The rate of introduction may be determined based on the polymerization activity and reactivity of the catalyst used, the amount of solvent and the initial DCPD concentration, but it is preferably 10$^{-4}$ to 10$^{-1}$ a mol/min where a mol is defined as the DCPD present in the reaction system at the start of polymerization.

If the introduction rate is slower than 10$^{-4}$ a mol/min it may become difficult to keep F within the range of the invention. If the introduction rate is faster than 10$^{-1}$ a mol/min, the introduction rate of the DCPD may exceed the rate at which polymerization proceeds, complicating efforts to increase the overall conversion of the dicyclopentadiene.

Another preferred method for introducing the DCPD into the reaction system is one in which the DCPD is introduced in a manner corresponding to the rate of ethylene consumption. The consumption rate for ethylene kept at a constant pressure during polymerization can be easily monitored with a gas flowmeter or the like. Thus, F can be precisely controlled in accordance with the consumption rate of ethylene; for example, by increasing the DCPD introduction rate when the reaction rate is high at the early stage of polymerization and minimizing the DCPD introduction rate when the reaction rate has fallen toward later stage of polymerization.

Since the viscosity of the reaction solution increases as polymerization proceeds, it is preferred to effect sufficient agitation so that the ethylene in the solution is evenly dispersed. For example, if sufficient agitation is not carried out in conditions of high viscosity, such as a solution viscosity exceeding 500 cps, irregularity will occur in the ethylene distribution, and this can result in lowering of the chemical homogeneity of the copolymer.

According to the invention, the DCPD concentration in the solvent at the start of polymerization is generally 5 to 70% by weight, preferably 7 to 50% by weight and more preferably 10 to 30% by weight. It is not desirable for the DCPD concentration to be less than 5% by weight, as this may render it difficult to keep F within the range of the invention, and reduce the economic feasibility. A concentration of greater than 70% by weight is also undesirable, as the viscosity of the solution may become too high as polymerization proceeds.

The polymerization reaction temperature generally influences the molecular weight of the polymer as well as the catalyst activity and, according to the present invention, it is also necessary to consider its effect on the monomer ratio (F). This is because the solubility of gases such as ethylene, propylene and other α-olefins in solvents depends on the temperature in addition to their pressure or partial pressure. If the temperature is increased, their solubility decreases and F is larger. The polymerization temperature must be set in consideration of these various conditions, but is generally desirably 0–110° C., preferably 10–80° C., and more preferably 15–50° C. The polymerization temperature is preferably not lower than 0° C. because this lowers the catalyst activity, and it is preferably not higher than 110° C. because this tends to result in deactivation of the catalyst and in side reactions.

After completion of the polymerization reaction, the copolymer may be obtained by treating the reaction mixture by common methods, but attention must be given to purification since aluminum from aluminoxane tends to remain in polymers obtained using Kaminsky catalysts. Optical materials such as optical disks preferably have an aluminum content of no greater than 100 ppm, more preferably no greater than 10 ppm, and especially no greater than 1 ppm.

The α-olefin-DCPD copolymer obtained by the process of the present invention preferably contains the DCPD component at 38–50% by mole, especially 38–48% by mole. Ethylene-DCPD copolymers employing ethylene as the α-olefin preferably have glass transition points (Tg) in the range of about 140–190° C., especially 140–180° C. However, the characteristic feature of the invention consists in the homogeneity of the polymer composition and, therefore, it is difficult to always describe the feature by the Tg range. In general, the homogeneity of a polymer is indicated by a relationship between the Tg and composition thereof and by the sharpness of the Tg. The range of the Tg of the ethylene-DCPD copolymers according to the invention may be represented by the following expression:

$$-22.7+2.84\ m_D+0.0262\ m_D^2 < Tg < -2.7+2.84\ m_D+0.0262\ m_D^2$$

wherein $m_D$ denotes the mole fraction (%) of the DCPD component in the polymer and is within the range of from $38\% < m_D < 50\%$.

The Tg generally increases as the $m_D$ increases, but this is not always true. Even if the $m_D$ is the same, the Tg is different between the cases where the distribution of the copolymer composition is broad and where it is narrow. As mentioned above, DCPD-DCPD linkages may be formed when a Ziegler-Natta catalyst is employed. Therefore, copolymers having a mole fraction of the DCPD component of much higher than 50% by mole and copolymers having a mole fraction of the ethylene component of much higher than 50% by mole are formed in combination unless the concentrations of DCPD and ethylene in the reaction system are precisely maintained constant during polymerization reaction. In this case, the Tg and $m_D$ do not satisfy the above-mentioned expression. Thus, even if a metallocene catalyst as used in the present invention is employed, crystalline polyethylene or the components having a high mole fraction of the ethylene component is concurrently formed and, thus, the Tg and $m_D$ do not satisfy the above-mentioned expression, unless the supply of the monomers is precisely controlled according to the present invention. Contrary to this, the copolymer according to the present invention is highly homogeneous and, therefore, exhibits a relationship between the Tg and $m_D$ falling within the range of the above-mentioned expression.

Furthermore, the feature of the α-olefin-DCPD copolymer according to the present invention is indicated by sharpness of the glass transition temperature. The copolymer according to the invention may have a temperature difference (ΔTg) between the falling point and the rising point in the DSC curve thereof of not higher than 15° C., preferably not higher than 13° C. Copolymers produced by a process or under conditions not falling within those according to the invention have a very broad Tg range or peaks corresponding to the melting point of polyethylene or the copolymerized ethylene block component are observed in the DSC curve thereof, which are both not preferred.

The molecular weight of the α-olefin-DCPD copolymer obtained by the process of the invention has a reduced viscosity $\eta_{sp}/c$ which is in the range of 0.1–10 dl/g, and preferably 0.2–3 dl/g at 30° C. in a 0.5 g/dl concentration toluene solution. It is preferably not lower than 0.1 dl/g to avoid a reduction in the dynamic characteristics of the molded product, and it is preferably not higher than 10 dl/g to avoid an increase in the resin melt viscosity which may hamper melt molding.

The molecular weight of the resulting polymer may be controlled by a known method, such as supplying a prescribed amount of hydrogen to the polymerization reaction system, varying the catalyst concentration or varying the polymerization temperature. The molecular weight of the ethylene-DCPD copolymer may be controlled as desired by adding a small amount of a liquid α-olefin such as 1-hexene. The amount of the α-olefin added may be 0.03 mole or less, preferably 0.02 mole or less, based on 1 mole of DCPD.

Copolymer ($X_H$)

Copolymer ($X_H$) according to the invention consists essentially of 0–39% by mole of an α-olefin component represented by the following formula ($A_H$) and 61–100% by mole of a cycloolefin component represented by the following formula ($B_H$).

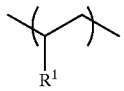

(A$_H$)

wherein $R^1$ is a hydrogen atom or a saturated aliphatic hydrocarbon group of 1–16 carbon atoms. As saturated aliphatic hydrocarbon groups there may be mentioned alkyl groups of 1–16 carbon atoms, such as methyl, ethyl, propyl and butyl.

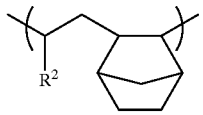

(B$_H$)

wherein $R^2$ is a hydrogen atom or a saturated aliphatic hydrocarbon group of 1–16 carbon atoms. As saturated aliphatic hydrocarbon groups there may be mentioned alkyl groups of 1–16 carbon atoms, such as methyl, ethyl, propyl and butyl.

The repeating unit represented by formula ($A_H$) above constitutes 0–39% by mole, preferably 1–38% by mole and more preferably 5–35% by mole of all of the repeating units. The repeating unit represented by formula ($B_H$) above constitutes 61–100% by mole, preferably 62–99% by mole and more preferably 65–95% by mole of the same.

Copolymer ($X_H$) has a reduced viscosity $\eta_{sp}/c$ in the range of 0.1–10 dl/g, and preferably 0.2–3 dl/g, at 30° C. in a 0.5 g/dl concentration toluene solution.

Copolymer ($Y_H$)

Copolymer ($Y_H$) according to the invention consists essentially of repeating units represented by the following formulas ($A_H$), ($B_H$), ($C_H$) and ($D_H$) below.

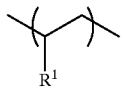

(A$_H$)

wherein $R^1$ is a hydrogen atom or a saturated aliphatic hydrocarbon group of 1–16 carbon atoms. As saturated aliphatic hydrocarbon groups there may be mentioned alkyl groups of 1–16 carbon atoms, such as methyl, ethyl, propyl and butyl.

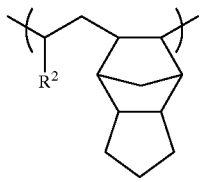

(B$_H$)

wherein $R^2$ is a hydrogen atom or a saturated aliphatic hydrocarbon group of 1–16 carbon atoms. As saturated aliphatic hydrocarbon groups there may be mentioned alkyl groups of 1–16 carbon atoms, such as methyl, ethyl, propyl and butyl.

(C_H)

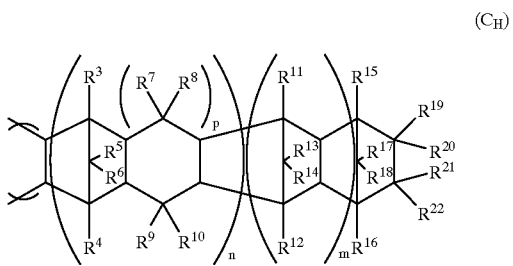

wherein n is 0 or 1; m is 0 or a positive integer of 1–3, preferably 0 or 1; p is 0 or 1; and $R^3$–$R^{22}$ are the same or different and each represents a hydrogen atom, a halogen atom, an aromatic hydrocarbon group of 6–10 carbon atoms or a saturated aliphatic hydrocarbon group of 1–12 carbon atoms. As aromatic hydrocarbon groups of 6–10 carbon atoms there may be mentioned aryl groups such as phenyl and naphthyl, and these may be substituted with an alkyl group of 1–3 carbon atoms such as methyl. As saturated aliphatic hydrocarbon groups of 1–12 carbon atoms there may be mentioned alkyl groups such as methyl and ethyl and cycloalkyl groups such as cyclopentyl and cyclohexyl.

Alternatively, $R^{19}$ and $R^{20}$ or $R^{21}$ and $R^{22}$ may together form an alkylidene group such as methylidene or ethylidene, or $R^{19}$ or $R^{20}$ and $R^{21}$ or $R^{22}$ may form, together with the two carbon atoms to which they bond, a ring which may be an aromatic ring.

(D_H)

wherein q is an integer of 2–8, preferably 2, 3 or 4.

The composition ratios of $[A_H]$, $[B_H]$, $[C_H]$ and $[D_H]$ which represent the molar percents of the respective repeating units $(A_H)$, $(B_H)$, $(C_H)$ and $(D_H)$ in copolymer $(Y_H)$ are as follows.

$([A_H]+[B_H])/([C_H]+[D_H])$=95–99.9/0.1–5, and preferably 95–98/2–5. $[A_H]/[B_H]$=0–39/61–100, and preferably 1–38/62–99. $[D_H]/[C_H]$=0–95/5–100, and preferably 0–80/20–100.

Copolymer $(Y_H)$ has a reduced viscosity $\eta_{sp}/c$ in the range of 0.1–10 dl/g, and preferably 0.2–3 dl/g, as measured in a 0.5 g/dl concentration toluene solution at 30° C.

The hydrogenated-type α-olefin-cycloolefin copolymer $(X_H)$ according to the present invention exhibits high level of alternation and, thus, high homogeneity. This can easily be understood from the fact that the precursory α-olefin-DCPD copolymer has high level of alternation and high homogeneity. This is also clear from the comparison of $^1$H-NMR spectra of the hydrogenated DCPD homopolymer and hydrogenated ethylene-DCPD copolymer obtained in Reference Examples 1 and 2 with those of the hydrogenated ethylene-DCPD copolymers obtained in Examples 21–23. As is seen from FIG. 9 showing the 1H-NMR spectrum of the hydrogenated DCPD homopolymer obtained in Reference Example 1 by hydrogenating the DCPD homopolymer, which was obtained using VOCl$_3$-Et$_2$AlCl as the catalyst, the hydrogenated DCPD homopolymer exhibits very broad peaks in the range of about δ 0.7 to 3.0 ppm. This broadening of the peaks is based on the linkages between the tricyclo[4.3.0.1$^{2,5}$]decane (hereinbelow, referred to as tricyclodecane) component units. From FIG. 10 showing the $^1$H-NMR spectrum of the hydrogenated ethylene-DCPD copolymer obtained in Reference Example 2 by hydrogenating the ethylene-DCPD copolymer, which was obtained using VOCl$_3$-Et$_2$AlCl as the catalyst, it is seen that the hydrogenated ethylene-DCPD copolymer exhibits sharp peaks around δ 1.07, 1.3, 1.47, 1.65, 1.8, 2.0 and 2.4 ppm. However, the peaks overlap with the broad peaks observed at δ 0.7 to 3.0 ppm in the spectrum of the hydrogenated DCPD homopolymer. This suggests that the copolymer contains the tricyclodecane component linkages despite that it contains 39% by mole, i.e., much less that 50% by mole, of the tricyclodecane component. In addition, the valley observed at δ 2.2 ppm in the spectrum of the hydrogenated ethylene-DCPD copolymer did not have a deep bottom corresponding to the shoulder observed at δ 2.2 ppm in the spectrum of the hydrogenated DCPD homopolymer. Contrary to this, in the $^1$H-NMR spectra of the hydrogenated ethylene-DCPD copolymers obtained in Examples 21–23, the corresponding valley have a deep bottom almost reaching the base line. This indicates that the peaks in these spectra do not overlap with the broad peaks based on the tricyclodecane component linkages, or the hydrogenated ethylene-DCPD copolymer according to the present invention does not contain the tricyclodecane component linkages. Of course, even in the $^1$H-NMR spectra of the hydrogenated ethylene-DCPD copolymers according to the present invention, the peaks are sharp at δ 1.07 to 1.8 ppm, but the valleys among the peaks do not have deep bottoms. However, it is noted that this is because of the existence of very many peaks in these area but is not based on the existence of the tricyclodecane component linkages.

From the above considerations, it can be said that a ratio (H'$_{2.20}$/H'$_{2.40}$) of the intensity (H'$_{2.20}$) of the valley at δ 2.20 ppm to the intensity (H'$_{2.40}$) of the peak at δ 2.40 in a measured $^1$H-NMR spectrum is a good measure for identifying the existence of the tricyclodecane component linkages in the hydrogenated ethylene-DCPD copolymer. In the present invention, the H'$_{2.20}$/H'$_{2.40}$ ratio may be not more than 0.07, preferably not more than 0.05. For example, the H'$_{2.20}$/H'$_{2.40}$ ratio in the hydrogenated ethylene-DCPD copolymer obtained in Reference Example 2 is 0.13, while those in the copolymers obtained in Examples 21–23 are 0.038, 0.031 and 0.024, respectively.

The hydrogenated α-olefin-DCPD copolymer obtained by the process of the present invention is characterized by the homogeneity of the polymer composition. Like the case of the corresponding α-olefin-DCPD copolymer, the homogeneity of the hydrogenated α-olefin-DCPD copolymer is indicated by a relationship between the Tg and composition thereof and by the sharpness of the Tg. The range of the Tg of the hydrogenated-type ethylene-cylcloolefin copolymers according to the invention may be represented by the following expression:

$$-32.7+2.84\ m_T+0.0262\ m_T^2 < Tg < -7.7+2.84\ m_T+0.0262\ m_T^2$$

wherein $m_T$ denotes the mole fraction (%) of the tricyclodecane component in the polymer and is within the range of from 38%<$m_T$<50%. The temperature difference (ΔTg) between the falling point and the rising point in the DSC curve thereof is not higher than 15° C., preferably not higher than 13° C.

Production Process (Hydrogenation Treatment)

Since the α-olefin-DCPD copolymers obtained according to the invention (copolymer (X) and copolymer (Y)) contain unsaturated double bonds in the polymers, they lack thermal stability and are therefore unsuitable for melt molding;

however, addition of hydrogen to these copolymers for hydrogenation of the unsaturated double bonds drastically improves their thermal stability so that melt molding becomes possible.

The hydrogenation rate in the hydrogenated α-olefin-DCPD copolymer (rate of hydrogen addition to the unsaturated double bonds) is at least 99%, preferably at least 99.5% and more preferably at least 99.9%. A hydrogenation rate of less than 99% is undesirable as it results in insufficient thermal stability and a tendency toward coloration during melt molding. In the case of ring-opened polymers with unsaturated double bonds on the main chain, the glass transition point is sharply lowered by hydrogenation, but in the case of the α-olefin-DCPD copolymers of the invention, the unsaturated double bonds are situated on side chains or are in ring structures, so that the glass transition point is changed rather little before and after hydrogenation.

The ends of polymers obtained using Kaminsky catalysts usually include unsaturated double bonds provided a molecular weight adjuster such as hydrogen is not used. These terminal double bonds are undesirable since they promote crosslinking reaction during melt molding, generating gel fish-eyes; the present invention provides an advantage here by giving copolymers with no terminal double bonds, as a result of hydrogen addition.

The hydrogenation may be carried out by a known method using a hydrogenation catalyst. For α-olefin-DCPD copolymers of the invention, the hydrogenation may be carried out after isolation and purification of the polymer, but it is more preferable from an economic standpoint for the hydrogenation to be carried out after polymerization while the polymer is still in solution form. If this is done, the unreacted DCPD in the polymerization solution also undergoes hydrogenation into tricyclo[4.3.0.1$^{2,5}$]decane, but this does not pose a problem since it can be easily removed by purification after the hydrogenation. It may also be preferred, from the standpoint of the properties and particularly the molecular weight of the hydrogenated copolymer, for the Kaminsky catalyst to be deactivated prior to addition of the hydrogenation catalyst to the polymerization solution. The Kaminsky catalyst can be deactivated without affecting the ongoing hydrogenation reaction by a method involving, for example, addition of a trace amount of an aliphatic alcohol such as methanol, ethanol, n-propanol or isopropanol to the polymerization solution.

The catalyst used for the hydrogenation according to the present invention is not critical and may be those generally employed for the hydrogenation reaction of olefins. These catalysts are generally classified into heterogeneous catalysts and homogeneous catalysts. Preferred heterogeneous catalysts may include nickel, palladium and platinum, as well as solid catalysts containing these metals supported on silica, carbon, diatomaceous earth, alumina, titanium oxide and the like. Specifically, there may be mentioned nickel/silica, nickel/diatomaceous earth, palladium/carbon, palladium/silica, palladium/diatomaceous earth and palladium/alumina. There may also be preferably employed Raney nickel as the nickel catalyst, platinum oxide and platinum black as the platinum catalyst, and the like. As the homogeneous catalyst, there may be mentioned catalyst systems containing compounds of metals of Group VIII of the Periodic Table and specifically those consisting of a Ni, Co or Fe compound and an organometallic compound of a metal of Groups I to III of the Periodic Table such as cobalt naphthenate/triethylaluminum, cobalt acetylacetonate/isobutylaluminum, iron acetylacetonate/isobutylaluminum, cobalt octenoate/n-butyllithium and nickel acetylacetonate/triethylaluminum. There may also be preferably employed compounds of Ru, Rh and the like such as carbonylchlorohydrido-tris(triphenylphosphine)ruthenium, dihydridocarbonyl-tris(triphenylphosphine)ruthenium, dihydrido-tetrakis(triphenylphosphine)ruthenium, chloro-tris(triphenylphosphine)rhodium and hydridocarbonyl(triphenylphosphine)rhodium.

Although the conditions of the hydrogenation reaction may depend on the catalyst employed, the hydrogenation reaction may generally be carried out under a hydrogen pressure of 1–100 atms at a temperature of 50–200° C., preferably 80–180° C. The reaction time may depend on the activity of the catalyst, but it may generally be in a range of 10 minutes to 10 hours, preferably 30 minutes to 5 hours. According to the type of catalyst and reaction conditions, the employed unsaturated solvent such as toluene is concurrently hydrogenated, which is economically undesirable. Therefore, it is preferred to select the conditions under which such side reactions do not occur. Of course, if a small amount of the solvent is hydrogenated, the hydrogenated solvent can be easily removed.

The hydrogenated-type α-olefin-cycloolefin copolymer obtained according to the invention can be melt molded by a known method, such as injection molding or extrusion molding. The resin melt temperature for the molding will be determined based on the properties required for the molded product and the melt viscosity and thermal decomposition temperature of the copolymer used, but it is usually in a range of 200–380° C., and preferably 240–340° C. If the resin melt temperature is below this range the flow properties of the resin will be insufficient, making it difficult to obtain a uniform molded product, while if it is above this range thermal deterioration of the resin will tend to result in coloration. For improved thermal stability of the resin during melt molding, a small amount of a commonly used antioxidant, such as Irganox 1010, 1076 (product of Ciba-Geigy, Inc.) may be added.

The invention will now be explained in more detail by way of examples. However, it is not intended for the invention to be limited to these examples.

The toluene (solvent), DCPD, NB and 5-ethylidene-2-norbornane used were all subjected to distillation purification and adequately dried.

The metallocene isopropylidene-(9-fluorenyl)(cyclopentadienyl)zirconium dichloride was synthesized according to the method described in J. A. Ewen et al., J. Am. Chem. Soc., 110, 6255–6266 (1988). Dimethylsilylene-bis(1-indenyl)zirconium dichloride was synthesized according to the method described in W. A. Herrmann et al., Angew. Chem. Int. Ed. Engl., 28, 1511–1512 (1989). The ethylene-bis(1-indenyl)zirconium dichloride used was purchased from Aldrich Co.

The ionic boron compound was trityl-tetrakis(pentafluorophenyl)borate, used in the form as purchased from Toso Akuzo, KK.

The aluminoxane used was polymethylaluminoxane (PMAO) purchased from Toso Akuzo, KK. and prepared as a 2 M concentration toluene solution.

Triisobutylaluminum[($^i$Bu)$_3$Al] was used in the form of a 1 M concentration n-hexane solution as purchased from Kanto Chemicals, KK.

Vanadium oxytrichloride (VOCl$_3$) was used in the form as purchased from Kanto Chemicals, KK.

Diethylaluminum chloride (Et$_2$AlCl) was used in the form of a 1 M concentration n-hexane solution as purchased from Kanto Chemicals, KK.

The measurements in the examples were made by the following methods.

Glass transition point (Tg): Measured using a TA Instruments Model 2920 DSC, with a temperature elevating rate of 20° C./min.

Molecular weight: The reduced viscosity $\eta_{sp}/c$ was measured at 30° C in a 0.5 g/dl concentration toluene solution.

Light transmittance: Measured using an ultraviolet visible spectroscope (UV-240) by Shimazu Laboratories, KK.

Haze value: Measured using a UDH-20D automatic digital haze meter by Nihon Denshoku Industries, KK.

Residual aluminum concentration in polymer: Determined by ICP emission analysis.

REFERENCE EXAMPLE 1

Vanadium catalyst was used for homopolymerization of DCPD.

After measuring out 87 mg of vanadium oxytrichloride ($VOCl_3$) into a 50 ml volume Schlenk's flask which had been purged with nitrogen, 2.5 ml of diethylaluminum chloride ($Et_2AlCl$) in a 1 M concentration n-hexane solution was added thereto, and the mixture was stirred for 5 minutes at room temperature for activation. Next, 15 ml of toluene and 6.6 g of DCPD were added for polymerization at room temperature for 13.5 hours, and then treatment was performed by a conventional method to obtain 0.40 g of polymer. The reduced viscosity $\eta_{sp}/c$ measured at 30° C. in a 0.5 g/dl concentration toluene solution was 0.049 dl/g. The $^1$H-NMR spectrum of this DCPD homopolymer is shown in FIG. 1.

The DCPD homopolymer thus obtained was hydrogenated by dissolving 70 mg of the DCPD homopolymer and 5 mg of triisobutylaluminum as a catalyst in 10 ml of toluene in an autoclave. The hydrogenation was carried out under a hydrogenation pressure of 10 atms at 140° C. for 6 hours and then after treatment was carried out according to a conventional method to obtain 58 mg of the hydrogenated polymer. The $^1$H-NMR spectrum of this hydrogenated DCPD homopolymer is shown in FIG. 9.

REFERENCE EXAMPLE 2

Vanadium catalyst was used for copolymerization of ethylene and DCPD.

The procedure of Reference Example 1 was carried out, but after adding the 15 ml of toluene and 6.6 g of DCPD, ethylene gas was passed through the Schlenk's flask system to create an atmosphere with an ethylene pressure of 1 kg/cm$^2$. Following 95 hours of polymerization at room temperature, treatment was performed by a conventional method to obtain 1.40 g of polymer. The resulting polymer contained a toluene-insoluble portion in a large amount, and as a result of DSC measurement a broad signal was observed near the crystalline melting point of 130° C. due to polyethylene or ethylene blocks. From the polymer, the toluene-soluble portion was extracted with toluene to obtain 0.62 g of a copolymer. The mole fraction of the DCPD component in the copolymer was 39% by mole, and the reduced viscosity $\eta_{sp}/c$ measured at 30° C. in a 0.5 g/dl concentration toluene solution was 0.49 dl/g. The $^1$H-NMR spectrum of the copolymer is shown in FIG. 2.

The ethylene-DCPD copolymer thus obtained was hydrogenated by dissolving 70 mg of the ethylene-DCPD copolymer and 5 mg of triisobutylaluminum as a catalyst in 10 ml of toluene in an autoclave. The hydrogenation was carried out under a hydrogenation pressure of 10 atms at 140° C. for 6 hours and then after treatment was carried out according to a conventional method to obtain 58 mg of the hydrogenated polymer. The $^1$H-NMR spectrum of this hydrogenated ethylene-DCPD copolymer is shown in FIG. 10.

REFERENCE EXAMPLE 3

An attempt was made to obtain a DCPD homopolymer using isopropylidene-(9-fluorenyl)(cyclopentadienyl)zirconium dichloride [hereunder abbreviated to $^i$Pr(Cp)(Flu)ZrCl$_2$] as the metallocene and PMAO as the promoter catalyst.

After measuring out 4.2 mg of $^i$Pr(Cp)(Flu)ZrCl$_2$ into a 50 ml volume Schlenk's flask which had been purged with nitrogen, 5 ml of a toluene solution of PMAO adjusted to a 2 M concentration of was added thereto, and the mixture was stirred for 10 minutes at 25° C. for activation. Next, 10 ml of toluene and 3.3 g of DCPD were added for polymerization at 40° C. for 18 hours, but absolutely no polymer was obtained.

REFERENCE EXAMPLE 4

In order to determine the maximum amount of DCPD component which can be in a copolymer of ethylene and DCPD prepared with a Kaminsky catalyst, polymerization was carried out with a very large monomer ratio (F) and in a short time in order to obtain a low yield of the copolymer.

After measuring out 4.2 mg of $^i$Pr(Cp)(Flu)ZrCl$_2$ into a 50 ml volume Schlenk's flask which had been purged with nitrogen, in the same manner as in Reference Example 3, 5 ml of a toluene solution of PMAO adjusted to a 2 M concentration of was added thereto, and the mixture was stirred for 10 minutes at 25° C. for activation. After adding 17.2 g of DCPD and raising the temperature to 40° C., an ethylene gas was passed through the Schlenk's flask system to create an atmosphere with an ethylene pressure of 1 kg/cm$^2$. The monomer ratio (F) at the start of polymerization was estimated to be 51 from FIG. 12. The reaction was terminated 5 minutes after initiating the ethylene flow, and after treatment resulted in 0.16 g of polymer.

The mole fraction of the DCPD component in the polymer was 50% by mole as determined by $^1$H-NMR measurement, and the glass transition point was 189° C. based on DSC measurement. The reduced viscosity $\eta_{sp}/c$ measured at 30° C. in a 0.5 g/dl concentration toluene solution was 0.16 dl/g. The $^1$H-NMR spectrum of the copolymer is shown in FIG. 4.

REFERENCE EXAMPLE 5

In order to determine the copolymerization curve for ethylene and DCPD, a 100 ml volume autoclave was used for this copolymerization at a reaction temperature of 40° C. $^i$Pr(Cp)(Flu)ZrCl$_2$ and PMAO were used as metallocenes. The copolymerization curve was determined by a common method, whereby polymerization was conducted with various charged monomer ratios, and then the conversion was reduced to 10% or lower, the copolymer was isolated, and the composition ratio was determined. The results are shown in FIG. 11(A).

REFERENCE EXAMPLE 6

The copolymerization curve for ethylene and NB was determined in the same manner as Reference Example 5 except that DCPD was replaced with NB. The results are shown in FIG. 11(B).

REFERENCE EXAMPLE 7

A 100 ml volume autoclave was used to study the solubility of ethylene in toluene at 40° C. A prescribed amount of ethylene was introduced into an autoclave containing a prescribed amount of toluene, and after a state of equilibrium was reached at 40° C., the pressure was read and the amount of dissolved ethylene at that pressure was calculated. FIG. 12(C) shows the relationship between pressure and solubility (molar fraction) for ethylene.

REFERENCE EXAMPLE 8

The solubility of ethylene in DCPD was studied in the same manner as Reference Example 7 except that toluene was replaced with DCPD. The results are shown as (D) in FIG. 12.

REFERENCE EXAMPLE 9

In order to determine the copolymerization composition curve for ethylene and DCPD, a 100 ml volume autoclave was used for the copolymerization reaction at a polymerization temperature of 40° C. Isopropylidene-(9-fluorenyl)(cyclopentadienyl)zirconium dichloride [hereunder abbreviated to $^{i}Pr(Cp)(Flu)ZrCl_2$] as the metallocene, and the PMAO was used as a promoter catalyst in a 1000-fold molar amount.

A prescribed amount of ethylene was introduced into an autoclave by cooling the autoclave with liquified nitrogen, and after raising the temperature to 40° C., the initial concentration of ethylene dissolved in the toluene solvent was estimated from the internal pressure. The copolymerization curve was determined by a common method, whereby polymerization was conducted with various charged monomer ratios and then the conversion was reduced to 10% or lower, the copolymer was isolated, and the composition ratio was determined. The results are shown as E in FIG. 13.

A Finemann-Ross plot was drawn based on these results, but for a more precise calculation of $r_\alpha$, $F'^2/f'$ and $F'(f'-1)/f'$ were plotted with $F'=[ethylene]/[DCPD](=1/F)$ and $f'=$ethylene component/DCPD component of the copolymer $(=1/f)$ to define $r_\alpha$ as the slope instead of the intercept. The results are shown as H in FIG. 14. Since $r_D=0$, it was calculated that $r_\alpha=1.4$ from the slope of the line passing through the origin. This value was inserted into expression (II) to obtain $2.2<F<16.8$.

REFERENCE EXAMPLE 10

A copolymerization composition curve for ethylene and DCPD was determined in the same manner as Reference Example 9 except that ethylene-bis(1-indenyl)zirconium dichloride [hereunder abbreviated to $Et(Ind)_2ZrCl_2$] was used as the metallocene. The results are shown as F in FIG. 13. $F'^2/f'$ and $F'(f'-1)/f'$ were also plotted in the same manner as Reference Example 9. The results are shown as I in FIG. 14. Since $r_D=0$, it was calculated that $r_\alpha=3.3$ from the slope of the line passing through the origin. This value was inserted into expression (II) to obtain $5.2<F<39.6$.

REFERENCE EXAMPLE 11

A copolymerization composition curve for ethylene and DCPD was determined in the same manner as Reference Example 9 except that dimethylsilylene-bis(1-indenyl)zirconium dichloride [hereunder abbreviated to $Me_2Si(Ind)_2ZrCl_2$] was used as the metallocene. The results are shown as G in FIG. 13. $F'^2/f'$ and $F'(f'-1)/f'$ were also plotted in the same manner as Reference Example 9. The results are shown as J in FIG. 14. Since $r_D=0$, it was calculated that $r_\alpha=2.7$ from the slope of the line passing through the origin. This value was inserted into expression (II) to obtain $4.3<F<32.4$.

EXAMPLE 1

Copolymerization of ethylene and DCPD was carried out in the following manner using $^{i}Pr(Cp)(Flu)ZrCl_2$ as the metallocene.

After setting a bladed stirring rod in a 500 ml volume 3-necked flask and purging the container with nitrogen gas, 90 ml of toluene and 30 g of DCPD were charged into the container. Next there was added a metallocene-PMAO solution prepared by dissolving 40 mg of $^{i}Pr(Cp)(Flu)ZrCl_2$ in a 46 ml toluene solution of PMAO adjusted to a 2 M concentration, and activated by stirring at 25° C. for 10 minutes. After it was raising the temperature to 40° C., the container interior was purged with ethylene and polymerization was initiated.

Ethylene was supplied while maintaining an ethylene pressure of 1 atmosphere in the container, and the amount of incorporated ethylene was monitored with a gas flowmeter. At intervals of 5 minutes after the start of polymerization, DCPD was introduced into the container in amounts of 0.6 mole to one mole of the ethylene incorporated during that period. At one hour after the start of polymerization, a small amount of isopropanol was added to terminate the reaction. The total amount of DCPD added to the container after the start of polymerization was 39.4 g. The reaction mixture was added dropwise with stirring into a large quantity of methanol rendered acidic with hydrochloric acid to precipitate white solids. The solids were collected by filtration, washed successively with acetone, methanol and water, and finally dried to yield 63.4 g of the copolymer.

The mole fraction of the DCPD component in the resulting copolymer was 43% by mole, and the glass transition point was 162° C. The DCPD conversion was therefore 71%. Estimation of the molar ratio (F) for this polymerization reaction based on FIG. 12 gives 12.3 at the starting point of polymerization and 6.6 at the end point. A definite glass transition point was found through DSC measurement, and since absolutely no crystalline melting point was observed corresponding to polyethylene, it was confirmed that none of the copolymer produced contained polyethylene or partial crystalline ethylene blocks. The $H_{1.85}/H_{3.05}$ was estimated to be 0.02 by $^1$H-NMR, suggesting the absence of DCPD component linkages, and the $1/4\times(I_{1.3}/I_{3.05})$ was estimated to be 0.00, suggesting the absence of the ethylene component blocks which cause to form unfavorable crystalline portion. The reduced viscosity $\eta_{sp}/c$ measured at 30° C. in a 0.5 g/dl concentration toluene solution was 0.58 dl/g, which was a sufficiently high value.

EXAMPLE 2

Copolymerization of ethylene and DCPD was carried out under the same polymerization conditions as Example 1, except that the charging amounts in Example 1 were changed from 90 ml to 200 ml for toluene, from 40 mg to 20 mg for $^{i}Pr(Cp)(Flu)ZrCl_2$ and from 46 ml to 23 ml for the PMAO toluene solution.

At 1.5 hours after the start of polymerization, a small amount of isopropanol was added to terminate the reaction. The total amount of DCPD added to the container after the start of polymerization was 42.5 g. The reaction mixture was subjected to after treatment, in the same manner as Example 1, to yield 60.3 g of the copolymer.

The mole fraction ratio of the DCPD component in the resulting copolymer was 39% by mole, and the glass transition point was 142° C. The DCPD conversion was therefore 62%. Estimation of the molar ratio (F) for this polymerization reaction based on FIG. 12 gives 8.1 at the starting point of polymerization and 6.3 at the end point. A definite glass transition point was exhibited with DSC measurement, and since absolutely no crystalline melting point was observed corresponding to polyethylene, it was confirmed that none of the copolymer produced contained polyethylene or partially crystalline ethylene blocks. The $H_{1.85}/H_{3.05}$ was estimated to be 0.03 by $^1$H-NMR, suggesting the absence of DCPD component linkages, and the $1/4×(I_{1.3}/I_{3.05})$ was estimated to be 0.02, suggesting the negligible amount, if any, of the ethylene component blocks which cause to form unfavorable crystalline portion. The reduced viscosity $\eta_{sp}/c$ measured at 30° C. in a 0.5 g/dl concentration toluene solution was 0.68 dl/g, which was a sufficiently high value. The $^1$H-NMR spectrum of the copolymer is shown in FIG. 3.

EXAMPLE 3

Copolymerization of ethylene and DCPD was carried out in the following manner using a 500 ml volume stainless steel autoclave equipped with a stirrer as the polymerization apparatus and using $^i$Pr(Cp)(Flu)ZrCl$_2$ as the metallocene.

After purging the autoclave with nitrogen gas, 80 ml of toluene and 60 g of DCPD were charged into the container. Next there was added a metallocene-PMAO solution prepared by dissolving 40 mg of $^i$Pr(Cp)(Flu)ZrCl$_2$ in a 46 ml toluene solution of PMAO adjusted to a 2 M concentration, and it was activated by stirring at 25° C. for 10 minutes. After raising the temperature to 40° C., the container interior was substituted with ethylene and polymerization was initiated by increasing the ethylene pressure to 2 kg/cm$^2$. The amount of incorporated ethylene was continuously monitored with a gas flowmeter, and the ethylene pressure was lowered successively from 2.0→1.6→1.2→0.8→0.4→0.2 kg/cm$^2$ every time 80 mmol of ethylene was incorporated. The pressures of below 1 kg/cm$^2$ are the partial pressures of ethylene in the gas mixture with nitrogen. At 4 hours after the start of polymerization, the reaction was terminated by adding a small amount of isopropanol at the point at which the ethylene pressure (partial pressure) was lowered to 0.2 kg/cm$^2$. The reaction mixture was subjected to after treatment, in the same manner as Example 1, to yield 56.1 g of the copolymer.

The mole fraction of the DCPD component in the resulting copolymer was 46% by mole, and the glass transition point was 175° C. The DCPD conversion was therefore 75%. Estimation of the molar ratio (F) for this polymerization reaction based on FIG. 12 gives 10.8 at the starting point of polymerization and 27.5 at tie end point. A definite glass transition point was exhibited with DSC measurement, and since absolutely no crystalline melting point was observed corresponding to polyethylene, it was confirmed that none of the copolymer produced contained polyethylene or partial crystalline ethylene blocks. The $H_{1.85}/H_{3.05}$ was estimated to be 0.06 by $^1$H-NMR, suggesting the absence of DCPD component linkages, and the $1/4×(I_{1.3}/I_{3.05})$ was estimated to be 0.00, suggesting the absence of the ethylene component blocks which cause to form unfavorable crystalline portion. The reduced viscosity $\eta_{sp}/c$ was 0.46 dl/g, which was a sufficiently high value.

EXAMPLE 4

Copolymerization of ethylene and DCPD was carried out in the following manner using the same polymerization apparatus and metallocene as Example 3.

After purging the autoclave with nitrogen gas, 100 ml of toluene and 40 g of DCPD were charged into the container. Next there was added a metallocene-PMAO solution prepared by dissolving 40 mg of $^i$Pr(Cp)(Flu)ZrCl$_2$ in a 46 ml toluene solution of PMAO adjusted to a 2 M concentration, and it was activated by stirring at 25° C. for 10 minutes. After raising the temperature to 40° C., the container interior was substituted with ethylene and polymerization was initiated by increasing the ethylene pressure to 2 kg/cm$^2$. The amount of incorporated ethylene was continuously monitored with a gas flowmeter. The ethylene pressure was lowered successively from 2.0→1.7→1.4→1.1→0.8→0.5 kg/cm$^2$ every time 80 mmol of ethylene was incorporated. The pressures of below 1 kg/cm$^2$ are the partial pressures of ethylene in the gas mixture with nitrogen. Simultaneously, at intervals of 5 minutes after the start of polymerization, DCPD was introduced into the container in amounts of 0.4 mole to one mole of the ethylene incorporated during that period. At 3 hours after the start of polymerization, the reaction was terminated by adding a small amount of isopropanol at the point at which the ethylene pressure (partial pressure) was lowered to 0.5 kg/cm$^2$. The total amount of DCPD added to the container after the start of polymerization was 21.2 g. The reaction mixture was subjected to after treatment, in the same manner as Example 1, to yield 54.4 g of the copolymer.

The mole fraction of the DCPD component in the resulting copolymer was 45% by mole, and the glass transition point was 171° C. The DCPD conversion was therefore 71%. Estimation of the molar ratio (F) for this polymerization reaction based on FIG. 12 gives 7.3 at the starting point of polymerization and 11.8 at the end point. A definite glass transition point was exhibited with DSC measurement, and since absolutely no crystalline melting point was observed corresponding to polyethylene, it was confirmed that none of the copolymer produced contained polyethylene or partial crystalline ethylene blocks. The $H_{1.85}/H_{3.05}$ was estimated to be 0.05 by $^1$H-NMR, suggesting the absence of DCPD component linkages, and the $1/4×(I_{1.3}/I3.05)$ was estimated to be 0.00, suggesting the absence of the ethylene component blocks which cause to form unfavorable crystalline portion. The reduced viscosity $\eta_{sp}/c$ was 0.50 dl/g, which was a sufficiently high value.

EXAMPLE 5

Copolymerization of ethylene and DCPD was carried out under the same polymerization conditions as Example 1, except that 38 mg of ethylene-bis(1-indenyl)zirconium dichloride was used as the metallocene instead of the 40 mg of $^i$Pr(Cp)(Flu)ZrCl$_2$ used in Example 1.

At 3 hours after the start of polymerization, a small amount of isopropanol was added to terminate the reaction. The total amount of DCPD added to the container after the start of polymerization was 41.7 g. The reaction mixture was added dropwise with stirring into a large quantity of methanol rendered acidic with hydrochloric acid to produce a precipitate. The precipitate was then collected by filtration, washed successively with acetone, methanol and water, and finally dried to yield 62.9 g of the copolymer.

The mole fraction of the DCPD component in the resulting copolymer was 41% by mole, and the glass transition point was 152° C. The DCPD conversion was therefore 67%. Estimation of the molar ratio (F) for this polymerization reaction based on FIG. 12 gives 12.3 at the starting point of polymerization and 7.7 at the end point. A definite glass transition point was exhibited with DSC measurement, and since absolutely no crystalline melting point was observed corresponding to polyethylene, it was confirmed that none of the copolymer produced contained polyethylene or partial crystalline ethylene blocks. The $H_{1.85}/H_{3.05}$ was estimated to be 0.03 by $^1$H-NMR, suggesting the absence of DCPD component linkages, and the $1/4\times(I_{1.3}/I_{3.05})$ was estimated to be 0.02, suggesting the negligible amount, if any, of the ethylene component blocks which cause to form unfavorable crystalline portion. The reduced viscosity $\eta_{sp}/c$ measured at 30° C. in a 0.5 g/dl concentration toluene solution was 0.73 dl/g, which was a sufficiently high value.

EXAMPLE 6

Copolymerization of ethylene and DCPD was carried out in the following manner according to Example 1, using $^iPr(Cp)(Flu)ZrCl_2$ as the metallocene and trityl-tetrakis (pentafluorophenyl)borate (hereunder abbreviated to $[(C_6H_5)_3C]^+[B(C_6F_5)_4]^-$) as a promoter catalyst.

The same polymerization apparatus was used as in Example 1. After purging the container with nitrogen gas, 140 ml of toluene and 30 g of DCPD were charged into the container. Next there was added a catalyst solution prepared by dissolving 10 mg of $^iPr(Cp)(Flu)ZrCl_2$ and 21.4 mg of $[(C_6H_5)_3C]^+[B(C_6F_5)_4]^-$ in 1.5 ml of a solution of triisobutylaluminum (1 M concentration n-hexane solution), and it was activated by stirring at 25° C. for 5 minutes. The rest of the polymerization was conducted exactly as in Example 1. At one hour after the start of polymerization, the reaction was terminated by adding a small amount of isopropanol. The total amount of DCPD added to the container after the start of polymerization was 37.4 g. The reaction mixture was subjected to after treatment in the same manner as Example 1 to yield 62.3 g of the copolymer.

The mole fraction of the DCPD component in the resulting copolymer was 44% by mole, and the glass transition point was 166° C. The DCPD conversion was therefore 73%. Estimation of the molar ratio (F) for this polymerization reaction based on FIG. 12 gives 12.1 at the starting point of polymerization and 6.0 at the end point. A definite glass transition point was exhibited with DSC measurement, and since absolutely no crystalline melting point was observed corresponding to polyethylene, it was confirmed that none of the copolymer produced contained polyethylene or partially crystalline ethylene blocks. The reduced viscosity $\eta_{sp}/c$ measured at 30° C. in a 0.5 g/dl concentration toluene solution was 0.55 dl/g, which was a sufficiently high value.

EXAMPLE 7

Copolymerization of ethylene and DCPD was carried out under the same polymerization conditions as Example 6, except that 9.6 mg of ethylene-bis(1-indenyl)zirconium dichloride was used instead of $^iPr(Cp)(Flu)ZrCl_2$.

At 2 hours after the start of polymerization, a small amount of isopropanol was added to terminate the reaction. The total amount of DCPD added to the container after the start of polymerization was 40.5 g. The reaction mixture was subjected to after treatment in the same manner as Example 1 to yield 63.3 g of the copolymer.

The mole fraction of the DCPD component in the resulting copolymer was 42% by mole, and the glass transition point was 158° C. The DCPD conversion was therefore 70%. Estimation of the molar ratio (F) for this polymerization reaction based on FIG. 12 gives 12.1 at the starting point of polymerization and 6.9 at the end point. A definite glass transition point was exhibited with DSC measurement, and since absolutely no crystalline melting point was observed corresponding to polyethylene, it was confirmed that none of the copolymer produced contained polyethylene or partial crystalline ethylene blocks. The $H_{1.85}/H_{3.05}$ was estimated to be 0.03 by $^1$H-NMR, suggesting the absence of DCPD component linkages, and the $1/4\times(I_{1.3}/I_{3.05})$ was estimated to be 0.00, suggesting the absence of the ethylene component blocks which cause to form unfavorable crystalline portion. The reduced viscosity $\eta_{sp}/c$ measured at 30° C. in a 0.5 g/dl concentration toluene solution was 0.78 dl/g, which was a sufficiently high value.

COMPARATIVE EXAMPLE 1

Polymerization was carried out under the same polymerization conditions as Example 1, except that no DCPD was added after the start of polymerization. At 60 minutes after the start of polymerization, a small amount of isopropanol was added to terminate the reaction. The reaction mixture was subjected to after treatment in the same manner as Example 1 to yield 34.6 g of the copolymer. The mole fraction of the DCPD component in the resulting copolymer was 36% by mole. The DCPD conversion was therefore 84%. Estimation of the molar ratio (F) for this polymerization reaction based on FIG. 12 gives 12.3 at the starting point of polymerization and 2.0 at the end point. The glass transition point was measured to be 130° C. by DSC, but a broad change in heat capacity was exhibited and the glass transition point was indefinite. However, no crystalline melting point corresponding to polyethylene was observed. The reduced viscosity $\eta_{sp}/c$ was 0.75 dl/g.

COMPARATIVE EXAMPLE 2

Polymerization was carried out under the same polymerization conditions as Example 3, except that a constant ethylene pressure of 2 kg/cm$^2$ was maintained during the polymerization reaction. At one hour after the start of polymerization, a small amount of isopropanol was added to terminate the reaction. The reaction mixture was subjected to after treatment in the same manner as Example 1 to yield 80.9 g of the copolymer.

The mole fraction of the DCPD component in the resulting copolymer was 32% by mole. The DCPD conversion was therefore 93%. Estimation of the molar ratio (F) for this polymerization reaction based on FIG. 12 gives 10.8 at the starting point of polymerization and 0.76 at the end point. DSC measurement revealed a large endothermic peak near 120° C., and a crystalline melting point corresponding to polyethylene or partial crystalline ethylene blocks was observed. Upon redissolving the copolymer in toluene, an insoluble portion was confirmed. DSC measurement after removing the toluene-soluble portion revealed a glass transition point, though broad and indefinite, at 114° C. The reduced viscosity $\eta_{sp}/c$ was 0.85 dl/g.

EXAMPLE 8

To a 300 ml volume autoclave there were added 15 g of the ethylene/DPCD copolymer obtained in Example 1, 90 ml of toluene and 0.08 g of the hydrogenation catalyst $RuClH(CO)PPh_3)_3$, and hydrogenation reaction was carried out for 5 hours at 170° C. with a hydrogen pressure of 40 kg/cm$^2$. The reaction mixture was reprecipitated in methanol, and filtration, washing and drying yielded 14.8 g of the copolymer.

The $^1$H-NMR spectrum (with deuterized o-dichlorobenzene as the solvent) of the resulting copolymer showed that the signal appearing at 5.5–5.8 ppm due to unsaturated bonds in the DCPD had completely disappeared, and the hydrogenation rate was 99.9%. The peaks near 4.8–5.0 ppm representing the terminal double bonds of the

EXAMPLE 9

Polymerization was carried out in exactly the same manner as Example 4, and the reaction was terminated by addition of a small amount of isopropanol. After adding 0.2 g of the hydrogenation catalyst $RuClH(CO)(PPh_3)_3$, hydrogenation was conducted for 5 hours at 170° C. with a hydrogen pressure of 40 kg/cm$^2$. The reaction mixture was subjected to after treatment in the same manner as Example 1 to yield 54.2 g of a hydrogenated ethylene-DCPD copolymer.

The $^1$H-NMR spectrum of the resulting copolymer showed absolutely no signal due to unsaturated bonds, and the hydrogenation rate was 99.9%. The composition ratio of the hydrogenated DCPD component was 45% by mole as determined by $^{13}$C-NMR measurement, the glass transition point was 170° C. and the reduced viscosity $\eta_{sp}/c$ was 0.49 dl/g, which were almost the same values obtained in Example 4.

EXAMPLE 10

The hydrogenated ethylene-DCPD copolymers obtained in Examples 8 and 9 were further purified, and the residual aluminum content in each polymer was reduced to under 10 ppm. After adding 0.5% by weight of Irganox 1010 to the copolymer, it was used for injection molding at a resin temperature of 300° C., to obtain panels each with a thickness of 1.2 mm. Both panels had very high transparency, and the light transmittances at 550 nm wavelength and the haze values were, respectively, 91.8% and 1.0% (copolymer obtained in Example 8) and 92.0% and 0.8% (copolymer obtained in Example 9).

COMPARATIVE EXAMPLE 3

The ethylene-DCPD copolymers obtained in Comparative Examples 1 and 2 were each hydrogenated according to Example 8, to obtain hydrogenated ethylene-DCPD copolymers with hydrogenation rates of at 99.9% or higher. After purification in the same manner as Example 10 until the residual aluminum content in the copolymer was under 10 ppm, 0.5% by weight of Irganox 1010 was added and injection molding was carried out at a resin temperature of 300° C., to obtain plates each with a thickness of 1.2 mm.

Unlike Example 10, these plates had low transparency and considerable haze. In particular, the copolymer obtained in Comparative Example 2 has considerable cloudiness and no transparency. The light transmittances at 550 nm wavelength and the haze values were, respectively, 82.3% and 10.6% (copolymer obtained in Comparative Example 1) and 48.6% and 43.9% (copolymer obtained in Comparative Example 2).

COMPARATIVE EXAMPLE 4

Copolymerization of ethylene and NB was carried out under the same polymerization conditions as Example 1, except that 21 g of NB was used instead of 30 g of DCPD.

At 30 minutes after the start of polymerization, a small amount of isopropanol was added to terminate the reaction. The total amount of NB added to the container after the start of polymerization was 5.6 g. The reaction mixture was subjected to after treatment in the same manner as Example 1 to yield 21.7 g of an ethylene-NB copolymer. The mole fraction of the NB component in the resulting copolymer was 67% by mole, and the glass transition point was 208° C. The NB conversion was therefore 71%. Assuming the solubility of ethylene in NB to be about the same as in DCPD, the molar ratio (F) is estimated to be 12.2 at the starting point of polymerization and 4.3 at the end point. Injection molding was attempted after thorough purification of the copolymer until the residual aluminum content was under 100 ppm, but the resin viscosity was extremely high and a uniform molded product could not be achieved.

EXAMPLE 11

Copolymerization was carried out in the same manner as Example 3, except that 2.7 g of 5-ethylidene-2-norbornane corresponding to 5% by mole of DCPD was charged in addition to the 60 g of DCPD in Example 3, and this yielded 55.8 g of the copolymer.

The mole fraction of the DCPD component and 5-ethylidene-2-norbornane component in the resulting copolymer were 43% by mole and 3% by mole, respectively, and the glass transition point was 170° C. The DCPD conversion was therefore 70%. Assuming the solubility of ethylene in 5-ethylidene-2-norbornane to be about the same as in DCPD, the molar ratio (F) is estimated to be 10.7 at the starting point of polymerization and 32.7 at the end point. A definite glass transition point was exhibited with DSC measurement, and since absolutely no crystalline melting point was observed corresponding to polyethylene, it was confirmed that none of the copolymer produced contained polyethylene or partial crystalline ethylene blocks. The reduced viscosity $\eta_{sp}/c$ was 0.44 dl/g, which was a sufficiently high value.

EXAMPLE 12

Copolymerization of ethylene and DCPD was carried out, in the following manner, using $^iPr(Cp)(Flu)ZrCl_2$ as the metallocene and trityl-tetrakis(pentafluorophenyl)borate (hereunder abbreviated to $[(C_6H_5)_3C]^+[B(C_6F_5)_4]^-$) as a promoter catalyst.

After setting a bladed stirring rod in a 500 ml volume 3-necked flask and purging the container with nitrogen gas, 170 ml of toluene, 30 g of DCPD and 2.3 ml of triisobutylaluminum (1 M concentration n-hexane solution) were charged into the container.

After then raising the temperature to 40° C., the container interior was adequately substituted with ethylene. Next, 42 mg of $[(C_6H_5)_3C]^+[B(C_6F_5)_4]^-$ and 20 mg of $^iPr(Cp)(Flu)ZrCl_2$ were added and polymerization was initiated. During the polymerization, ethylene was continuously supplied to maintain an ethylene pressure of 1 atmosphere in the container, while new DCPD was continuously added dropwise into the container at a rate of 0.5 g/min.

At one hour after the start of polymerization, a small amount of isopropanol was added to terminate the reaction. The total amount of DCPD added to the container after the start of polymerization was 30 g. The reaction mixture was added dropwise with stirring into a large quantity of methanol rendered acidic with hydrochloric acid to produce a precipitate. The precipitate was collected by filtration, washed successively with acetone, methanol and water and finally dried to yield 59.1 g of the copolymer.

The mole fraction of the DCPD component in the resulting copolymer was 42% by mole, and the glass transition point was 157° C. The DCPD conversion was therefore 76%. Estimation of the molar ratio (F) for this polymerization reaction based on FIG. 12 gives 10.2 at the starting point of polymerization and 4.2 at the end point.

A definite glass transition point was exhibited with DSC measurement, and the ΔTg, indicating the temperature difference between the falling point and the rising point of the curve, was 8.9° C. Also, since absolutely no crystalline melting point was observed corresponding to polyethylene, it was confirmed that none of the copolymer produced contained polyethylene or partially crystalline ethylene blocks. The reduced viscosity $\eta_{sp}/c$ measured at 30° C. in a 0.5 g/dl concentration toluene solution was 0.52 dl/g, which was a sufficiently high value.

EXAMPLE 13

Copolymerization of ethylene and DCPD was carried out in the following manner according to Example 12, using $Et(Ind)_2ZrCl_2$ as the metallocene instead of $^iPr(Cp)(Flu)ZrCl_2$.

Into the same polymerization container as Example 12 there were charged 140 ml of toluene, 30 g of DCPD and 2.2 ml of triisobutylaluminum (1 M concentration n-hexane solution). After then raising the temperature to 40° C., the container interior was adequately substituted with ethylene. Next, 42 mg of $[(C_6H_5)_3C]^+[B(C_6F_5)_4]^-$ $^{and}$ 19 mg of $^iPr(Cp)(Flu)ZrCl_2$ were added and polymerization was initiated. During the polymerization, ethylene was continuously supplied to maintain an ethylene pressure of 1 atmosphere in the container, while new DCPD was continuously added dropwise into the container at a rate of 0.25 g/min.

At 2.5 hours after the start of polymerization, a small amount of isopropanol was added to terminate the reaction. The total amount of DCPD added to the container after the start of polymerization was 37.5 g. The reaction mixture was subjected to after treatment in the same manner as Example 12, to yield 66.1 g of the copolymer.

The mole fraction of the DCPD component in the resulting copolymer was 40% by mole, and the glass transition point was 150° C. The DCPD conversion was therefore 74%. Estimation of the molar ratio (F) for this polymerization reaction based on FIG. 12 gives 11.9 at the starting point of polymerization and 6.6 at the end point.

A definite glass transition point was exhibited with DSC measurement, and the ΔTg was 10.0° C. Also, since absolutely no crystalline melting point was observed corresponding to polyethylene, it was confirmed that none of the copolymer produced contained polyethylene or partial crystalline ethylene blocks. The reduced viscosity $\eta_{sp}/c$ measured at 30° C. in a 0.5 g/dl concentration toluene solution was 0.75 dl/g, which was a sufficiently high value.

EXAMPLE 14

Copolymerization of ethylene and DCPD was carried out in the following manner, using $Me_2Si(Ind)_2ZrCl_2$ as the metallocene and polymethylaluminoxane (PMAO) as a promoter catalyst.

The same polymerization apparatus was used as in Example 12. After purging the container with nitrogen gas, 130 ml of toluene, 30 g of DCPD and 2 ml of a toluene solution of PMAO adjusted to 2 M concentration were charged into the container. After then raising the temperature to 40° C., the container interior was adequately substituted with ethylene. Next there was added a metallocene-PMAO solution prepared by dissolving 20 mg of $Me_2Si(Ind)_2ZrCl_2$ in 22 ml of a 2 M concentration toluene solution of PMAO, and it was activated by stirring at 25° C. for 10 minutes, and polymerization was initiated. During the polymerization, ethylene was continuously supplied to maintain an ethylene pressure of 1 atmosphere in the container, while new DCPD was continuously added dropwise into the container at a rate of 0.2 g/min.

At 3 hours after the start of polymerization, the reaction was terminated by adding a small amount of isopropanol. The total amount of DCPD added to the container after the start of polymerization was 36 g. The reaction mixture was subjected to after treatment in the same manner as Example 12 to yield 61.5 g of the copolymer.

The mole fraction of the DCPD component in the resulting copolymer was 42% by mole, and the glass transition point was 158° C. The DCPD conversion was therefore 72%. Estimation of the molar ratio (F) for this polymerization reaction based on FIG. 12 gives 11.1 at the starting point of polymerization and 5.7 at the end point.

A definite glass transition point was exhibited with DSC measurement, and the ΔTg was 9.5° C. Also, since absolutely no crystalline melting point was observed corresponding to polyethylene, it was confirmed that none of the copolymer produced contained polyethylene or partial crystalline ethylene blocks. The reduced viscosity $\eta_{sp}/c$ measured at 30° C. in a 0.5 g/dl concentration toluene solution was 0.71 dl/g, which was a sufficiently high value.

EXAMPLE 15

Copolymerization of ethylene and DCPD was carried out under the same polymerization conditions as Example 12, except that the rate of DCPD addition in Example 12 was changed to 0.8 g/min for the first 20 minutes after the start of polymerization, 0.5 g/min for the next 20 minutes, and 0.2 g/min for the last 20 minutes.

At one hour after the start of polymerization, a small amount of isopropanol was added to terminate the reaction. The total amount of DCPD added to the container after the start of polymerization was 30 g. The reaction mixture was subjected to after treatment in the same manner as Example 12 to yield 58.9 g of the copolymer.

The mole fraction of the DCPD component in the resulting copolymer was 43% by mole, and the glass transition point was 161° C. The DCPD conversion was therefore 77%. Estimation of the molar ratio (F) for this polymerization reaction based on FIG. 12 gives 10.2 at the starting point of polymerization and 4.1 at the end point.

A definite glass transition point was exhibited with DSC measurement, and the ΔTg was 8.6° C. Also, since absolutely no crystalline melting point was observed corresponding to polyethylene, it was confirmed that none of the copolymer produced contained polyethylene or partial crystalline ethylene blocks. The reduced viscosity $\eta_{sp}/c$ measured at 30° C. in a 0.5 g/dl concentration toluene solution was 0.50 dl/g, which was a sufficiently high value.

COMPARATIVE EXAMPLE 5

Polymerization was carried out under the same conditions as Example 13, except that no new DCPD was added after the start of polymerization. At 2 hours after the start of polymerization, a small amount of isopropanol was added to terminate the reaction. The reaction mixture was subjected to after treatment in the same manner as Example 12 to yield 35.9 g of the copolymer.

The mole fraction of the DCPD component in the resulting copolymer was 35% by mole. The DCPD conversion was therefore 86%. The glass transition point was measured to be 130° C. by DSC, but a broad change in heat capacity was exhibited and the glass transition point was indefinite, and the $\Delta Tg$ was 19.6° C. A slight crystalline melting point corresponding to polyethylene was observed. The reduced viscosity $\eta_{sp}/c$ was 0.80 dl/g.

EXAMPLE 16

To a 300 ml volume autoclave there were added 15 g of the ethylene/DPCD copolymer obtained in Example 12, 90 ml of toluene and 50 mg of the hydrogenation catalyst $RuClH(CO)PPh_3)_3$, and a hydrogenation reaction was carried out for 5 hours at 170° C. with a hydrogen pressure of 40 kg/cm². The reaction mixture was reprecipitated in methanol, and filtration, washing and drying yielded 14.8 g of the copolymer.

The $^1H$-NMR spectrum (with deuterized o-dichlorobenzene as the solvent) of the resulting copolymer showed that the signal appearing at 5.5–5.8 ppm due to unsaturated bonds in the DCPD had completely disappeared, and the hydrogenation rate was 99.9%. The peaks near 4.8–5.0 ppm representing the terminal double bonds of the copolymer had also been hydrogenated. The reduced viscosity $\eta_{sp}/c$ was 0.50 dl/g, and no reduction in molecular weight was observed from the hydrogenation. The glass transition point was 154° C., virtually unchanged from before hydrogenation.

EXAMPLE 17

The ethylene-DCPD copolymer obtained in Example 13 was subjected to a hydrogenation reaction in the same manner as Example 16, to obtain a hydrogenated ethylene-DCPD copolymer with a hydrogenation rate of over 99.9%. The reduced viscosity $\eta_{sp}/c$ of the polymer was 0.72 dl/g, and no reduction in molecular weight was observed from the hydrogenation. The glass transition point was 148° C., virtually unchanged from before hydrogenation.

EXAMPLE 18

The hydrogenated ethylene-DCPD copolymers obtained in Examples 16 and 17 were further purified and the residual aluminum content in each polymer was reduced to under 10 ppm. After adding 0.5% by weight of Irganox 1010 to each copolymer, it was used for injection molding at a resin temperature of 300° C., to obtain plates each with a thickness of 1.2 mm. Both panels had very high transparency, and the light transmittances at 550 nm wavelength and the haze values were, respectively, 92.1% and 0.8% (copolymer obtained in Example 16) and 91.7% and 1.0% (copolymer obtained in Example 17).

COMPARATIVE EXAMPLE 6

The ethylene-DCPD copolymer obtained in Comparative Example 5 was hydrogenated according to Example 16, to obtain a hydrogenated ethylene-DCPD copolymer with a hydrogenation rate of over 99.9%. After further purification in the same manner as Example 18 until the residual aluminum content in the copolymer was under 100 ppm, 0.5% by weight of Irganox 1010 was added and injection molding was carried out at a resin temperature of 300° C., to obtain plates each with a thickness of 1.2 mm. Unlike Example 18, these panels had low transparency and considerable haze. The light transmittance at 550 nm wavelength and the haze value were, respectively, 74.7% and 18.3%.

EXAMPLE 19

A 500 ml stainless steel reaction vessel equipped with a stirrer was charged with 200 g of toluene, 50 g of DCPD, 395 mg of 1-hexene and 780 mg of triisobutylaluminum under a nitrogen atmosphere. The nitrogen outlet was closed under a nitrogen pressure in the reaction system of 1 atm. After the temperature was set to 30° C., ethylene was introduced into the reaction vessel under an ethylene pressure of 1.5 kg/cm to maintain the partial pressure of ethylene in the reaction system at a level of 0.5 kg/cm². Thereafter, 35 mg of $[(C_6H_5)_3C]^+[B(C_6F_5)_4]^-$ and 16 mg of $Et(Ind)_2ZrCl_2$ were added to cause polymerization to be initiated. During the polymerization, the partial pressure of ethylene was maintained at 0.5 kg/cm² and the consumption rate of ethylene was monitored by a flowmeter mounted on the apparatus.

At 3 hours after the start of polymerization, a small amount of isopropanol was added to terminate the reaction. The reaction mixture was subjected to after treatment, in the same manner as Example 12, to yield 51.0 g of the copolymer.

The mole fraction of the DCPD component in the resulting copolymer was 40% by mole, and the glass transition point was 141° C. The DCPD conversion was 78%. Estimation of the molar ratio (F) for this polymerization reaction based on FIG. 12 gives 21.0 at the starting point of polymerization, 8.4 at 60% DCPD consumption and 6.2 at 70% DCPD consumption.

A definite glass transition point was found through DSC measurement, and the $\Delta Tg$ was 11.1° C. Also, since absolutely no crystalline melting point was observed around 130° C. corresponding to polyethylene, it was confirmed that none of the copolymer produced contained polyethylene or crystalline ethylene blocks. The $H_{1.85}/H_{3.05}$ was estimated to be 0.03 by $^1H$-NMR, suggesting the absence of DCPD component linkages and the $1/4 \times (I_{1.3}/I_{3.05})$ was estimated to be 0.08, suggesting the negligible amount, if any, of the ethylene component blocks which cause to form unfavorable crystalline portion. The reduced viscosity $\eta_{sp}/c$ measured at 30° C. in a 0.5 g/dl concentration toluene solution was 0.58 dl/g, which was sufficiently high value.

EXAMPLE 20

A 500 ml stainless steel reaction vessel equipped with a stirrer was charged with 200 g of toluene, 33 g of DCPD, 407 mg of 1-hexene and 780 mg of triisobutylaluminum under a nitrogen atmosphere. The nitrogen outlet was closed under a nitrogen pressure in the reaction system of 1 atm. After the temperature was set to 30° C., ethylene was introduced into the reaction vessel under an ethylene pressure of 1.5 kg/cm² to maintain the partial pressure of ethylene in the reaction system at a level of 0.5 kg/cm². Thereafter, 38 mg of $[(C_6H_5)_3C\ ]^+[B(C_6F_5)_4]^-$ and 16 mg of $Et(Ind)_2ZrCl_2$ were added to cause polymerization to be initiated. During the polymerization, the partial pressure of ethylene was maintained at 0.5 kg/cm² and the consumption rate of ethylene was monitored by a flowmeter mounted on the apparatus. Then, 17 g of DCPD was added while maintaining the ratio $(V_E/V_D)$ of the ethylene consumption rate $(V_E$, mole/min) to the DCPD addition rate $(V_D$, mole/min) at 58/42. This control was carried out by observing the ethylene consumption rate with a flowmeter and feeding back the resulting rate to the DCPD supplying apparatus.

At 102 minutes after the start of polymerization, a small amount of isopropanol was added to terminate the reaction. The reaction mixture was subjected to after treatment, in the same manner as Example 12, to yield 54.0 g of the copolymer.

The mole fraction of the DCPD component in the resulting copolymer was 42% by mole, and the glass transition point was 148° C. The DCPD conversion was 83%. Estimation of the molar ratio (F) for this polymerization reaction based on FIG. 12 gives 15.0 at the starting point of polymerization, 8.4 at 60% DCPD consumption and 6.2 at 70% DCPD consumption.

A definite glass transition point was found through DSC measurement, and the $\Delta$Tg was 8.6° C. Also, since absolutely no crystalline melting point was observed corresponding to polyethylene and/or the ethylene component block, it was confirmed that none of the copolymer produced contained polyethylene or crystalline ethylene blocks. The $H_{1.85}/H_{3.05}$ was estimated to be 0.02 by $^1$H-NMR, suggesting the absence of DCPD component linkages and the $1/4 \times (I_{1.3}/I_{3.05})$ was estimated to be 0.02, suggesting the negligible amount, if any, of the ethylene component blocks which cause to form unfavorable crystalline portion. The reduced viscosity $\eta_{sp}/c$ measured at 30° C. in a 0.5 g/dl concentration toluene solution was 0.41 dl/g, which was sufficiently high value.

EXAMPLE 21

A 2 l reaction vessel was charged with 600 g of toluene, 150 g of DCPD, 0.50 g of 1-hexene and 1.2 g of triisobutylaluminum under a nitrogen atmosphere. The reaction vessel was purged with ethylene. After the temperature was set to 30° C., while allowing ethylene to be flowed into the reaction vessel under normal pressure, and 0.114 g of $[(C_6H_5)_3C]^+[B(C_6F_5)_4]^-$ and 51 mg of $Et(Ind)_2ZrCl_2$ were added to cause polymerization to be initiated. Ethylene was continued to be flowed into the reaction vessel under normal pressure. During the polymerization, the consumption rate of ethylene was monitored by a flowmeter mounted on the apparatus. At the time when 22.8 l of ethylene was flowed into the vessel, a small amount of isopropanol was added to terminate the reaction. The reaction mixture was subjected to after treatment, in the same manner as Example 12, to yield 150 g of the copolymer.

The mole fraction of the DCPD component in the resulting copolymer was 45% by mole, and the glass transition point was 145° C. The DCPD conversion was 83%. Estimation of the molar ratio (F) for this polymerization reaction based on FIG. 12 gives 10.3 at the starting point of polymerization and 4.1 at 60% DCPD consumption.

A definite glass transition point was found through DSC measurement, and the $\Delta$Tg was 6.1° C. Also, since absolutely no crystalline melting point was observed corresponding to polyethylene and/or the ethylene component block, it was confirmed that none of the copolymer produced contained polyethylene or crystalline ethylene blocks. The $H_{1.85}/H_{3.05}$ was estimated to be 0.04 by $^1$H-NMR, suggesting the absence of DCPD component linkages and the $1/4 \times (I_{1.3}/I_{3.05})$ was estimated to be 0.01, suggesting the negligible amount, if any, of the ethylene component blocks which cause to form unfavorable crystalline portion. The reduced viscosity $\eta_{sp}/c$ measured at 30° C. in a 0.5 g/dl concentration toluene solution was 0.59 dl/g, which was sufficiently high value.

The resulting polymer weighing 3.6 g was dissolved in 20.4 g of toluene in an autoclave. To the solution, 30 mg of cobalt triacetylacetonate [Co(acac)$_3$] and 50 mg of triisobutylaluminum were added. Thereafter, hydrogenation was carried out under a hydrogen pressure of 20 atms at 130° C. for 2 hours. After hydrogenation, the reaction mixture was added dropwise with stirring into a large quantity of methanol rendered acidic with hydrochloric acid to produce precipitate. The precipitate was then collected by filtration, washed successively with acetone, methanol and water, and finally dried to yield 3.4 g of the hydrogenated copolymer. In the $^1$H-NMR spectrum shown in FIG. 6, peaks due to the C=C double bond in the DCPD component of the starting copolymer at δ 5.54 and 5.64 ppm were completely missing, suggesting that more than 99.9% of the C=C double bonds was hydrogenated. The spectrum showed multiple but very sharp peaks around δ 1.07, 1.3, 1.47, 1.65, 1.8, 2.0 and 2.4 ppm. $H'_{2.20}/H'_{2.40}$ was estimated to be 0.038, indicating high level of alternation with respect to the tricyclodecane ring component and ethylene component. The copolymer thus obtained showed a definite glass transition point Tg of 140° C. and $\Delta$Tg of 7.8° C. The reduced viscosity $\eta_{sp}/c$ measured at 30° C. in a 0.5 g/dl concentration toluene solution was 0.55 dl/g, which was sufficiently high value.

EXAMPLE 22

A 500 ml reaction vessel was charged with 80 g of toluene, 20 g of DCPD and 300 mg of triisobutylaluminum under a nitrogen atmosphere. The reaction vessel was purged with ethylene. After the temperature was set to 30° C., while allowing ethylene to be flowed into the reaction vessel under normal pressure, and 28 mg of $[(C_6H_5)_3C]^+[B(C_6F_5)_4]^-$ and 13 mg of $^iPr(Cp)(Flu)ZrCl_2$ were added to cause polymerization to be initiated. Ethylene was continued to be flowed into the reaction vessel under normal pressure. During the polymerization, the consumption rate of ethylene was monitored by a flowmeter mounted on the apparatus. At the time when 22.8 l of ethylene was flowed into the vessel, a small amount of the solution was sampled. The sampled solution was subjected to after treatment, in the same manner as Example 12, to yield the copolymer.

The mole fraction of the DCPD component in the resulting copolymer was 43% by mole, and the glass transition point was 155° C. The DCPD conversion was 75%. Estimation of the molar ratio (F) for this polymerization reaction based on FIG. 12 gives 10.3 at the starting point of polymerization and 4.1 at 60% DCPD consumption.

A definite glass transition point was found through DSC measurement, and the $\Delta$Tg was 6.1° C. Also, since absolutely no crystalline melting point was observed corresponding to polyethylene and/or the ethylene component block, it was confirmed that none of the copolymer produced contained polyethylene or crystalline ethylene blocks. The $H_{1.85}/H_{3.05}$ was estimated to be 0.03 by $^1$H-NMR, suggesting the absence of DCPD component linkages and the $1/4 \times (I_{1.3}/I_{3.05})$ was estimated to be 0.01, suggesting the negligible amount, if any, of the ethylene component blocks which cause to form unfavorable crystalline portion. The reduced viscosity $\eta_{sp}/c$ measured at 30° C. in a 0.5 g/dl concentration toluene solution was 0.48 dl/g, which was sufficiently high value.

The polymer solution after the sampling was transferred to an autoclave, and 107 mg of cobalt triacetylacetonate [Co(acac)$_3$] and 300 mg of triisobutylaluminum were added. Thereafter, hydrogenation was carried out under a hydrogen pressure of 27 atms at 130° C. for 2 hours. After hydrogenation, the reaction mixture was added dropwise with stirring into a large quantity of methanol rendered acidic with hydrochloric acid to produce precipitate. The precipitate was then collected by filtration, washed successively with acetone, methanol and water, and finally dried to yield 18.5 g of the hydrogenated copolymer. In the $^1$H-NMR spectrum shown in FIG. 7, peaks due to the C=C double bond in the DCPD component of the starting copolymer at δ 5.54 and 5.64 ppm were completely missing, suggesting that more than 99.9% of the C=C double bonds was hydrogenated. The spectrum showed multiple but very sharp peaks around δ 1.07, 1.3, 1.47, 1.65, 1.8, 2.0 and 2.4 ppm. $H'_{2.20}/H'_{2.40}$ was estimated to be 0.031, indicating high level of alternation with respect to the tricyclodecane ring component and ethylene component. The copolymer thus obtained showed a definite glass transition point Tg of 149° C. and ΔTg of 9.2° C. The reduced viscosity $\eta_{sp}/c$ measured at 30° C. in a 0.5 g/dl concentration toluene solution was 0.45 dl/g, which was sufficiently high value.

EXAMPLE 23

A 3 l stainless steel reaction vessel was charged with 1380 g of toluene, 201 g of DCPD and 3.4 g of triisobutylaluminum under a nitrogen atmosphere. The nitrogen outlet was closed under a nitrogen pressure in the reaction system of 1 atom. After the temperature was set to 30° C., ethylene was introduced into the reaction vessel under an ethylene pressure of 2.0 kg/cm2 to maintain the partial pressure of ethylene in the reaction system at a level of 1.0 kg/cm². Thereafter, 225 mg of $[(C_6H_5)_3C]^+[B(C_6F_5)_4]^-$ was added and 122 g of $^iPr(Cp)(Flu)ZrCl_2$ was added portionwisely five times in equal amounts to cause polymerization. During the polymerization, the partial pressure of ethylene was maintained at 1.0 kg/cm² and the consumption rate of ethylene was monitored by a flowmeter mounted on the apparatus. Then, 139 g of DCPD was added while maintaining the ratio ($V_E/V_D$) of the ethylene consumption rate ($V_E$, mole/min) to the DCPD addition rate ($V_D$, mole/min) at 60/40. This control was carried out by observing the ethylene consumption rate with a flowmeter and feeding back the resulting rate to the DCPD supplying apparatus. At 173 minutes after the start of polymerization and when 55.4 l of ethylene was flowed into the reaction vessel, a small amount of the solution was sampled. The sampled solution was subjected to after treatment, in the same manner as Example 12, to yield the copolymer.

The mole fraction of the DCPD component in the resulting copolymer was 42% by mole, and the glass transition point was 148° C. The DCPD conversion was 70%. Estimation of the molar ratio (F) for this polymerization reaction based on FIG. 12 gives 6.6 at the starting point of polymerization and 4.1 at 60% DCPD consumption.

A definite glass transition point was found through DSC measurement, and the ΔTg was 13° C. Also, since absolutely no crystalline melting point was observed corresponding to polyethylene and/or the ethylene component block, it was confirmed that none of the copolymer produced contained polyethylene or crystalline ethylene blocks. The $H_{1.85}/H_{3.05}$ was estimated to be 0.03 by $^1$H-NMR, suggesting the absence of DCPD component linkages and the $1/4 \times (I_{1.3}/I_{3.05})$ was estimated to be 0.00, suggesting the absence of the ethylene component blocks which cause to form unfavorable crystalline portion. The reduced viscosity $\eta_{sp}/c$ measured at 30° C. in a 0.5 g/dl concentration toluene solution was 0.56 dl/g, which was sufficiently high value.

The polymer solution after the sampling was transferred to an autoclave, and 3.0 g of cobalt triacetylacetonate [Co(acac)₃] and 5.1 g of triisobutylaluminum were added. Thereafter, hydrogenation was carried out under a hydrogen pressure of 45 atms at 130° C. for 3 hours. After hydrogenation, the reaction mixture was added dropwise with stirring into a large quantity of methanol rendered acidic with hydrochloric acid to produce precipitate. The precipitate was then collected by filtration, washed successively with acetone, methanol and water, and finally dried to yield 305 g of the hydrogenated copolymer. In the $^1$H-NMR spectrum shown in FIG. 8, peaks due to the C=C double bond in the DCPD component of the starting copolymer at δ 5.54 and 5.64 ppm were completely missing, suggesting that more than 99.9% of the C=C double bonds was hydrogenated. The spectrum showed multiple but very sharp peaks around δ 1.07, 1.3, 1.47, 1.65, 1.8, 2.0 and 2.4 ppm. $H'_{2.20}/H_{2.40}$ was estimated to be 0.024, indicating high level of alternation with respect to the tricyclodecane ring component and ethylene component. The copolymer thus obtained showed a definite glass transition point Tg of 143° C. and ΔTg of 9.6° C. The reduced viscosity $\eta_{sp}/c$ measured at 30° C. in a 0.5 g/dl concentration toluene solution was 0.53 dl/g, which was sufficiently high value.

INDUSTRIAL APPLICABILITY

According to the present invention it is possible to obtain α-olefin-DCPD copolymers with high alternating copolymerization and high chemical homogeneity. Thus, hydrogenated α-olefin-DCPD copolymers obtained by hydrogenation of these α-olefin-DCPD copolymers as precursors have high optical uniformity and high transparency, and are therefore suitable for applications as optical disk substrates and other optical materials. According to the invention, there may be provided cyclic olefin copolymers suitable for optical purposes, without using costly polycyclic olefins.

What is claimed is:

1. An α-olefin-cycloolefin copolymer which (1) consists essentially of 0–39% by mole of an α-olefin component represented by the following formula (A)

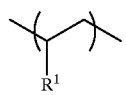

(A)

wherein $R^1$ is a hydrogen atom or a saturated aliphatic hydrocarbon group of 1–16 carbon atoms, and 61–100% by mole of a cycloolefin component represented by the following formula (B)

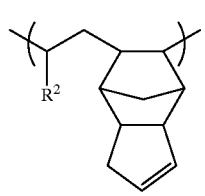

(B)

wherein $R^2$ is a hydrogen atom or a saturated aliphatic hydrocarbon group of 1–16 carbon atoms, (2) has a reduced viscosity $\eta_{sp}/c$ in the range of 0.1–10 dl/g as measured in a 0.5 g/dl toluene solution at 30° C., and (3) wherein no peak assignable to melting of a polyethylene and/or ethylene component block is observed in the DSC curve thereof.

2. An α-olefin-cycloolefin copolymer which (1) consists essentially of repeating units represented by the following formulas (A), (B), (C), and (D):

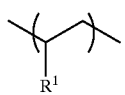

(A)

wherein $R^1$ is a hydrogen atom or a saturated aliphatic hydrocarbon group of 1–16 carbon atoms,

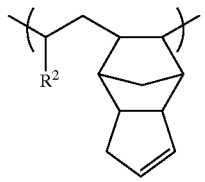

(B)

wherein $R^2$ is a hydrogen atom or a saturated aliphatic hydrocarbon group of 1–16 carbon atoms,

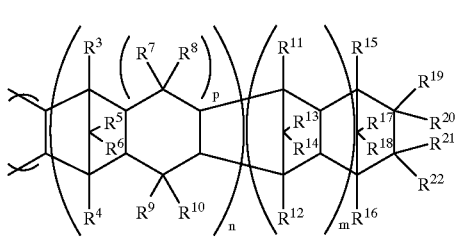

(C)

wherein n is 0 or 1; m is 0 or a positive integer of 1–3; p is 0 or 1; and $R^3$–$R^{22}$ are the same or different and each represents a hydrogen atom, a halogen atom, an aromatic hydrocarbon group of 6–10 carbon atoms or a saturated or unsaturated aliphatic hydrocarbon group of 1–12 carbon atoms, or $R^{19}$ and $R^{20}$ or $R^{21}$ and $R^{22}$ may together form an alkylidene group, or $R^{19}$ or $R^{20}$ and $R^{21}$ or $R^{22}$ may form, together with the two carbon atoms to which they bond, a ring which may contain at least one double bond or be an aromatic ring,

(D)

wherein q is an integer of 2–8,
with composition ratios of {A}, {B}, {C} and {D} which represent the molar percents of the respective repeating units (A), (B), (C) and (D) being in ranges such that ({A}+{B})/({C}+{D})=95–99.9/0.1–5, {A}/{B}=0–39/61–100 and {D}/{C}=0–95/5–100, (2) has a reduced viscosity $\eta_{sp}/c$ which is in the range of 0.1–10 dl/g as measured in a 0.5 g/dl toluene solution at 30° C., and (3) wherein no peak assignable to melting of a polyethylene and/or ethylene component block is observed in the DSC curve thereof.

3. An α-olefin-cycloolefin copolymer which (1) consists essentially of repeating units represented by the following formulas $(A_H)$, $(B_H)$, $(C_H)$, and $(D_H)$:

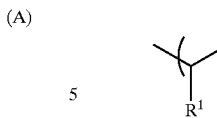

$(A_H)$ wherein $R^1$ is a hydrogen atom or a saturated aliphatic hydrocarbon group of 1–16 carbon atoms,

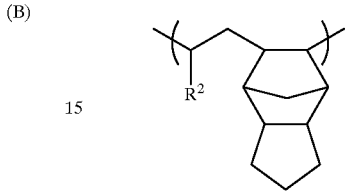

$(B_H)$ wherein $R^2$ is a hydrogen atom or a saturated aliphatic hydrocarbon group of 1–16 carbon atoms,

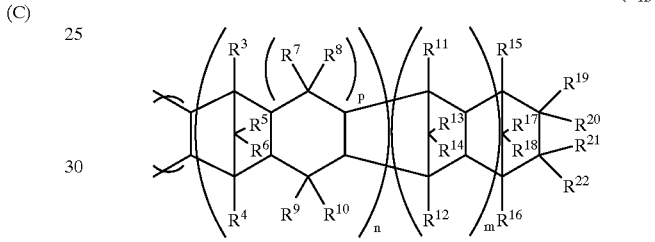

$(C_H)$ wherein n is 0 or 1; m is 0 or a positive integer of 1–3; p is 0 or 1; and $R^3$–$R^{22}$ are the same or different and each represents a hydrogen atom, a halogen atom, an aromatic hydrocarbon group of 6–10 carbon atoms or a saturated aliphatic hydrocarbon group of 1–12 carbon atoms, or $R^{19}$ and $R^{20}$ or $R^{21}$ and $R^{22}$ may together form an alkylidene group, or $R^{19}$ or $R^{20}$ and $R^{21}$ or $R^{22}$ may form, together with the two carbon atoms to which they bond, a ring which may be an aromatic ring,

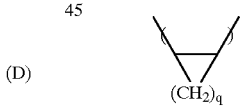

$(D_H)$ wherein q is an integer of 2–8,
with composition ratios of $\{A_H\}$, $\{B_H\}$, $\{C_H\}$ and $\{D_H\}$ which represent the molar percents of the respective repeating units $(A_H)$, $(B_H)$, $(C_H)$ and $(D_H)$ being in ranges such that $(\{A_H\}+\{B_H\})/(\{C_H\}+\{D_H\})$=95–99.9/0.1–5, $\{A_H\}/\{B_H\}$= 0–39/61–100 and $\{D_H\}/\{C_H\}$=0–95/5–100, (2) has a reduced viscosity $\eta_{sp}/c$ which is in the range of 0.1–10 dl/g as measured in a 0.5 g/dl toluene solution at 30° C., and (3) wherein no peak assignable to melting of a polyethylene and/or ethylene component block is observed in the DSC curve thereof.

4. An α-olefin-cycloolefin copolymer according to claim 1, wherein the ΔTg, indicating the temperature difference between the falling point and the rising point in the DSC curve thereof, is not higher than 15° C.

5. An α-olefin-cycloolefin copolymer according to claim 1, wherein the glass transition temperature (Tg:°C.) thereof satisfies the following expression:

$$-22.7+2.84m_D+0.0262m_D^2 < Tg < -2.7+2.84m_D+0.0262m_D^2$$

wherein $m_D$ denotes the mole fraction (%) of the cyclic olefin component in the polymer and is within the range of from 38% to 50%,
and the α-olefin is ethylene.

6. An α-olefin-cycloolefin copolymer according to claim 1, wherein a ratio ($H_{1.85}/H_{3.05}$) of the intensity ($H_{1.85}$) of the valley at δ 1.85 ppm to the intensity ($H_{3.05}$) of the peak at δ 3.05 ppm in the $^1$H-NMR spectrum thereof is not more than 0.15, and the α-olefin is ethylene.

7. An α-olefin-cycloolefin copolymer according to claim 1, wherein ¼ of a ratio ($I_{1.3}/I_{3.05}$) of the peak area ($I_{1.3}$) at δ 1.3 ppm assignable to a polyethylene and/or ethylene component block to the peak area ($I_{3.05}$) at δ 3.05 ppm in the $^1$H-NMR spectrum thereof is not more than 0.05, and the α-olefin is ethylene.

8. A process for producing an α-olefin-cycloolefin copolymer, comprising copolymerizing an α-olefin of 2 or more carbon atoms with dicyclopentadiene in the presence of a catalyst comprising at least one metallocene of which the central metal is titanium, zirconium or hafnium and at least one promoter catalyst, while maintaining a mole ratio (F) of the monomers in the reaction system within a range which satisfies the following expression (I)

$$F=[\text{dicyclopentadiene}]/[\alpha\text{-olefin}]>4 \quad (I)$$

during the period from the start of polymerization until the conversion of the dicyclopentadiene added to the polymerization reaction system reaches 60%.

9. A process for producing an α-olefin-cycloolefin copolymer comprising copolymerizing an α-olefin of 2 or more carbon atoms with dicyclopentadiene in the presence of a catalyst comprising at least one metallocene of which the central metal is titanium, zirconium or hafnium and at least one promoter catalyst, while maintaining a mole ratio (F={dicyclopentadiene})/{α-olefin}) of the monomers in the reaction system within a range which satisfies the following expression (II)

$$38/62 < F/(F+r_\alpha) < 48/52 \quad (II)$$

wherein $r_\alpha$ denotes a monomer reactivity ratio of α-olefin relative to dicyclopentadiene and represents a conversion of said α-olefin, during the period from the start of polymerization until the conversion of the dicyclopentadiene added to the polymerization reaction system reaches 60%.

10. The process of claim 8 or 9, wherein said α-olefin is ethylene.

11. The process of claim 8 or 9, wherein the central metal of the metallocene is zirconium and the promoter catalyst is aluminoxane.

12. The process of claim 8 or 9, wherein the central metal of the metallocene is zirconium and the promoter catalyst is an ionic boron compound.

13. The process of claim 8 or 9, characterized in that the mole ratio (F) of the monomers in the reaction system is in a range which satisfies expression (I) or (II) until the conversion of the dicyclopentadiene added to the polymerization reaction system reaches 70%.

14. The process of claim 8 or 9, wherein the range of said monomer ratio (F) is F>5.5.

15. An α-olefin-cycloolefin copolymer which (1) consists essentially of 0–39% by mole of an α-olefin component represented by the following formula ($A_H$)

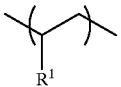

($A_H$)

wherein $R^1$ is a hydrogen atom or a saturated aliphatic hydrocarbon group of 1–16 carbon atoms, and 61–100% by mole of a cycloolefin component represented by the following formula ($B_H$)

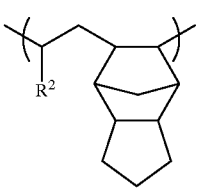

($B_H$)

wherein $R^2$ is a hydrogen atom or a saturated aliphatic hydrocarbon group of 1–16 carbon atoms, (2) has a reduced viscosity $\eta_{sp}/c$ in the range of 0.1–10 dl/g as measured in a 0.5 g/dl toluene solution at 30° C., and (3) wherein no peak assignable to melting of a-polyethylene and/or ethylene component block is observed in the DSC curve thereof.

16. An α-olefin-cycloolefin copolymer according to claim 15, wherein the ΔTg, indicating the temperature difference between the falling point and the rising point in the DSC curve thereof, is not higher than 15° C.

17. An α-olefin-cycloolefin copolymer according to claim 15, wherein the glass transition temperature (Tg:°C.) thereof satisfies the following expression:

$$-32.7+2.84m_T+0.0262m_T^2 < Tg < -7.7+2.84m_T+0.0262m_T^2$$

wherein $m_T$ denotes the mole fraction (%) of the cyclic olefin component in the polymer and is within the range of from 38% to 50%,
and the α-olefin is ethylene.

18. An α-olefine-cycloolefin copolymer according to claim 15, wherein a ratio ($H'_{2.20}/H'_{2.40}$) of the intensity ($H'_{2.20}$) of the valley at δ 2.20 ppm to the intensity ($H'_{2.40}$) of the peak at δ 2.40 in the $^1$H-NMR spectrum thereof is not more than 0.07, and the α-olefin is ethylene.

19. A process for producing an α-olefin-cycloolefin copolymer, comprising (1) copolymerizing an α-olefin of 2 or more carbon atoms with dicyclopentadiene in the presence of a catalyst comprising at least one metallocene of which the central metal is titanium, zirconium or hafnium and at least one promoter catalyst, while maintaining a mole ratio (F) of the monomers in the reaction system within a range which satisfies the following expression (I)

$$F=[\text{dicyclopentadiene}]/[\alpha\text{-olefin}]>4 \quad (I)$$

during the period from the start of polymerization until the conversion of the dicyclopentadiene added to the polymerization reaction system reaches 60%, and (2) hydrogenating the resulting copolymer until the degree of hydrogenation reaches at least 99%.

20. A process for producing an α-olefin-cycloolefin copolymer comprising (1) copolymerizing an α-olefin of 2 or more carbon atoms with dicyclopentadiene in the presence of a catalyst comprising at least one metallocene of which the central metal is titanium, zirconium or hafnium and at least one promoter catalyst, while maintaining a mole ratio (F=[dicyclopentadiene])/[α-olefin]) of the monomers in the reaction system within a range which satisfies the following expression (II)

$$38/62 < F/(F+r_\alpha) < 48/52 \qquad (II)$$

wherein $r_{60}$ denotes a monomer reactivity ratio of α-olefin relative to the DCPD and represents a conversion of said α-olefin, during the period from the start of polymerization until the conversion of the dicyclopentadiene added to the polymerization reaction system reaches 60%, and (2) hydrogenating the resulting copolymer until the degree of hydrogenation reaches at least 99%.

21. The process of claim 19 or 20, wherein said α-olefin is ethylene.

22. The process of claim 19 or 20, wherein the central metal of the metallocene is zirconium and the promoter catalyst is aluminoxane.

23. The process of claim 19 or 20, wherein the central metal of the metallocene is zirconium and the promoter catalyst is an ionic boron compound.

24. The process of claim 19 or 20, characterized in that the mole ratio (F) of the monomers in the reaction system is in a range which satisfies expression (I) or (II) until the conversion of the dicyclopentadiene added to the polymerization reaction system reaches 70%.

25. The process of claim 19 or 20, wherein the range of said monomer ratio (F) is F>5.5.

26. An optical material composed mainly of an α-olefin-cycloolefin copolymer according to any one of claims 15, 16, 18 and 3.

* * * * *